United States Patent

Bluethman et al.

[15] 3,654,611

[45] Apr. 4, 1972

[54] VISUAL EDITING SYSTEM INCORPORATING CONTROLS FOR JUSTIFYING AND DEJUSTIFYING DISPLAYED TEXT

[72] Inventors: Robert G. Bluethman, Austin, Tex.; Jack W. Simpson, Lexington, Ky.

[73] Assignee: International Business Machines Corporation, Armonk, N.Y.

[22] Filed: Mar. 2, 1970

[21] Appl. No.: 15,792

[52] U.S. Cl. ....................340/172.5

[51] Int. Cl. ....................G06f 3/14

[58] Field of Search ....................340/172.5, 324.1

[56] References Cited

UNITED STATES PATENTS

| | | | |
|---|---|---|---|
| 3,267,454 | 8/1966 | Schaaf | 340/324 |
| 3,165,045 | 1/1965 | Troll | 340/324 |
| 2,762,485 | 9/1956 | Bafour et al. | 197/20 |
| 3,248,705 | 4/1966 | Damman et al. | 340/172.5 |
| 3,307,154 | 2/1967 | Garth et al. | 340/172.5 |
| 3,357,327 | 12/1967 | Proud | 340/172.5 |
| 3,466,645 | 9/1969 | Granberg et al. | 340/172.5 |
| 3,501,746 | 3/1970 | Vosbury | 340/172.5 |
| 3,512,132 | 3/1970 | Jones et al. | 340/172.5 |
| 3,525,079 | 8/1970 | Cuccio | 340/172.5 |

FOREIGN PATENTS OR APPLICATIONS

| | | |
|---|---|---|
| 786,037 | 6/1950 | Great Britain |

*Primary Examiner*—Paul J. Henon
*Assistant Examiner*—Mark Edward Nusbaum
*Attorney*—Hanifin and Jancin and John W. Girvin, Jr.

[57] ABSTRACT

A data composing, editing, formatting and display system for use by composers of quality printed graphics. A cathode ray tube display is utilized to display keyed data and data inputed by a secondary media reader in a manner analogous to the display of a page of typed data on a typewriter. The number of words of text which appear on each line of displayed text between margin boundaries are optimized. Additional text may be inserted or deleted at any point in the displayed text or the margin boundaries can be altered resulting in the displayed text shifting to accommodate the additional test or new boundaries. Text shifting results in re-optimization of the display lines without resultant loss of word integrity or paragraph definition. Operator controls are effective to justify each line of displayed text by effecting extra spacing between text characters. The displayed justified text can then be outputed to a secondary media recorder or dejustified to facilitate further text and format modifications and thus maintain optimum word-line relationships.

14 Claims, 62 Drawing Figures

INVENTORS

ROBERT G. BLUETHMAN
JACK W. SIMPSON

BY John W Girvin Jr.

ATTORNEY

PATENTED APR 4 1972

3,654,611

SHEET 04 OF 51

CL12 = (CRMN)(I12)(CL)
CL12CX = (CL12)(X10OUT)(CNO INSERT + CNORM)
CL12CXN = (CL12)(X10 OUT*)(CEO*)
X1OUT = X10(CNORM* + LP8 LP9 LP10)

VISUAL EDITING SYSTEM INCORPORATING CONTROLS FOR JUSTIFYING AND DEJUSTIFYING DISPLAYED TEXT

CROSS-REFERENCES TO RELATED APPLICATIONS

The following applications are assigned to the same assignee as the present application.

U.S. Pat. application Ser. No. 782,285, filed Dec. 9, 1968, entitled "Automatic Data Composing, Editing and Formatting System," Paul E. Goldsberry et al. inventors.

U.S. Pat. application Ser. No. 15,791 entitled "Proportional Spacing Visual Editing System," Robert G. Bluethman, Paul E. Goldsberry, Robert L. McConnell and Jack W. Simpson inventors, filed Mar. 2, 1970 concurrently herewith.

U.S. Pat. application Ser. No. 15,793 entitled "Visual Editing System Incorporating Selectable Letter Spacing Display and Associated Scale Display," Robert L. McConnell and Jack W. Simpson inventors, filed Mar. 2, 1970 concurrently herewith.

BACKGROUND OF INVENTION

1. Field

This invention relates to an automatic data composing, editing, formatting and display device, and more particularly, to an improved electronic display device having facilities therein to effect ready changes in the content and format of data displayed and having additional facilities to effect justification and dejustification of the displayed information.

2. Description Of The Prior Art

The preparation of quality printed graphics materials often involves keying and editing several drafts of the document before it is complete, correct, and presented in a format that is both readily understandable and aesthetically pleasing to the eye of the reader. When it is necessary that the work product be in justified format (even right and left margins), each time an insertion or deletion is made changing the text content it is necessary to recompute the justification information of the line of text modified and, often times, for the entire paragraph thus modified.

When this operation is performed on a manual composing machine, it is necessary that the entire document be rekeyed and that new justification calculations be made on those lines wherein changes have been made. In order to eliminate as much of the keying and computing operations as possible, several prior art devices have been marketed wherein bulk text is keyed to a secondary media, such as magnetic tape. The magnetic tape media is then inputed into a computation device which calculates the optimimum number of words which can appear on a line and further calculates the information necessary to justify the line. These calculations having been made, the text information is outputed on a printer in accordance with the line definitions supplied by the computation device. Additionally, the text information may also be outputed on secondary media along with line definition information. Thereafter, when the thusly produced justified copy is modified, it is only necessary to rekey those lines wherein a change has been made, effect the recomputation of the thusly rekeyed lines and merge the newly composed lines with those lines which remain unchanged in the original text.

While such devices eliminate much of the operator effort necessitated to properly compose justified lines of text, they necessitate a delay time interval between the time that the editor makes the changes to the text material and the time the editor sees the revised copy in its justified form. Such a delay is highly disadvantageous to the editor who must refamiliarize himself with the information content as well as with the format of the particular job. Each time further modification is entailed, the rekeying, reprocessing and re-editing operations are re-initiated.

SUMMARY

In order to overcome the above noted shortcomings of the prior art, the present invention provides an information editing and display device wherein information can readily be inputed into the device by secondary media with the number of words appearing on each line of copy being optimized, and thereafter, the information can be automatically justified by manipulation of a simple operator control. Once the information has been justified and reviewed, it can be dejustified so that text characters may be inserted or deleted into the text copy while maintaining maximum word optimization. Additionally, format changes may be made after the dejustification operation. Thereafter, the text may be rejustified and presented to an output device in either justified or unjustified form.

By providing a display device responsive to a processor which can both justify text and thereafter dejustify the same text to effect maximum word per line optimization when content or format changes are effected, the machine operator no longer must correlate and merge lines of changed material with lines of unchanged material. Additionally, editorial changes can readily be effected after the justification computations have been performed without necessiatting a further rerun of the job and further re-editing operation.

The foregoing and other features and advantages of the invention will be apparent from the following more particular description of the preferred embodiment as illustrated in the accompanying drawings.

In the drawings

Figure 3A:
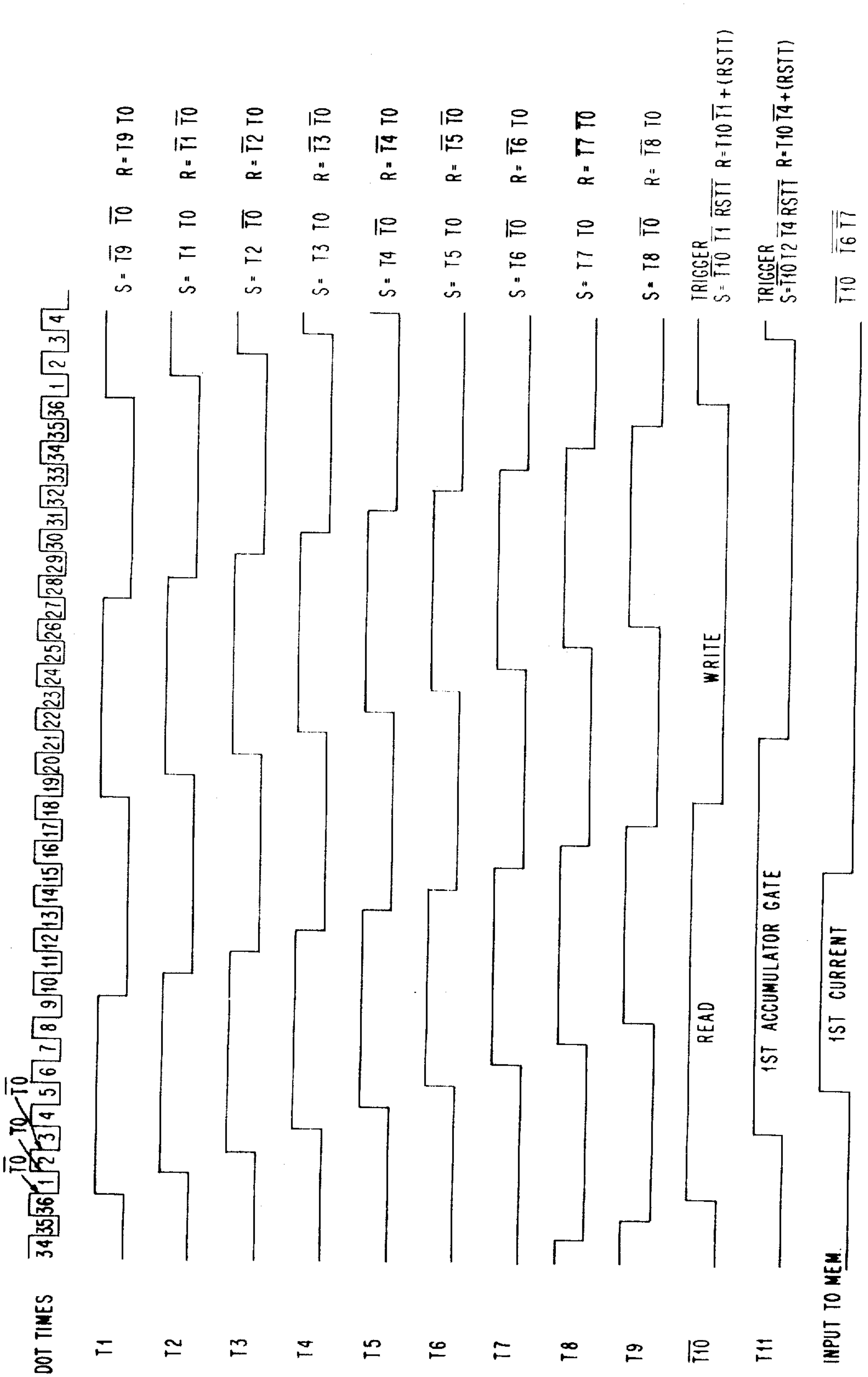
Figure 3B:
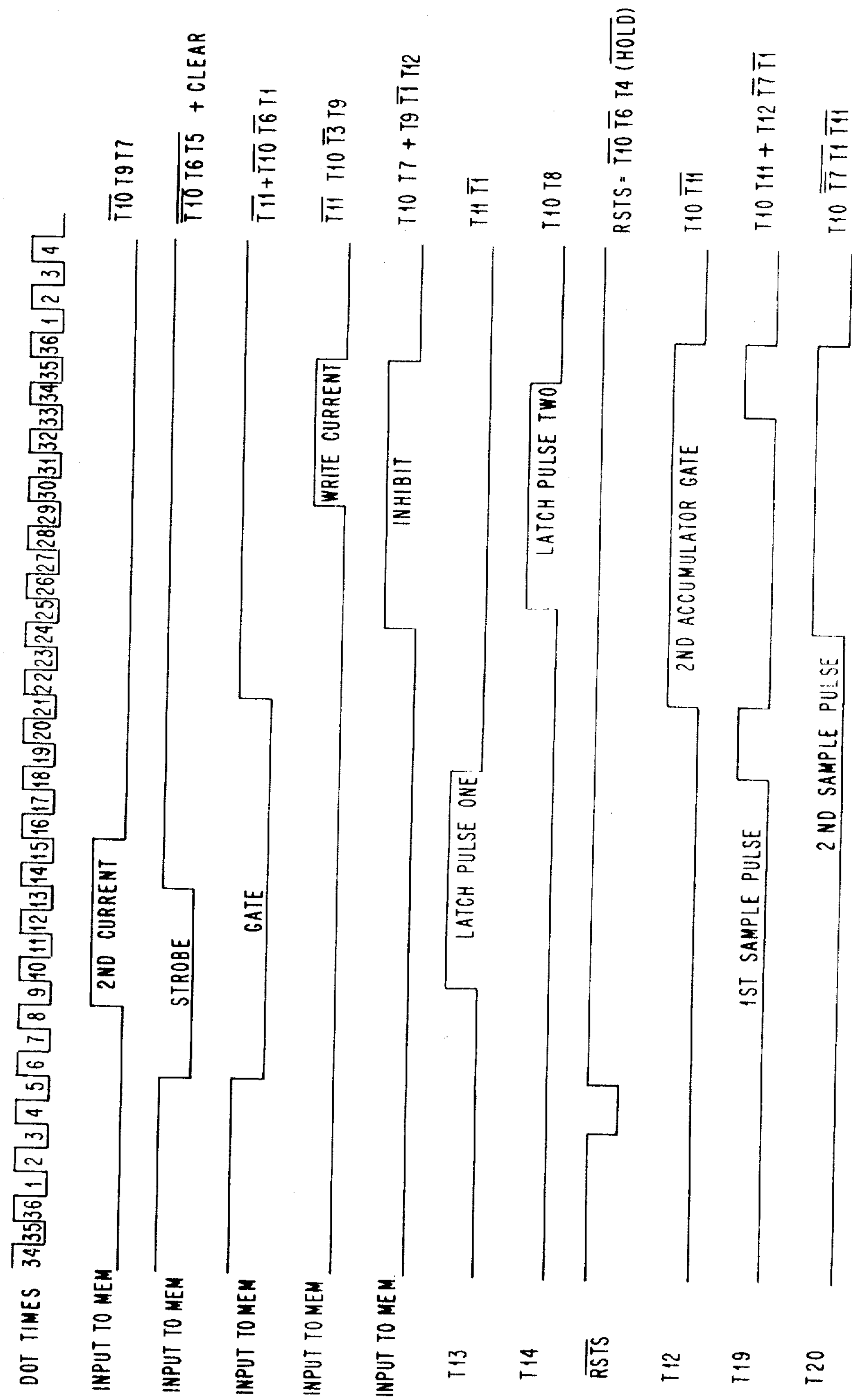
Figure 3C:
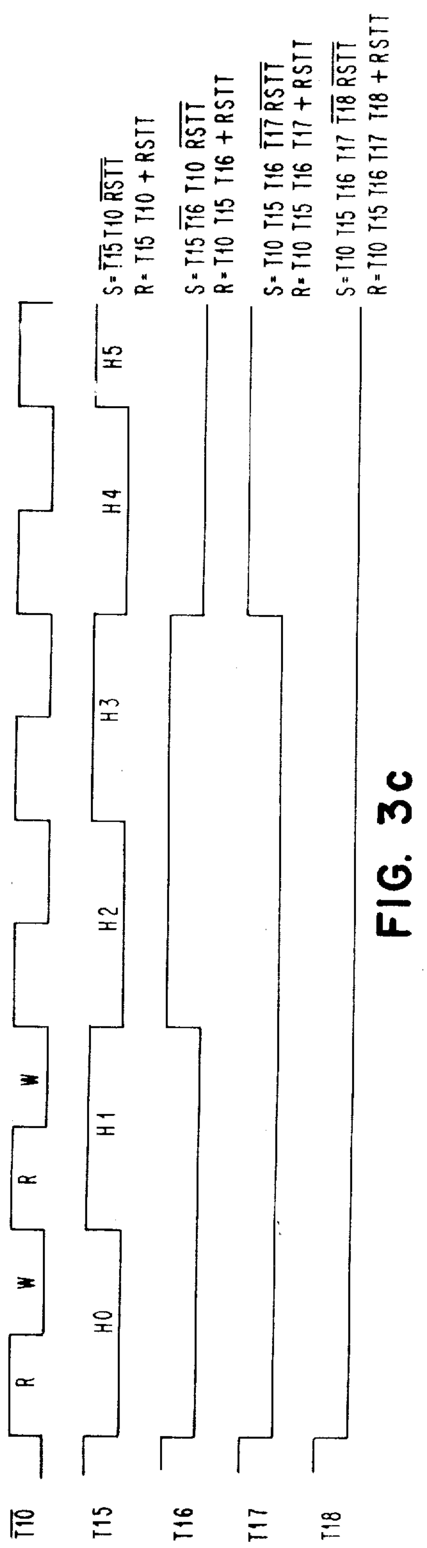

FIGS. 3*a*, 3*b*, and 3*c* are a timing diagram of the various states of the system clock.

Figure 4:
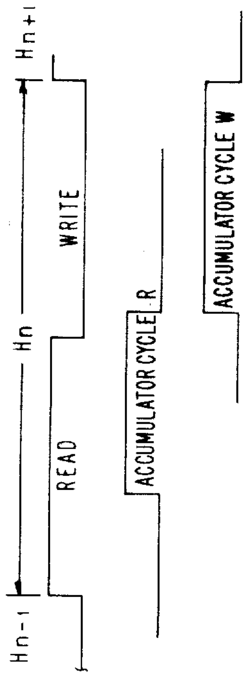

FIG. 4 is a timing diagram of a typical H clock cycle.

Figure 5:
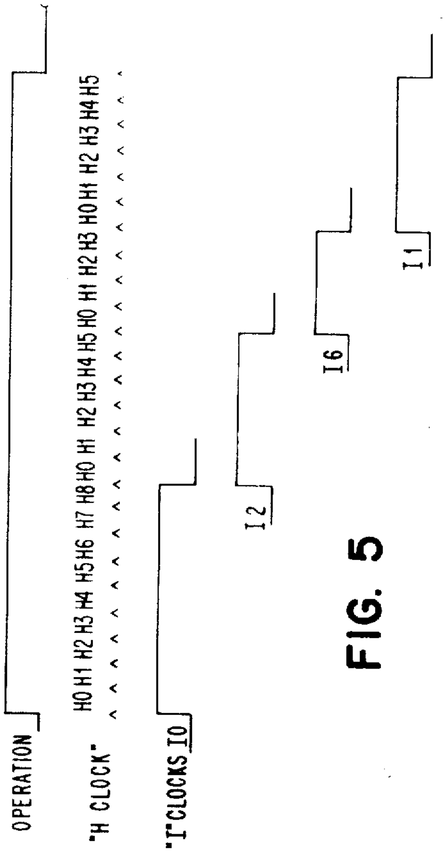

FIG. 5 is a timing diagram of the output of the H and I clocks during a machine operation.

Figure 6:
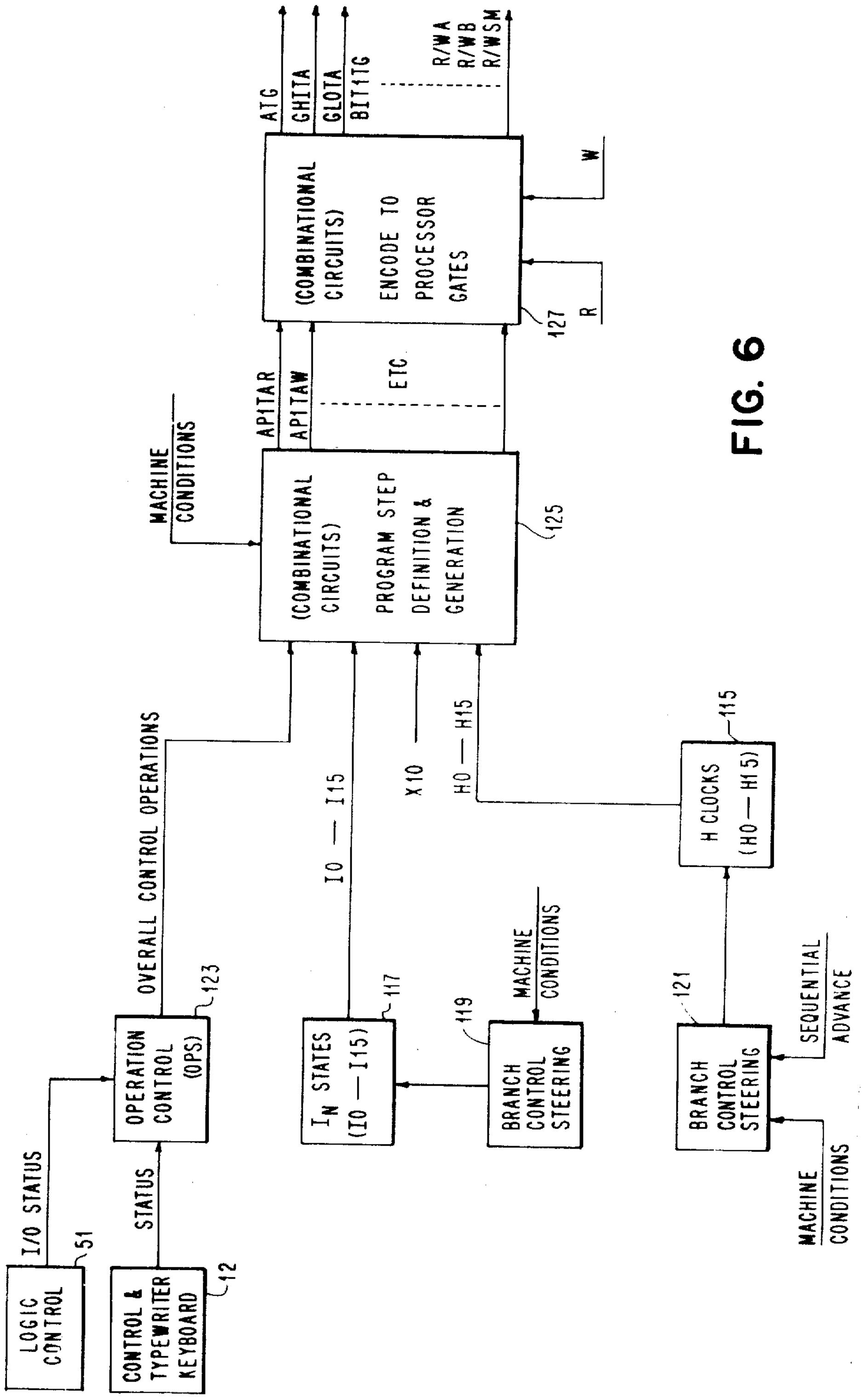

FIG. 6 is a block diagram of portions of the system clock and processor control unit.

Figures 7, 8:
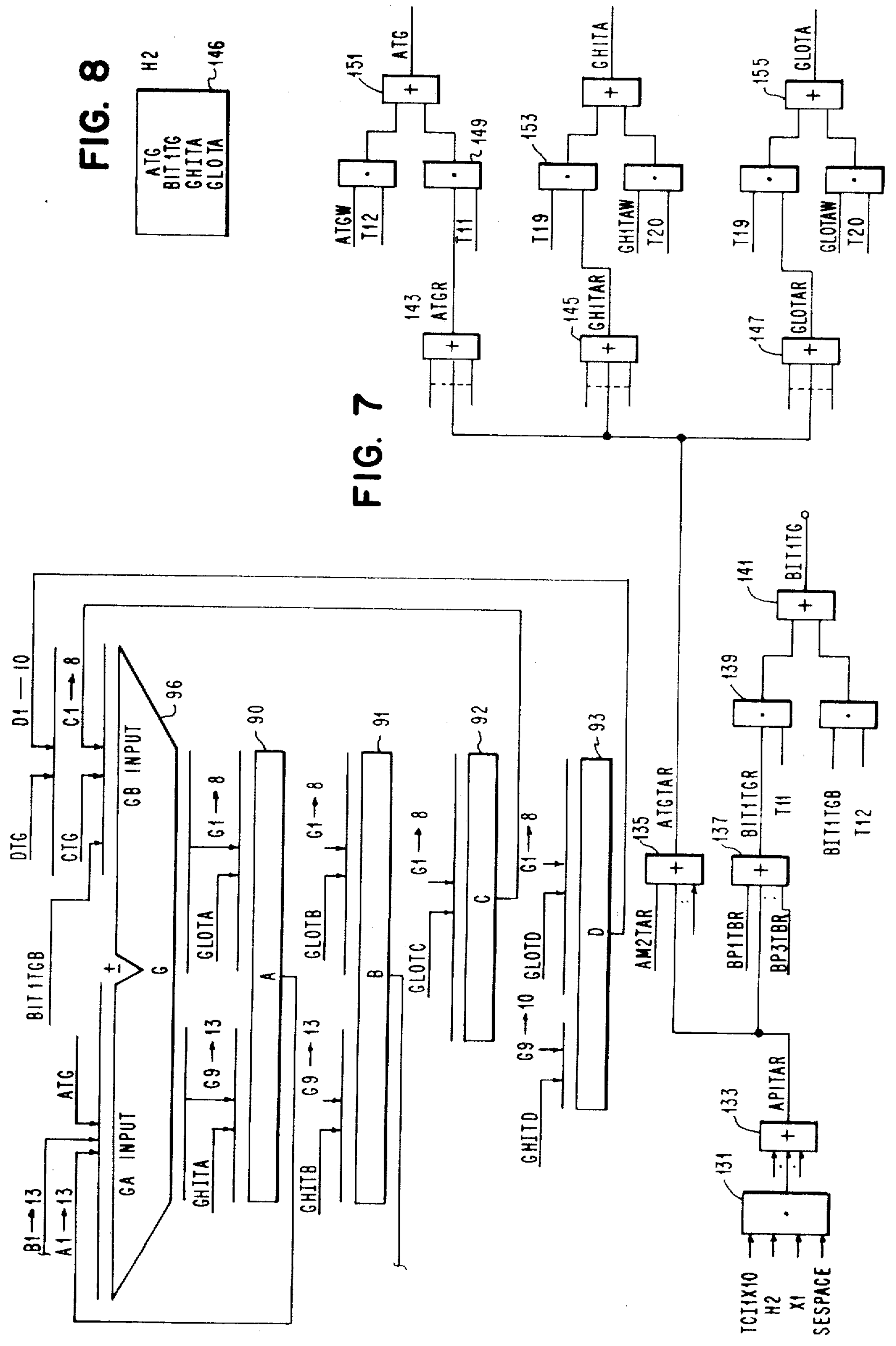

FIG. 7 is a block diagram of various combinational circuits of the processor control.

FIG. 8 is a block diagram representation of various system functions.

Figure 9:
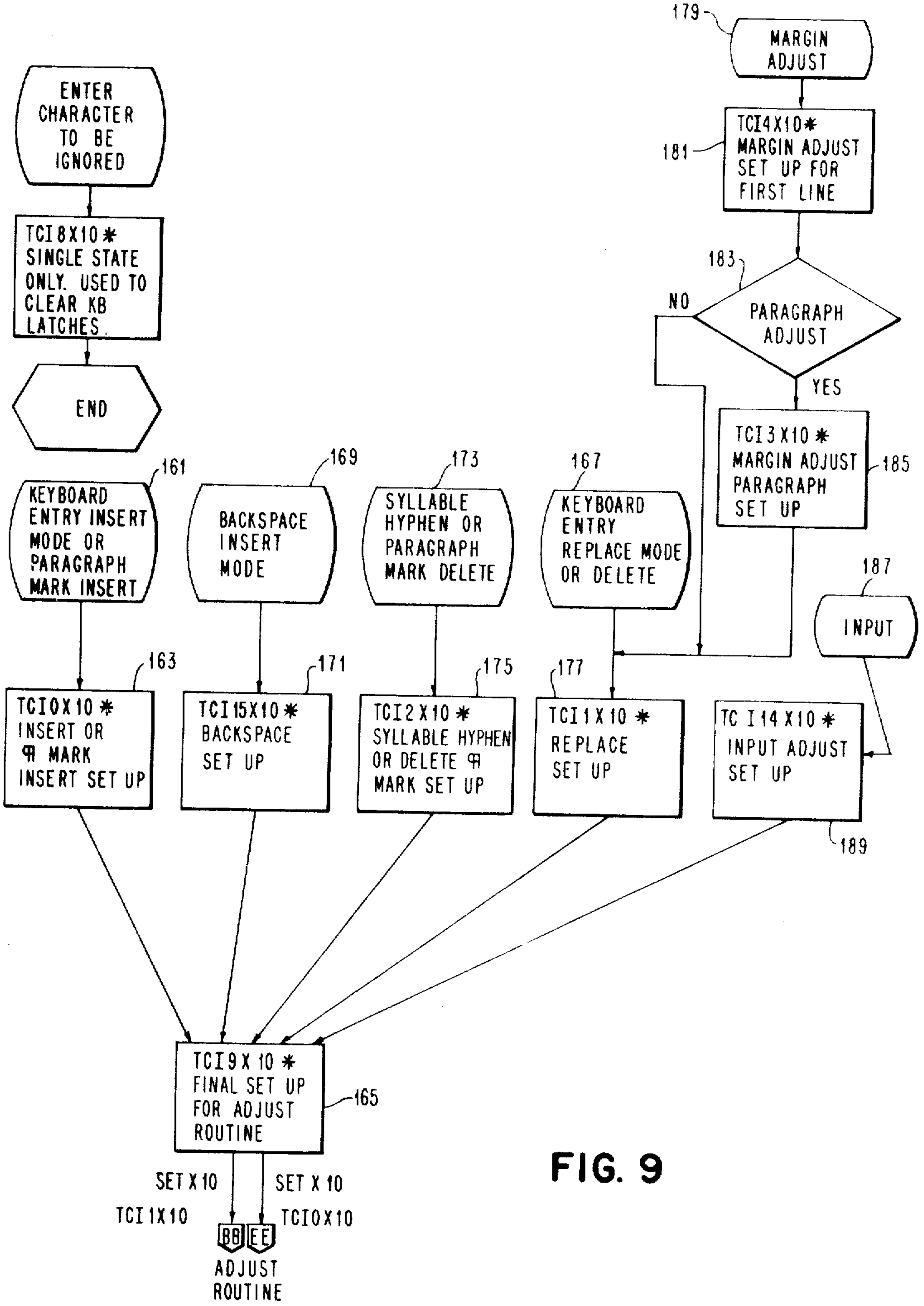

FIG. 9 is a block flow diagram showing machine operations which effect a word optimization operation.

Figure 10:
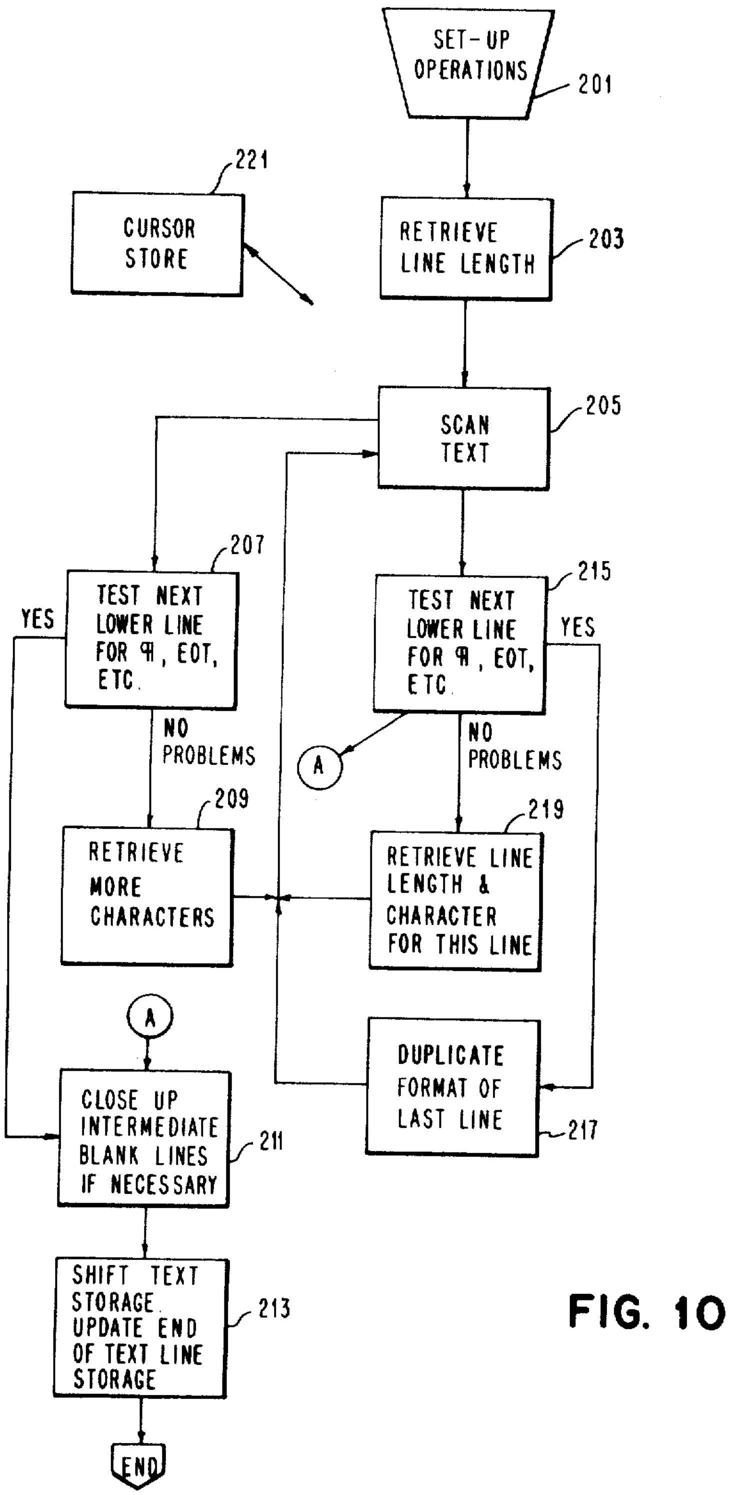

FIG. 10 is a block flow diagram of the system operation during a word optimization operation.

Figure 11:
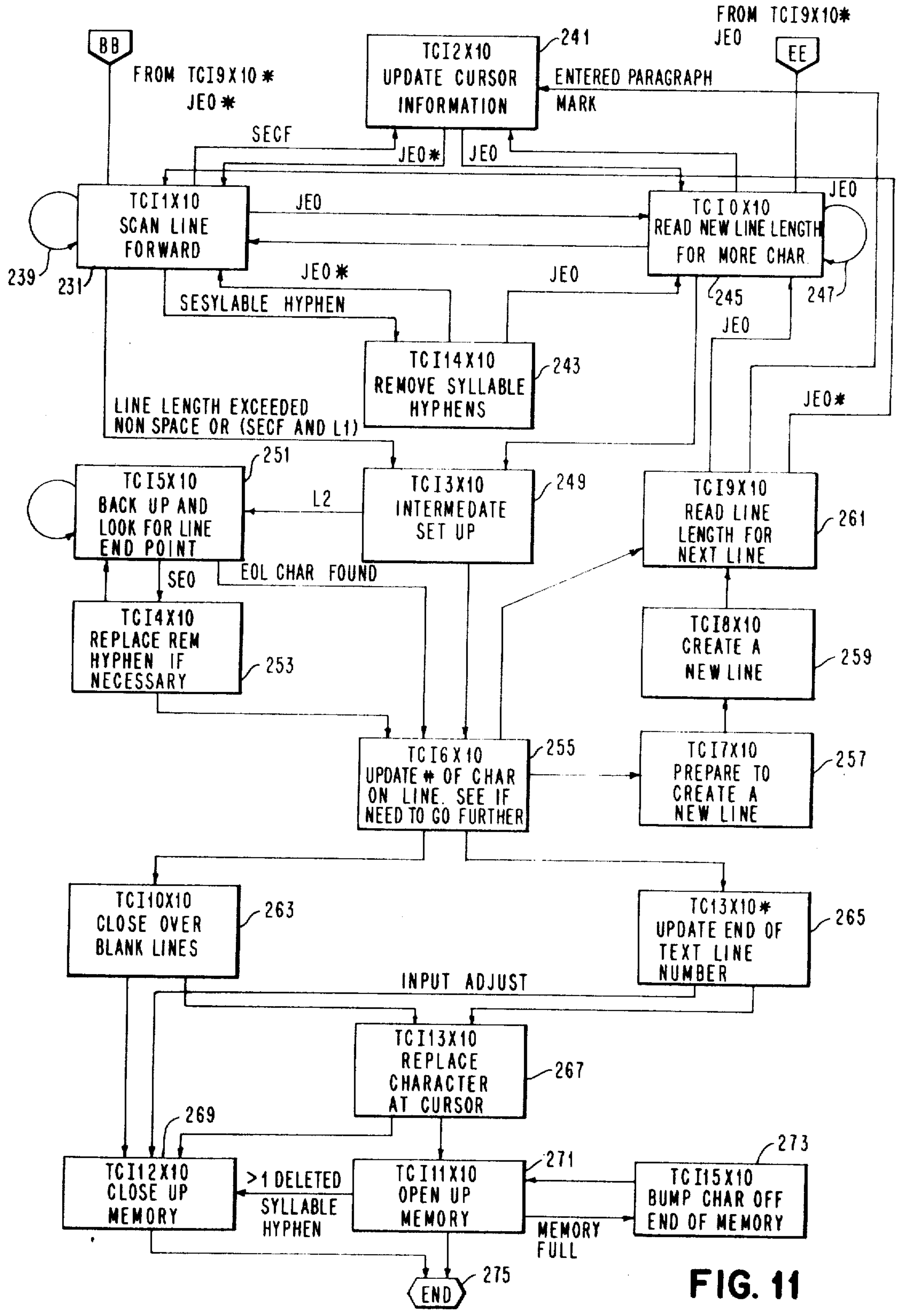

FIG. 11 is a detailed machine state flow diagram of the word optimization operation.

Figure 12:
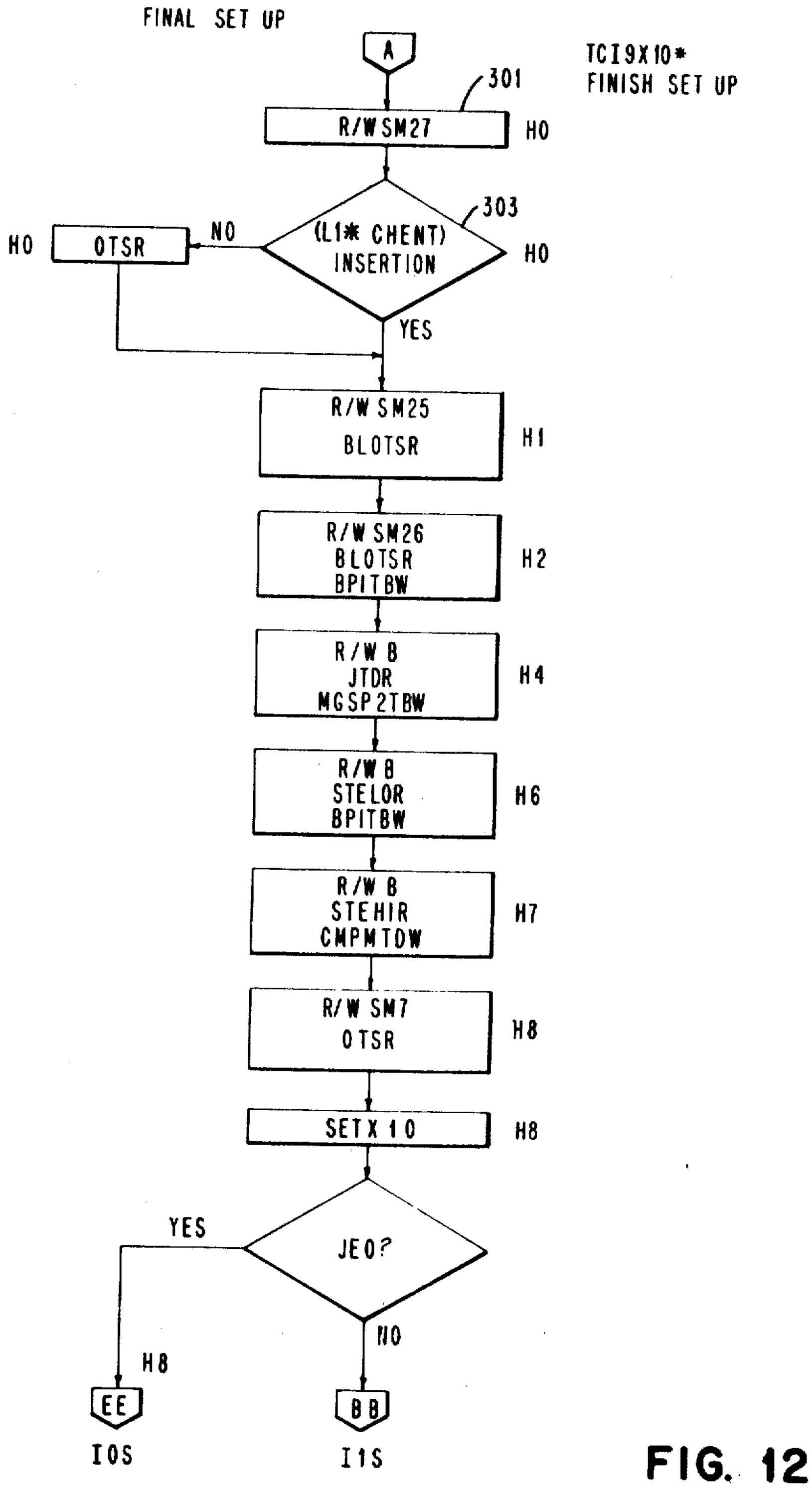

FIG. 12 is a detailed flow diagram of the first portion of the word optimization operation.

FIGS. 13, 14, 15, 16, 17, 18, 19, 20, 21, 22, 23, 24, 25, 26, 27 and 28 are detailed flow diagrams of the system operation during a word optimization operation.

Figure 29:
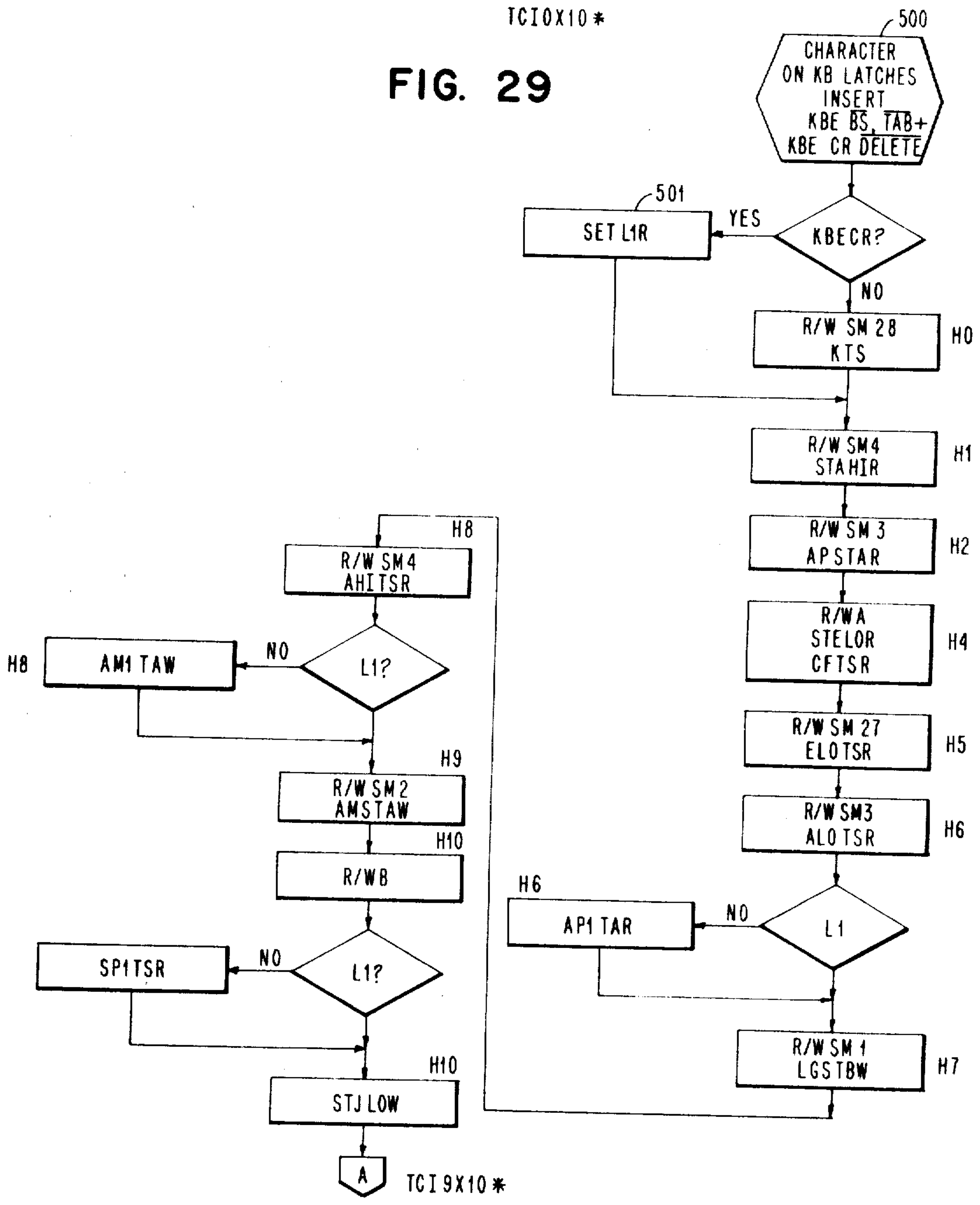

FIG. 29 is a flow diagram of the system set up operation for a character insertion or paragraph mark insertion operation.

Figure 30:
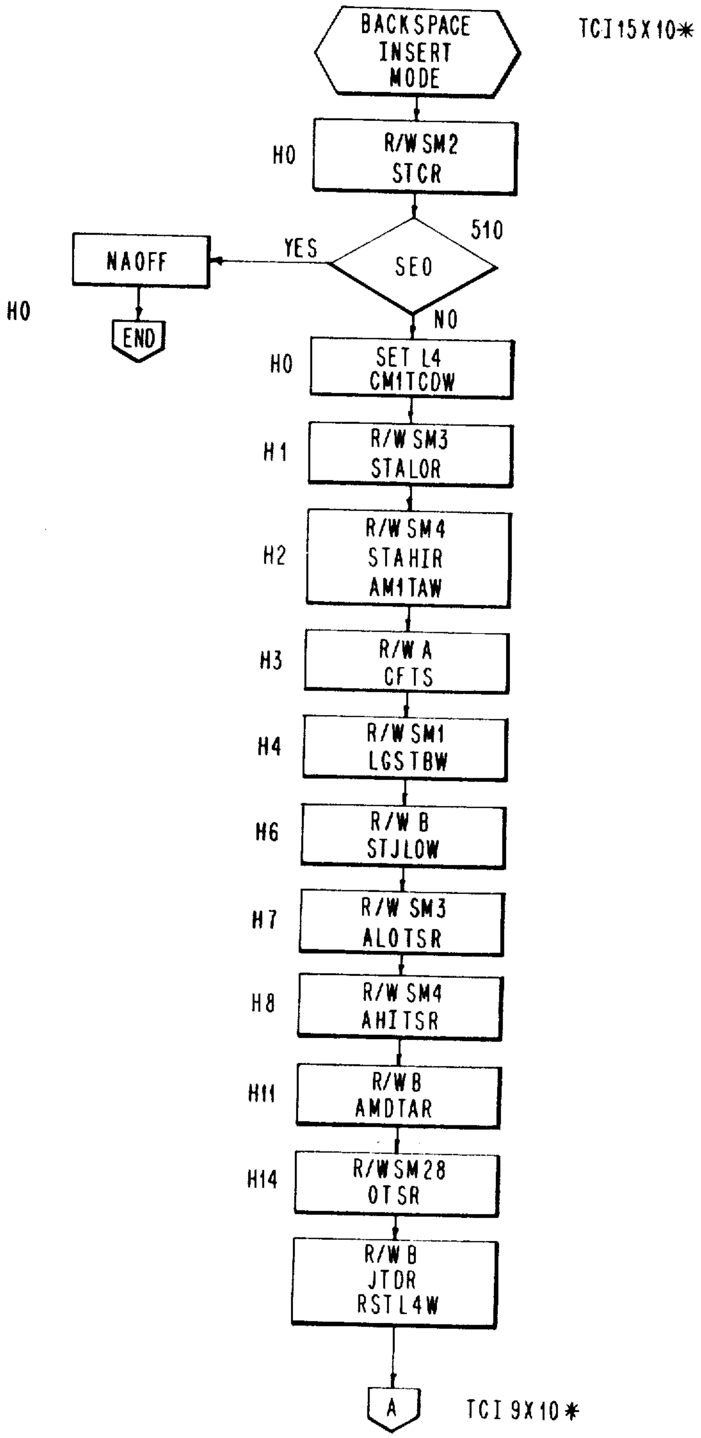

FIG. 30 is a flow diagram of the system set up operation for a backspace operation.

Figure 31:
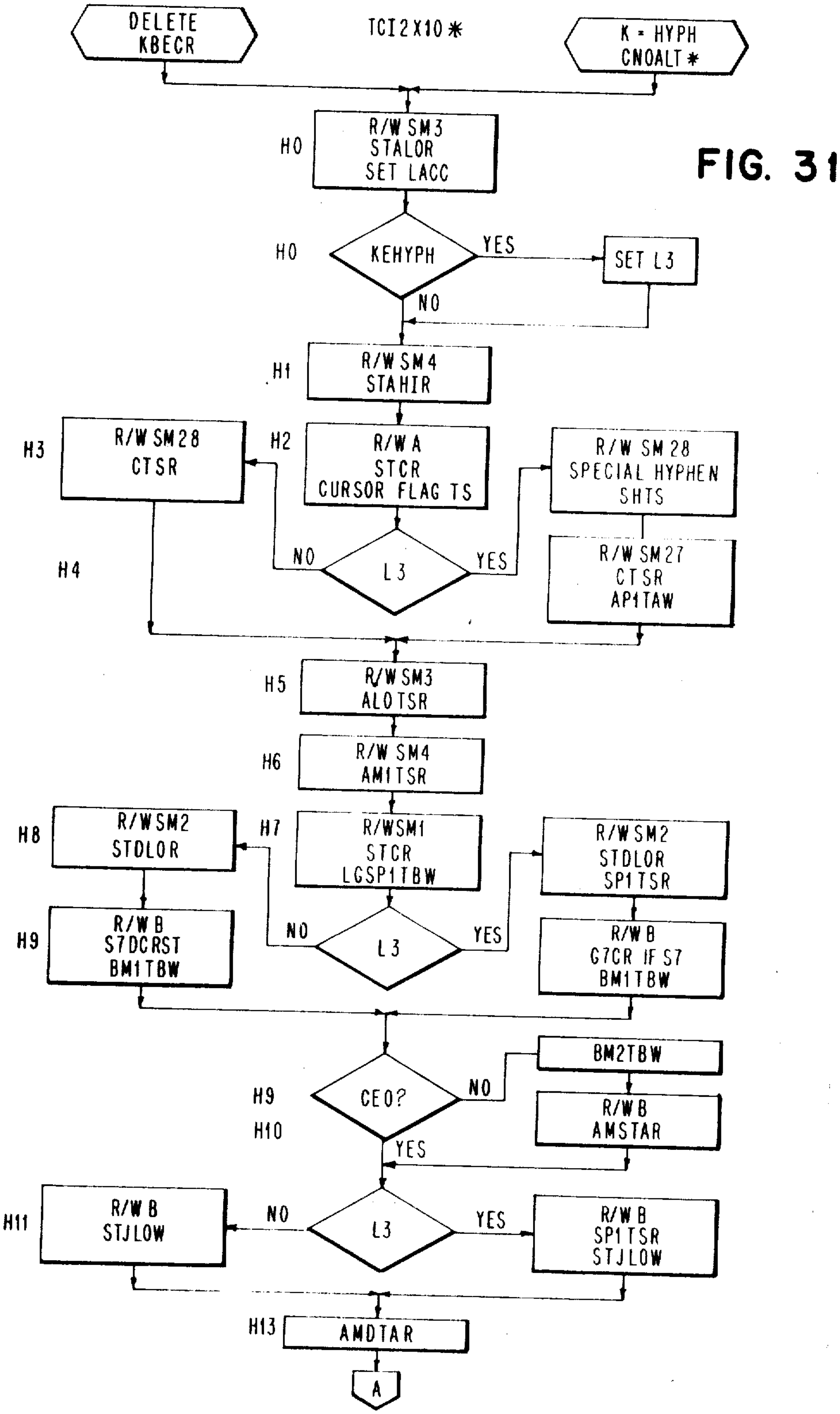

FIG. 31 is a flow diagram of the system set up operation for a paragraph mark deletion or syllable hyphen insertion operation.

Figure 32:
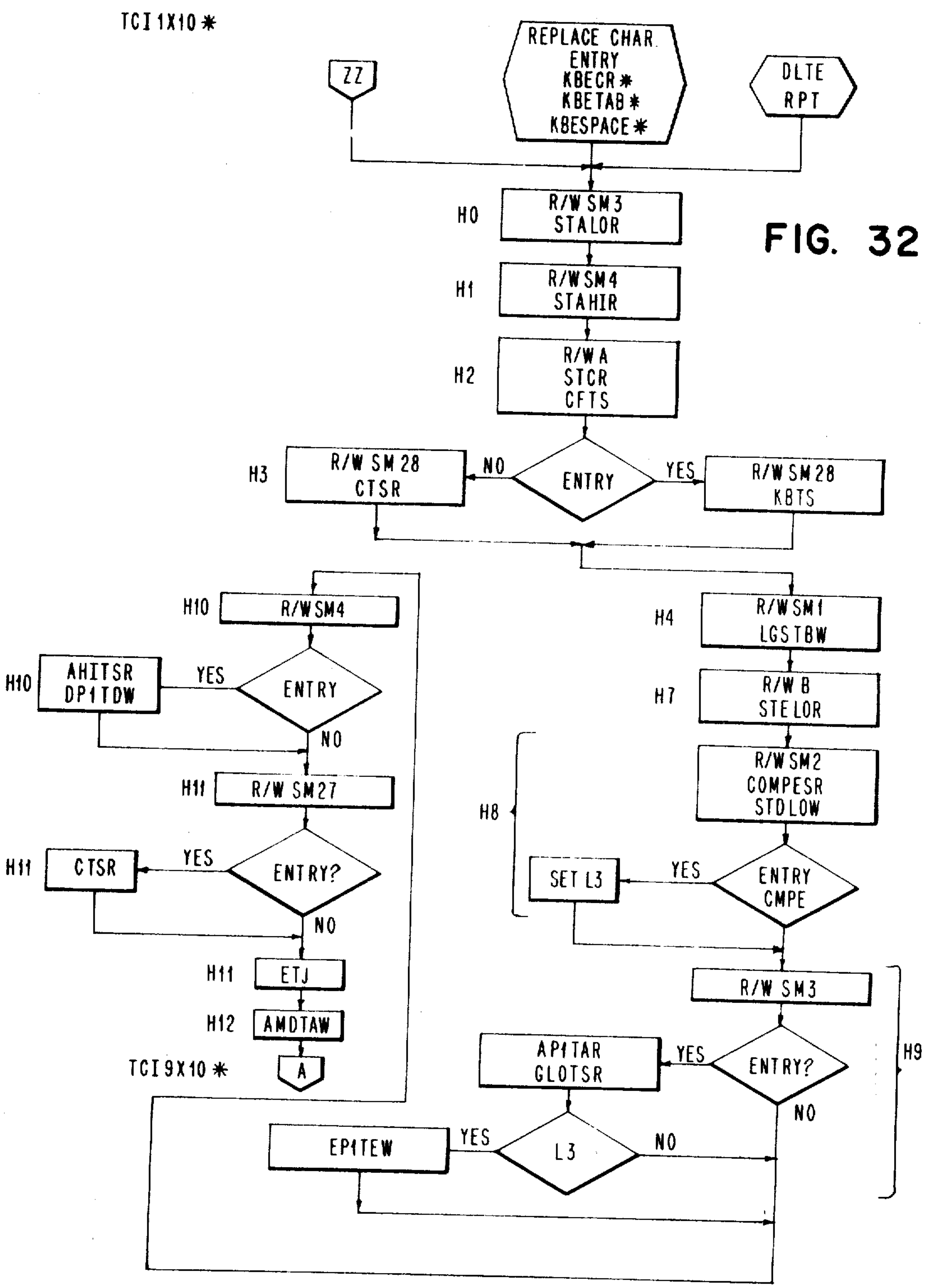

FIG. 32 is a flow diagram of the system set up operation for a character replace operation.

Figure 33:
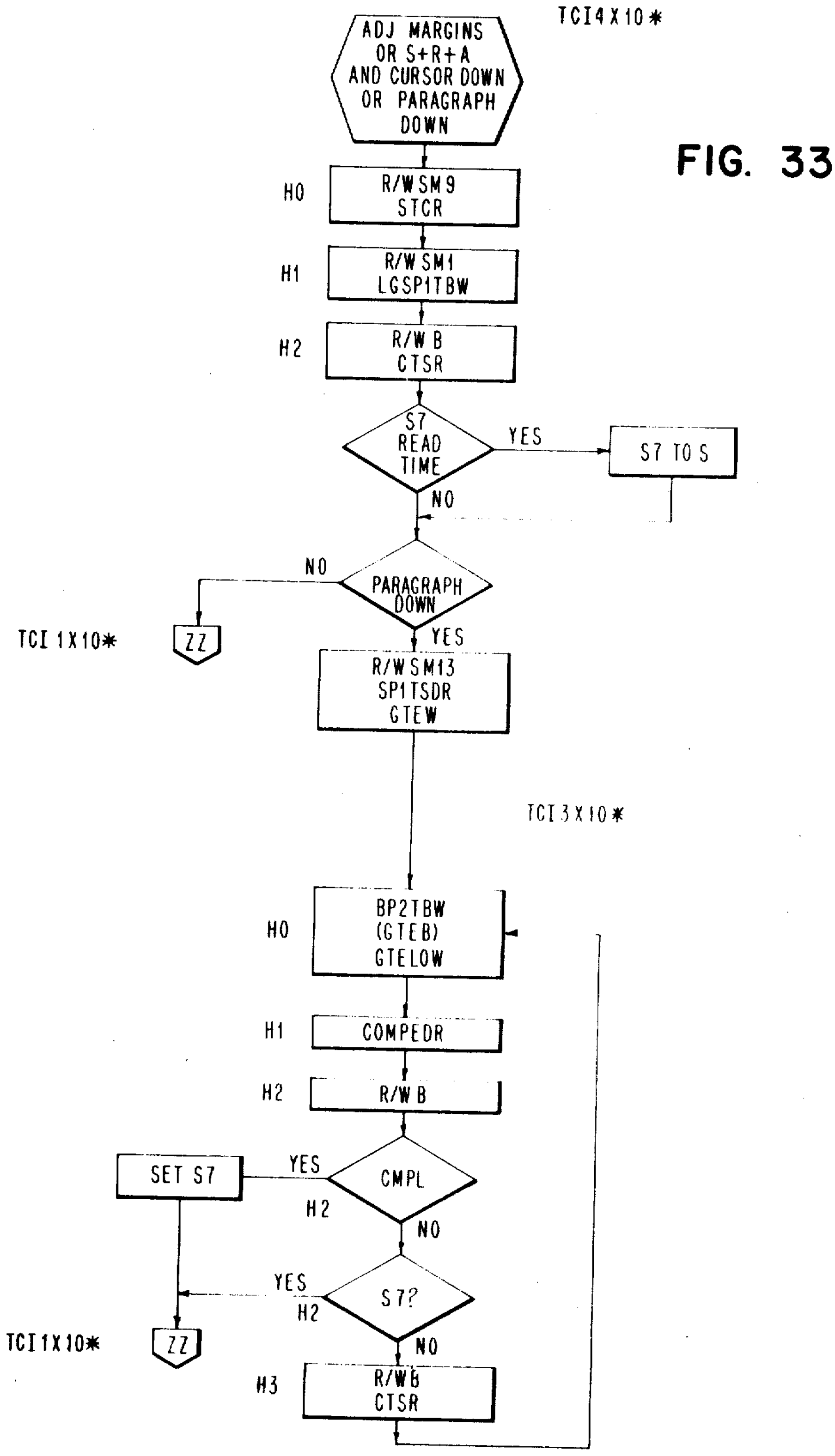

FIG. 33 is a flow diagram of the system set up operation for a margin adjust operation.

Figure 34:
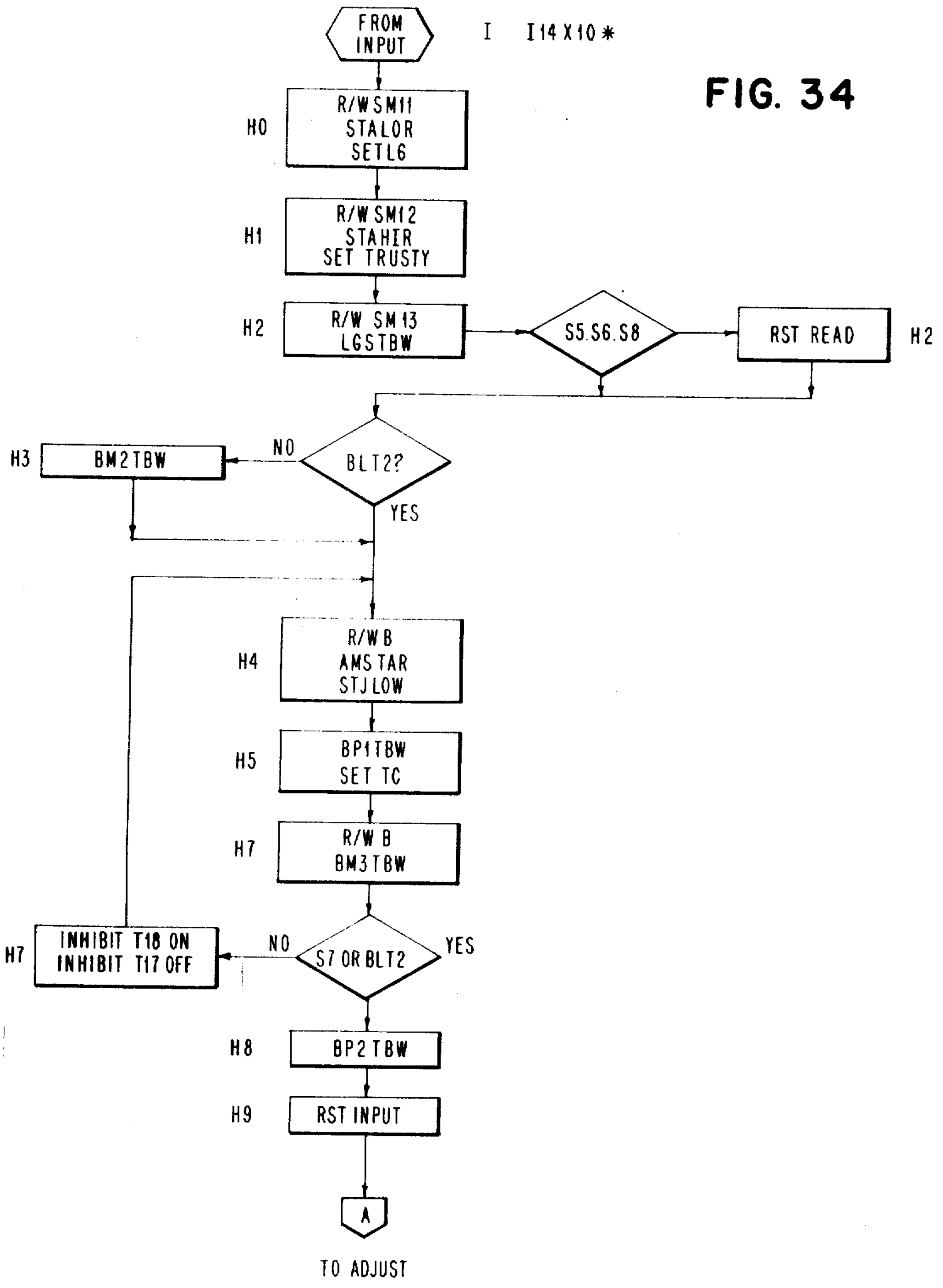

FIG. 34 is a flow diagram of the system set up operation for an input adjust operation.

Figure 35:
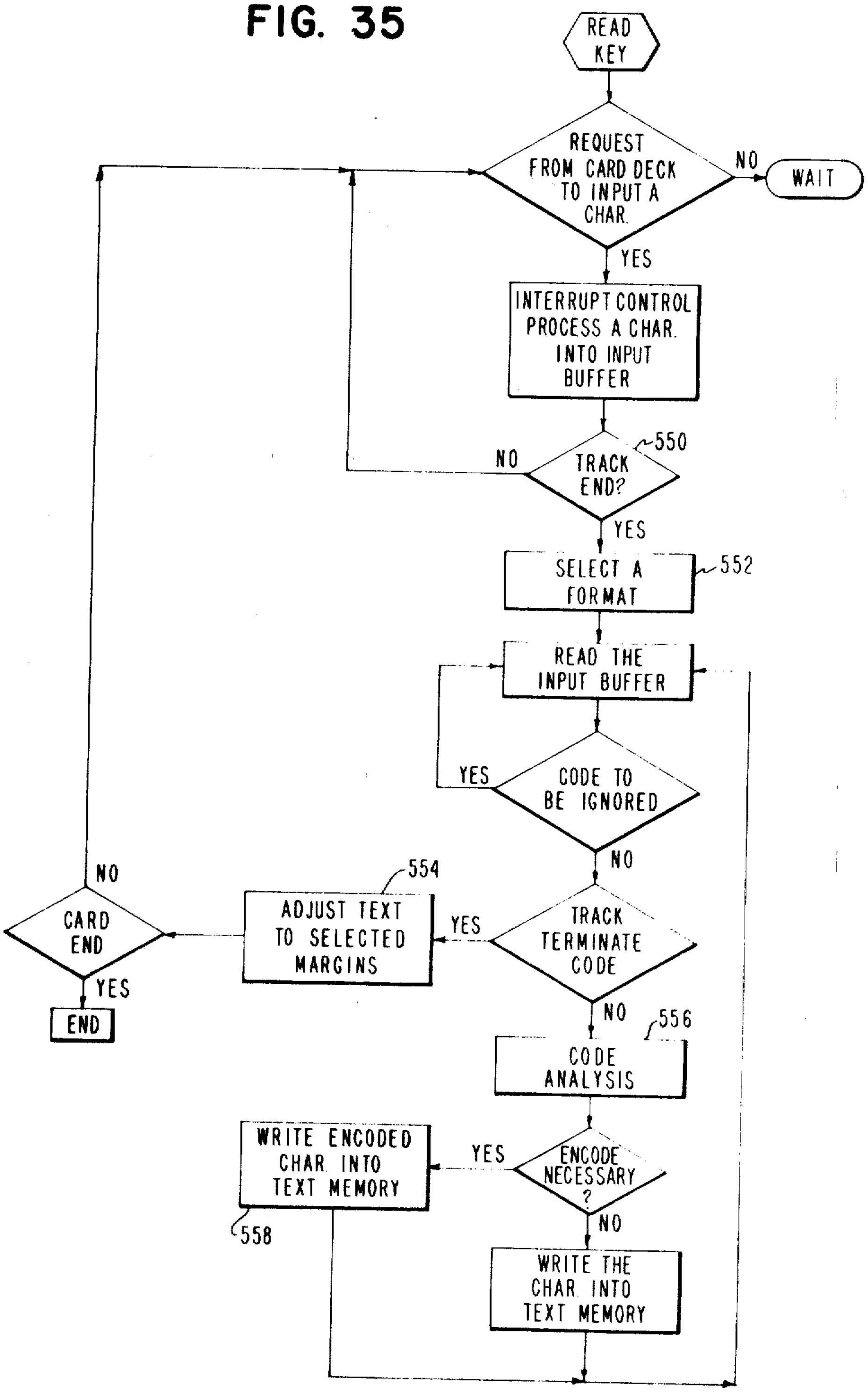

FIG. 35 is a flow diagram of the system data input operation.

Figure 36:
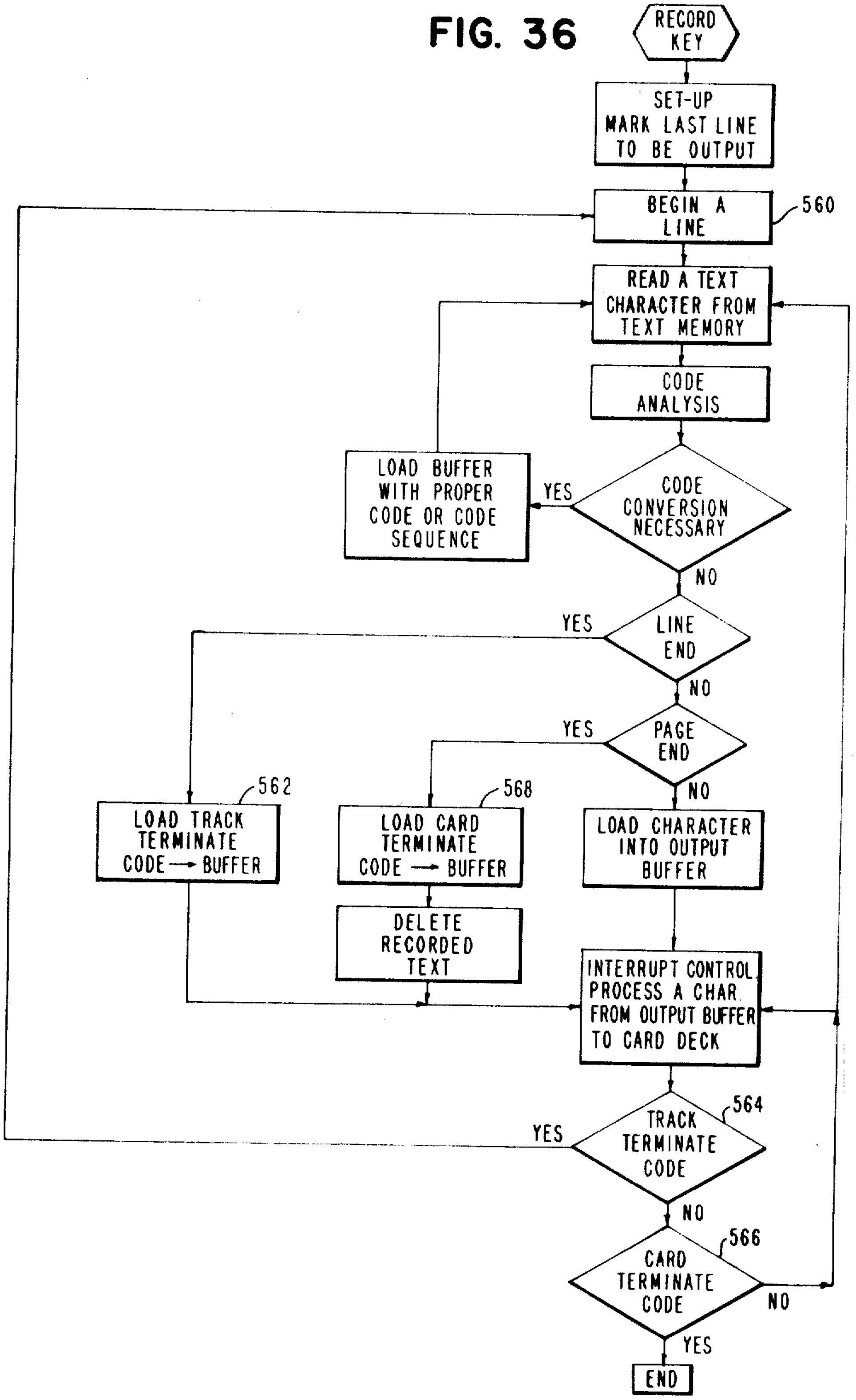

FIG. 36 is a flow diagram of the system data output operation.

Figure 37:
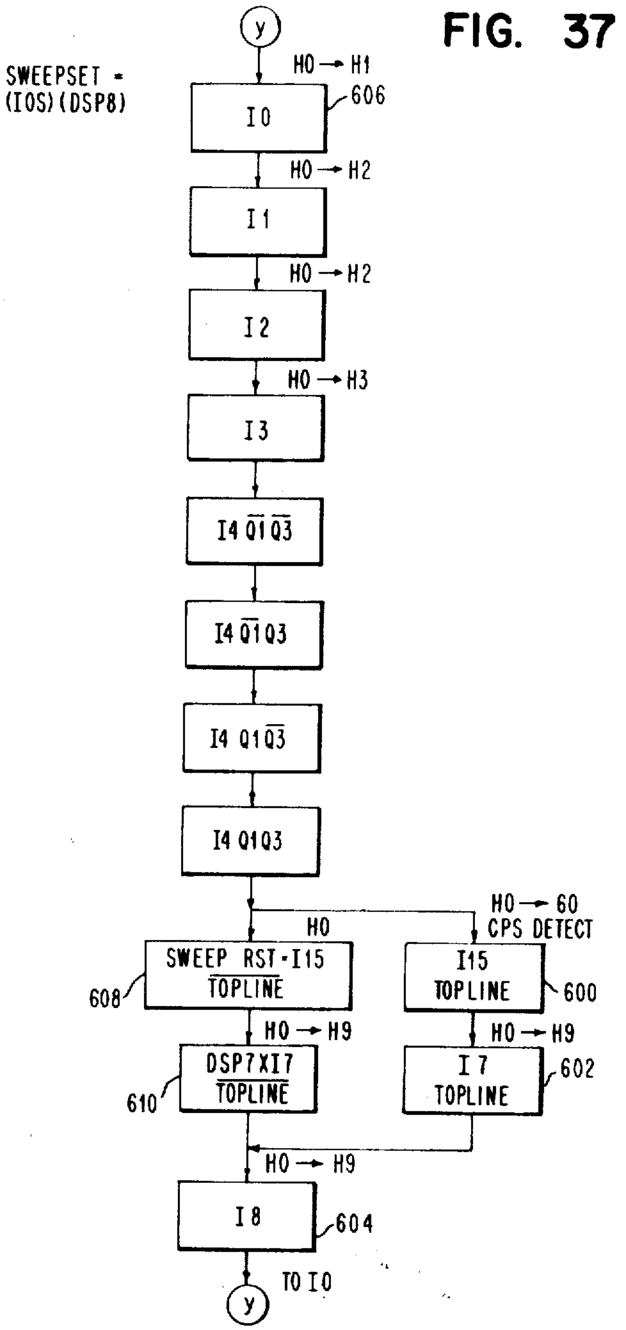

FIG. 37 is a detailed machine state flow diagram of the display operation.

FIGS. 38, 39, 40, 41, 42 and 43 are detailed flow diagrams of the system operation during a display operation.

Figures 43, 44:
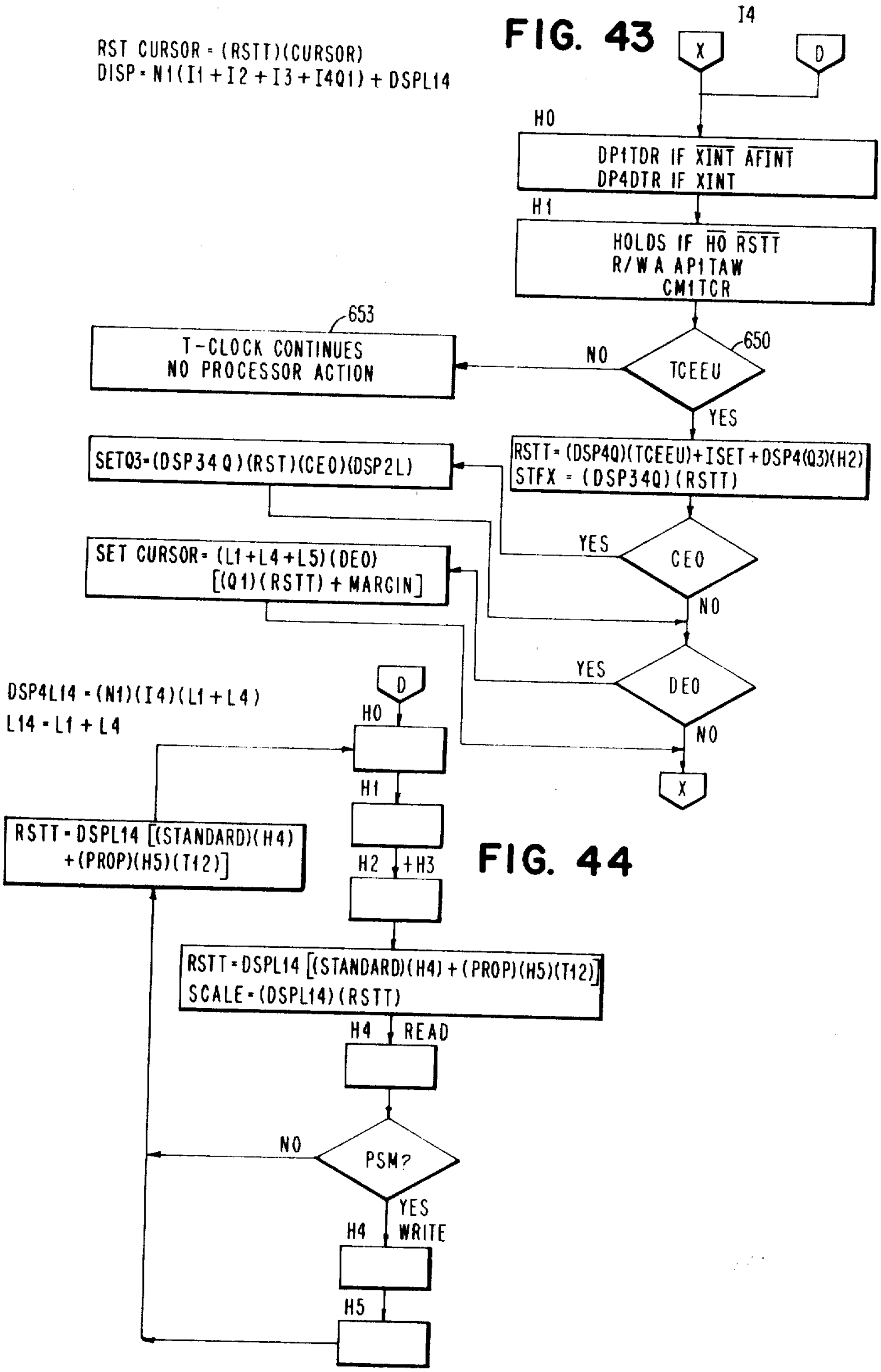

FIG. 44 is a flow diagram of scale display operations.

Figure 45:
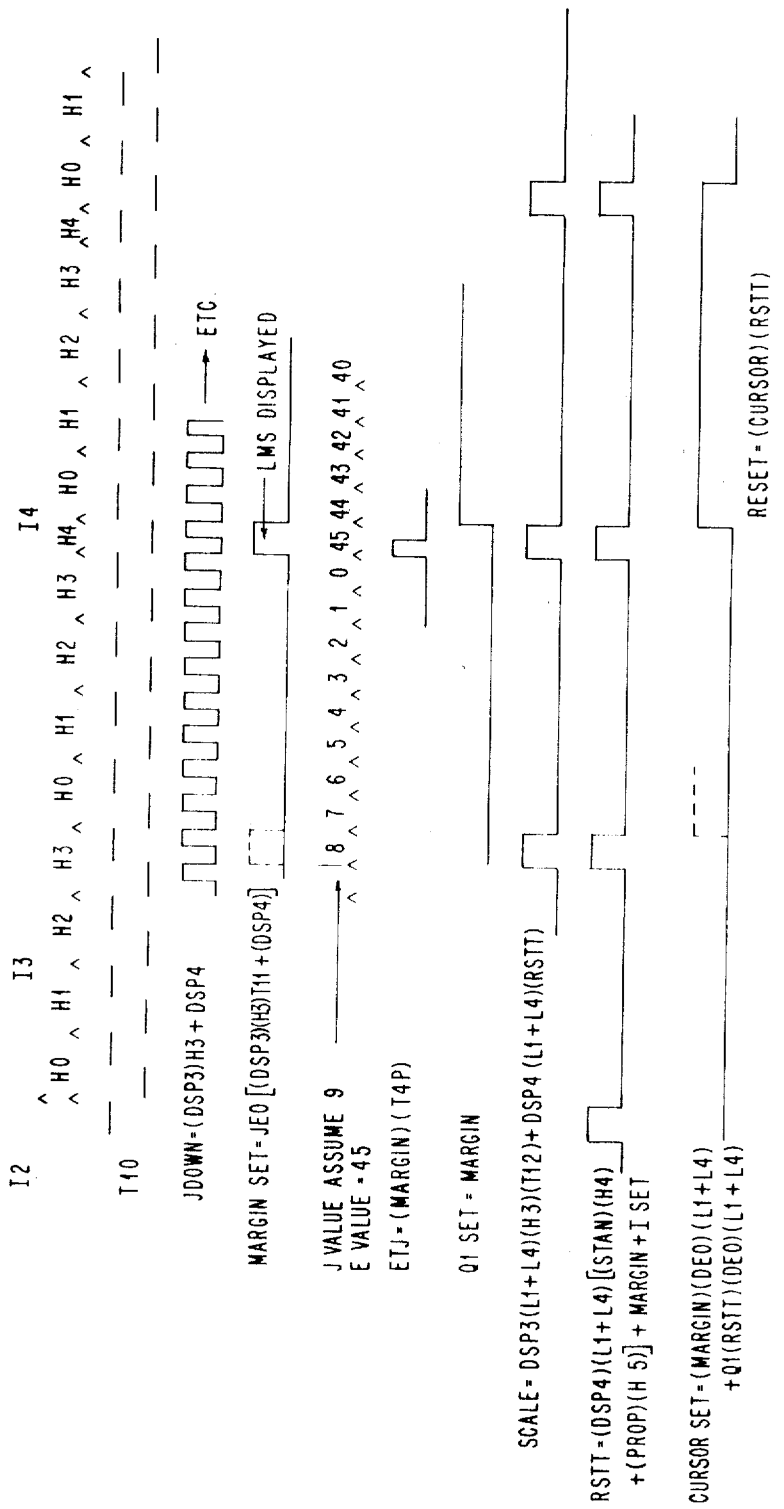

FIG. 45 is a timing diagram of the system during a portion of the display operation.

Figures 46, 48:
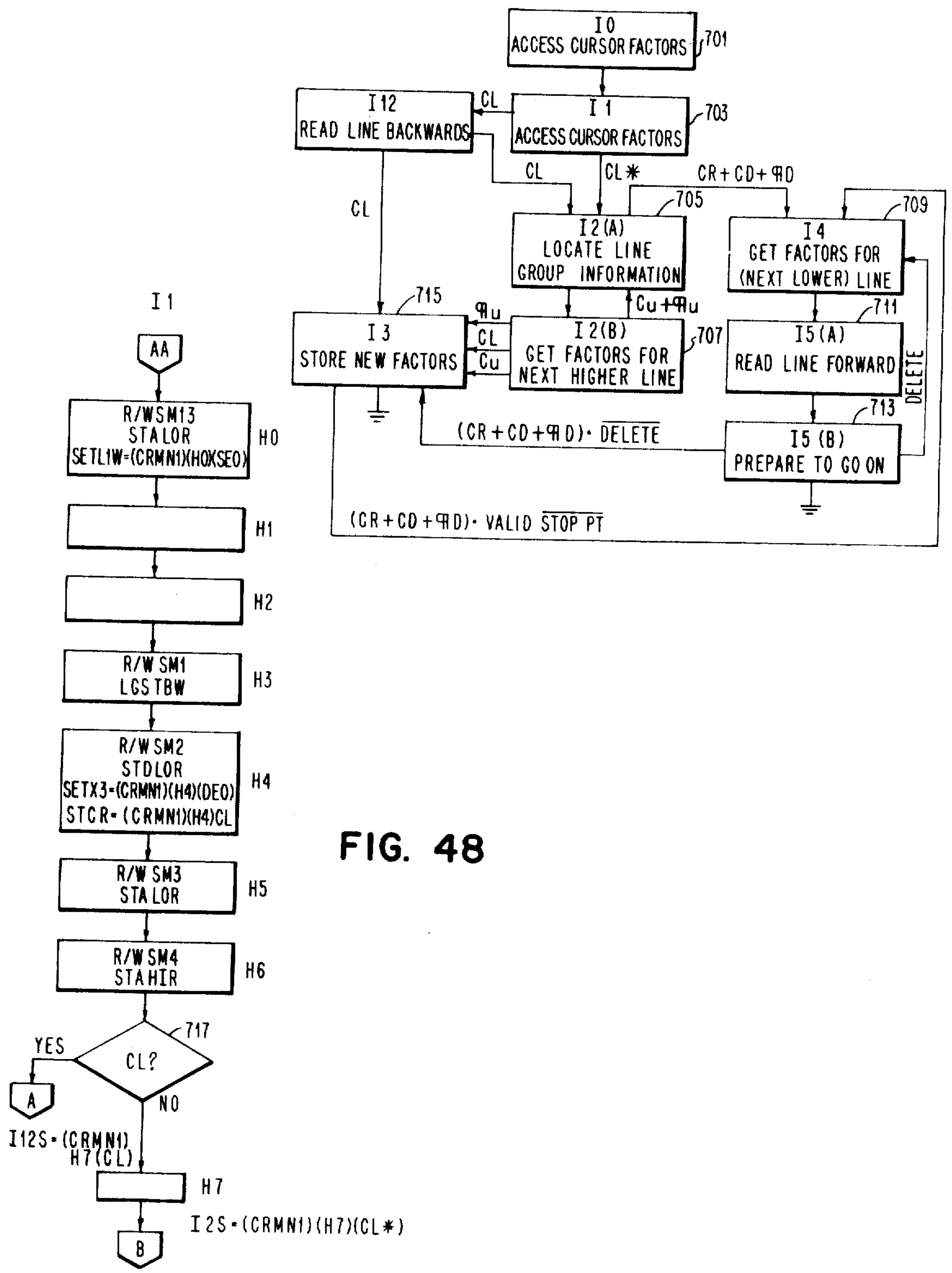

FIG. 46 is a detailed machine state flow diagram of the cursor motion operation.

FIGS. 47, 48, 49, 50, 51, 52 and 53 are flow diagrams of the system operation during cursor motion operations.

Figures 54, 55:
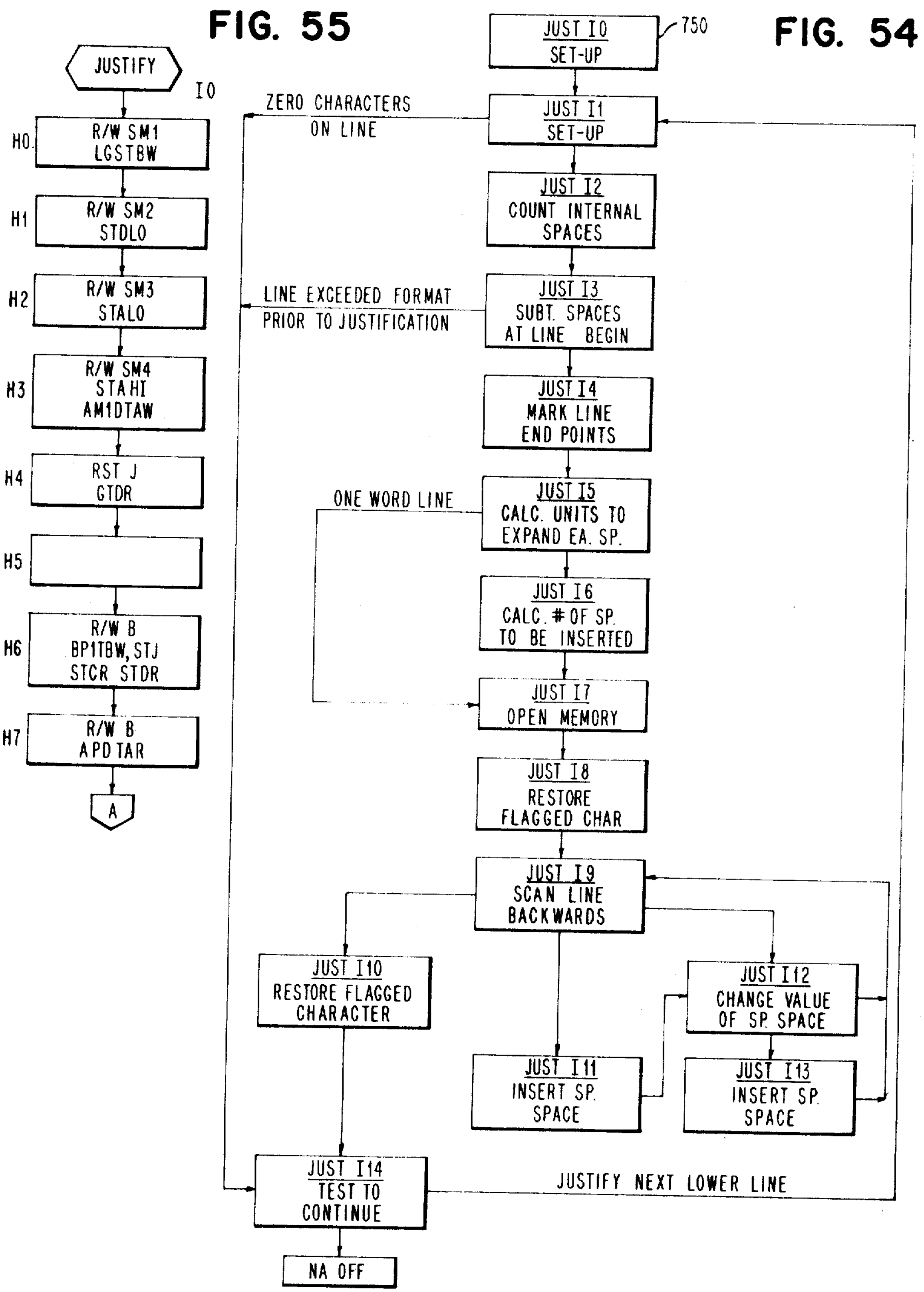

FIG. 54 is a detailed machine state flow diagram of the justification operation.

FIGS. 55, 56, 57, 58, 59 and 60 are flow diagrams of the system operation during justification operations.

Figure 1:
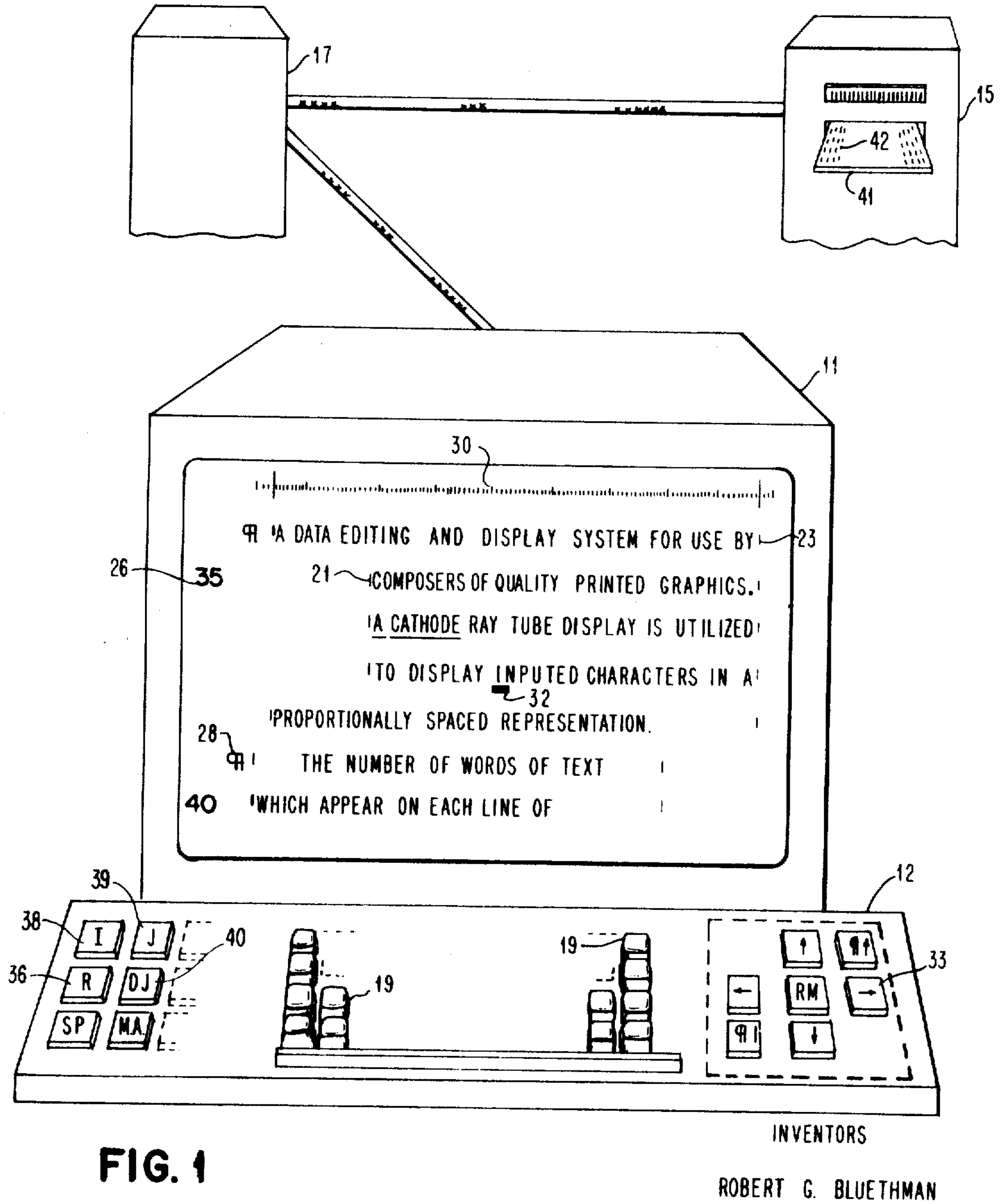
FIG. 1 is a pictorial illustration of the visual editing system incorporating controls for justifying and dejustifying displayed text.

Referring now to FIG. 1 of the drawings, a pictorial illustration of the visual editing system incorporating controls for justifying and dejustifying displayed text is depicted. This system includes a display device 11, a typewriter and control keyboard 12, a magnetic card reader-recorder unit 15, and a processor 17. Bulk text information is entered into the text storage unit (67 FIG. 2) of the processor 17 from the magnetic card unit 15 or from selected keys 19 of the control and typewriter keyboard 12. Information thus entered into the text storage unit is processed in accordance with its information content and displayed on the display unit 11. The processor 17 optimizes the number of words which appear between the left margin boundary 21 and the right margin boundary 23 of each line of display. In the illustration, fewer words than normally fit on a line are depicted due to space and legible letter size requirements.

The processor 17 determines which lines of the page are being displayed and effects the display of line numbers 26 to facilitate the operator in locating specific portions of the text. Additionally, a special paragraph mark 28 is displayed adjacent to those lines on which a new paragraph is started. As will be described hereinafter, the word optimization operation proceeds on a paragraph basis. That is, words which are pushed off of one line of display when additional words are inserted in that line become the first word of the next line of display unless that next line is the beginning of a new paragraph. In this case, the pushed off word is placed on a newly created line located between the optimized line and the first line of a new paragraph. In a similar manner, words are drawn up page when there is sufficient blank space at the end of a line unless the word is the first word of a new paragraph. When blank lines are thus created, they are deleted from the display.

A special scale 30 may be displayed adjacent to the text characters. This scale enables the operator to determine in inches the width value of the line displayed. This information is utilized when the data displayed is later outputed to a printer. The generation and correlation of these scales to the text is described in detail in the aforereferenced concurrently filed application of Robert L. McConnell et al.

A special cursor mark 32 is displayed adjacent to text character locations and signifies visually to the operator the action point of various operations. Thus, if the operator desired to delete a character, or to insert a character, the character thus deleted or inserted would be placed adjacent to the cursor 32. The cursor is moved about the display 11 under the control of a cursor motion keyboard 33. By depressing the appropriate keybutton on the cursor keyboard 33, the cursor can be moved to the right or to the left, a character at a time, or a word at a time as will be described hereinafter. Additionally, the cursor may be moved upward or downward a line at a time or may be moved upward or downward to the next line containing a paragraph mark 28. When the cursor is moved off of that portion of text displayed, for example, from line 40 to line 41, the next successive eight lines of display are placed on the display unit 11. Thus, line 41 of the display would be located on the top line.

As has been described, various modes of operation for the system can be defined by the operator who depresses the appropriate keybuttons on the control keyboard 12. For example, when it is desired to insert a character adjacent to a displayed character, the cursor 32 is moved to the displayed character and the operator places the system in the insert mode by depressing the keybutton 38. Thereafter, characters entered from the typewriter keyboard keys 19 are inserted between the character adjacent to the cursor location and the character immediately to the left of the cursor location. As characters are thus inserted, the character located adjacent to the cursor is shifted to the right in accordance with the amount of text entered. The characters located to the right of the cursor character in a line are similarly shifted to the right. Whenever a character forming a portion of the word is pushed beyond the right margin boundary 23, the entire word of characters is placed on the next line of display.

As has been described, a representation of the left margin boundary 21 and a representation of the right margin boundary 23 is displayed for each line of display. These margin boundaries are specified by the operator who can insert up to 16 different sets of margin boundaries into the processor 17. Thereafter, the operator specifies the set of margin boundaries to be associated with the various lines. As can be observed, three different sets of margin boundaries are associated with the illustrated display. Once the information is displayed within the selected margin boundaries, the operator may decide that a different set of margin boundaries could be utilized to better display the text. The operator may then select a different set of margin boundaries for the line of text addressed by the cursor character 32 or for the entire paragraph of text addressed by the cursor character 32. The text is then reformed so that the optimum number of words appear within the newly selected margin boundaries.

Once the margin boundaries have been ascertained and the text has been corrected, the operator may depress the justify keybutton 39 located on the control keyboard. Thereafter, the operator either depresses the line down or paragraph down keybutton. If the line down key button is selected, the line addressed by the cursor character 32 has extra innerletter spacing distributed between words of characters so that the last non-space character is located adjacent to the right margin. The extra spacing is distributed equally to each of the interword positions. If the paragraph down keybutton on the cursor control keyboard 33 is depressed, each of the lines of text within the paragraph of text addressed by the cursor is justified in a similar manner. It is to be noted that each line is justified within the set of margin boundaries unique to it. With reference to the pictorial illustration, the first paragraph has been justified while the second paragraph is displayed in unjustified form.

As has been described, once the text is justified, the operator may decide that further text or format changes are desirous. If, for example, it were desirous to insert the word "the" immediately to the left of the cursor 32, the first letter keyed would cause the letter "A" to be located beyond the right margin boundary 23 thereby causing it to be displayed as the first character of the next line. In a similar manner, the typing of the second character would cause the deletion of the inter-word space between the character words "IN" and "A." The third character keyed would cause the word "IN" to appear as the first word on the next line. However, if the extra inter-word spacing were removed, it might be possible that the word "IN" would fit on its original line. Thus, it is desirous to dejustify the displayed justified text thereby removing extra interword spacing prior to making text changes. This is because the number of words that appear on each line between margins is optimized and removal of extra inter-word spacing prior to adding new words allows the newly changed line to be re-optimized. The thus re-optimized line may then be justified. Therefore, a dejustify key 40 is placed on the keyboard, the depression of which effects the removal of the extra interword spacing. Thereafter, the operator makes the insertion and format changes necessary for the dejustified paragraph and thereafter rejustifies the thus changed paragraph by depressing the justify key 39.

As has been described, previously keyed bulk text is entered into the processor 17 from a magnetic card reader-recorder unit 15. A magnetic card 41 containing parallel tracks 42 of serially recorded character information is inserted into the card reader recorder 50 and read into the processor 17 in a manner to be described hereinafter. Once the text has been modified, edited, formatted and justified by the operator of the display system, the text is outputed from the processor 17 and recorded on a blank magnetic card 41 located in the magnetic card reader-recorder unit 15. The amount of inter-word spacing is specified by the space character representation in the processor 17. That is, a four unit space character has a particular binary code associated therewith while a five unit space character has a different binary code associated therewith, etc.

Once a magnetic card has been recorded with the character and spacing information located thereon, it may be utilized to control the operation of a printer such as a typewriter device or composer device or can be utilized to control a photoprinter device. Various forms of input/output devices can be utilized, such as, for example, paper tape reader-recorders, magnetic tape reader-recorders, etc.

The following general description relates to the overall configuration and operation of the processor 17 and the manner in which it controls the display device 11, the card reader-recorder unit 15 and the control and typewriter keyboard 12 while simultaneously performing text control operations to effect the display of the optimum number of words on each line of display and to effect the justification and dejustification of the displayed test. The first section to be described relates to the overall system configuration. Thereafter, sections relating to the word optimization operation, the input/output operation, the display operation, the cursor motion control operation, and the justify-dejustify operation are described.

Figure 2:
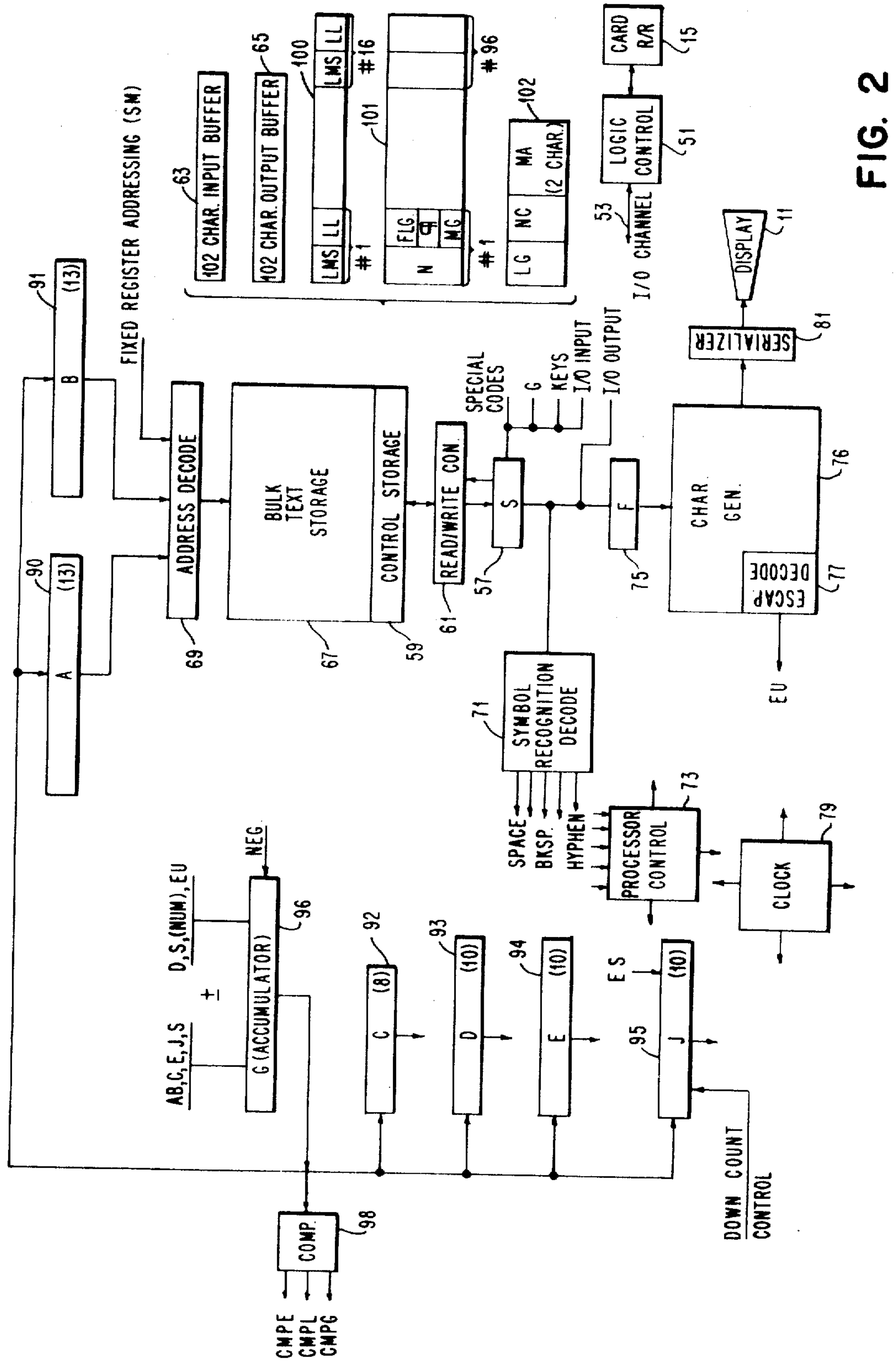
FIG. 2 is an overall block diagram of the data editing system.

Referring now to FIG. 2 of the drawings, an overall block diagram of the data editing system of the present invention is depicted. As has been described, bulk text is inputed into the system from the card reader recorder 15. Information sensed by the card reader recorder is gated under the control of logic control unit 51 through the input/output channel 53 to the sense register 57 of the data editing system. Characters thus read in are gated from the sense register 57 to the control storage 59 under the control of read-write control 61. The control storage 59 includes a 102 character input buffer 63 and a 102 character output buffer 54. Characters which are accumulated in the input buffer 63 are transferred to the bulk text storage unit 67 at adjacent bulk text storage addresses defined by the address register decode 69. As the characters are transferred from the input buffer 63, they are gated first to the sense register 57 and decoded by the symbol recognition decode 71 which indicates the type of text character, such as a space code, backspace code, hyphen, etc. that has been received. The processor control 73 is responsive to the symbol recognition decode 71 to effect placement of the symbol in the bulk storage or to cause the symbol to be deleted from the data stream which is transmitted to the bulk storage 67. Alphabetic and numeric character symbols which are received are all placed in the bulk text storage while typewriter function codes, input/output control codes and other special symbols are not stored in the bulk text storage. The processor control 73 is responsive to those special codes, however, to effect proper system response. Additionally, the processor control 73 is responsive to the text alphabetic and numeric characters received to determine their escapement value and placement within a line of displayed text as will be described hereinafter. The primary function of the processor during this latter operation is to optimize the number of text words which appear on the displayed lines of text storage. These words are optimized in accordance with the boundaries for the displayed lines which are defined by the system operator.

After the information in the 102 character input buffer 63 has been transferred to the bulk text storage 67, the logic control unit 51 initiates further input from the card reader recorder 51 to the character input buffer. During this input operation the characters which have been received in the bulk text storage are displayed on the display unit 11. Display is effected on a time interleaved basis with the input of characters from the I/O channel. Thus, characters are gated to the sense register 57 and thence to the F register 75. The character located in the F register is decoded by the escapement decode 77 which provides an output signal indicating the number of scan lines for the particular character. Additionally, the clock 79 provides clocking signals to the character generator which effects the generation of a unique pattern associated with each scan line of each character. This pattern is serialized by the serializer unit 81 which controls the display 11 in a conventional manner. Such operation is generally described in the aforereferenced co-pending application of Paul E. Goldsberry et al. Once the complete character has been displayed as discovered by comparing the value of the escapement decode with the scan line being processed in the character generator, the next character to be displayed is transferred from the sense register 57 to the F register 75.

A plurality of registers are associated with the processor and are utilized to perform various arithmetical, addressing and storing functions. As described heretofore, as each character is inputed into the storage unit, it is examined to determine its escapement value and groups of characters are examined to determine the optimum number of words of characters than can fit onto a display line. The registers are utilized to perform the arithmetic operations necessitated by this process. These registers include the A register 90 and the B register 91 each of which are 13 bit trigger registers used primarily to address characters in the bulk text storage unit 67 and the control storage unit 59. The C register 92 is an 8 bit trigger register primarily utilized to count the number of characters on a display line. The D register 93 is a 10 bit general purpose trigger register utilized for various functions, such as storing the horizontal position of the cursor symbol. The E register 94 is a 10 bit trigger register primarily utilized to hold the weight in escapement units of a line of displayed characters. The J register 95 is a 10 bit trigger reverse counter. It is used for various functions such as escapement unit computation and display of margin boundary definitions on the display unit. The G accumulator 96 is a 13 bit accumulator. The contents of two of the registers 90–95 as well as the contents of the sense register 57 and the output of the escapement decode 77 can either be added or subtracted by the accumulator. The compare unit 98 is responsive to the accumulator to detect a zero condition and the borrow from the high order bit during a subtract operation to indicate a compare less (CMPL), a compare greater (CMPG), or a compare equal (CMPE).

As has been previously described, the operator can select the margin boundaries for each displayed line and the input text is conformed to these boundaries. In order to facilitate processing the text information and to assure that the optimum number of words appear between the selected but variable text boundaries, certain factors are retained in the control storage and accessed under special gating control. In one such storage "register" of the control storage 59, register 100, operator selected left margin boundaries and corresponding line lengths are stored. In the particular configuration described, the operator can select up to 16 sets of left margin boundaries and corresponding line lengths. Thereafter, the operator can specify one of the sets of left margin and line length information for each of line 96 lines of display. Thus, the operator could enter 16 successive left margin positions and corresponding line lengths. Of course, the specification of the left margin and line length necessarily effects placement of the right margin boundary. Thereafter, the operator can specify, for example, that the first three lines of display are associated with the first group of margin boundaries, the next three lines with the second group, the next five lines with the third group, the next eight lines with the first group, the next 10 lines with the fifteenth group and so on, the number of successive lines associated with the group and the sequence of selection of the group being left to operator determination.

Register 101 also located in the control storage 59 retains information associated with each of the 96 lines of display. For each line of display, the register contains information as to the number of characters in the displayed line (N), the margin group associated with that line corresponding to the margin groups 1–16 in register 100 (MG), whether the line is associated with the beginning of a new paragraph of text information (paragraph mark), and a special flag bit (FLG) utilized for output operations. Each of the 96 lines of the display have these factors associated therewith and stored in the register 101 located in the control storage 59.

Additional factors are stored in register 102 of the control storage 59 relating to the location of the cursor with respect to the characters in the text storage 67. The line of display on which the cursor is located is stored in the register 102 (LG), the number of characters to the left of the cursor in that line is stored in the register 102 (NC), and the memory address in the bulk text storage of the character associated with the cursor mark is stored (MA). These factors along with the line factors retained in register 101 and the margin boundary format information contained in register 100 are utilized and revised during word optimization operations and display operations as will be described hereinafter.

In order to understand the overall sequential operation of the system and the operation of the processor control 73, it is first necessary to have an understanding of the basic timing involved in the system. Thus, the following is the description of the clock 79 which sets up various control times which are utilized to control the gating of information through the processor control 73 and from the bulk text storage 67 to and from the various registers described above. Referring now to FIGS. 3 *a*, 3*b*, and 3*c*, a timing diagram of the various logical states of the clock 79 is depicted. The clock 79 of FIG. 2 consists of a plurality of bistable devices which gate one another to provide output signals. Each of the waveforms of FIG. 3 represents the output of one such bistable device. Outputs T1–T10 of FIG. 3A are utilized to define dot times one through 36. Thus, each of the dot times labelled 1–36 in FIG. 3A is defined by a unique combination of output signals T1–T10. The dot times are primarily utilized to effect display of characters on the display unit 11 of FIG. 2. For example, during the first three dot times the electron beam is blanked and deflected to the start of a scan line sweep. During the next 15 dot times, the electron beam is selectively unblanked under the control of the character generator to provide a vertical row of up to 15 illuminated dots thereby forming a segment of a displayed character. The 19th through 21st dot times are utilized to blank the beam and effect its motion to the start of the next scan line. The next scan line is effected during dot times 22–36. Thus, two scan lines of a character are displayed during a dot clock interval.

The terms which cause the output of T1 to go positive, or the set terms for T1, are located to the right of the waveform. Additionally, the terms which cause T1 to go negative, or to reset, are also located to the right of the waveform. Thus, T1 is set when both T9 and T0 are down and reset when T9 and T0 are up. T0 is generated by a master oscillator. In a similar manner, each of the set and reset terms for the clocks T1–T11 are defined to the right of the waveform.

As has been described, the clock 79 of FIG. 2 is also utilized to control access to storage, and gating of the various registers. Thus, time T10 defines the read and write cycles of the storage unit which includes the control storage 59 and the bulk text storage 67 of FIG. 2. Time interval T11 defines the first accumulator gate signal. Time interval T12 defines the second accumulator gate signal. Time intervals T19 and T20 define the sample pulses for the accumulator. The memory is read when there is a coincidence of a first current, a second current, a strobe signal, and a gating signal. These signals are defined as input to memory signals. Additionally, when writing information into the storage units, a write current and an inhibit current must be supplied which are further defined as inputs to memory. Time intervals T13 and T14 define those time intervals during which control latches may be set. A reset signal is provided to reset the sense registor 57 of FIG. 2.

In FIG. 3*c*, the read and write cycles os storage as defined by T10 have been drawn to a different scale. Each read and write cycle defines an H cycle as noted by T15. Up to 16 different H times can be defined by the output signals T15–T18.

Summarizing, the clock 79 of FIG. 2 provides output signals which control the scan rate of the cathode ray tube display and control various processor functions. A series of "H" times are defined, each of which consists of a read/write cycle, and two accumulator cycles. Additionally, sample pulses are provided to properly time the access to the contents of various registers. A typical "H" cycle is depicted in FIG. 4 of the drawings.

Referring now to FIG. 5 of the drawings, the relationship of the H clock and an overall machine operation is depicted. The terminology "machine operation" refers to an operation such as a word optimization operation, a display frame operation, a data input operation, etc. Each such operation is in turn defined by a unique sequence of an "I" clock. Thus, for the hypothethical operation depicted, the "I" clock steps from states I0 to state I2, I6, and thence to I1. At the completion of step I1, the operation is complete. Each I state is in turn defined by a plurality of H states defined by the H clock. Thus, I0 is defined by H states 0–8 while state I2 is defined by H states 0–5. As described above, during each H state, a read/write cycle is effected. Thus, nine read/write cycles of the storage unit are effected during clock time I0.

Referring now to FIG. 6 of the drawings, a block diagram depicting portions of the clock 79 and the processor control 73 of FIG. 2 are depicted. The clock circuit depicted in FIG. 6 comprises the H clocks 115 and the I process counter 117. The H clocks 115 comprise a series of bistable devices, the timing for which has been described with respect to FIGS. 3–5. The H clocks count successively from an H0 state to an H15 state. The counting can be terminated at any point and the counter reset to its H0 state. Additionally, the counter can continuously cycle through four sets of four states. For example, the counter can cycle from H0 to H3 back to H0 and up to H3 or from H4 through H7 and back to H4.

The I or process counter 117 consists of a plurality of bistable devices and generally counts in a forward direction. However, the branch control steering unit 119 can cause the I counter to permute to any I state. The branch control steering 119 is in turn responsive to machine conditions such as the status of the H clocks 115, the overall operation to be performed, the state of the combinational logic, etc. Thus, the I counter functions as the internal program counter of the device. In a similar manner, the H clocks 115 are controlled by branch control steering unit 121 which is also responsive to machine conditions and to the sequential advance of the basic clock. A further machine state denoted "X10" is utilized to further define the I states.

Control operations are initiated through the control and typewriter keyboard unit 12 and through the logic control unit 51 which provides a signal indicative of the status of the I/O unit. The operation control unit 123 is responsive to the operation initiation to define that the overall control operations to be effected.

The processor control 73 of FIG. 2 consists in part of a program step definition and generation unit 125 and an encode unit 127. Each of these units consists of a plurality of combinational circuits as will be described. The program step definition and generation unit 125 is responsive to the H clocks 115, the I counter 117, the operation control unit 123 and various machine conditions to sequentially generate various processor commands which effect the programming of the overall system. The encode unit 127 is responsive to the program step definition and generation unit 125 to provide gating signals which control the data flow through the processor depicted in FIG. 2. For example, the program step and definition generation unit 125 provides an output signal during certain machine operations to take the contents of the A register depicted in FIG. 2, add 1 to it, and transfer the result to the A register during a read time interval. This output command is graphically defined as "AP1TAR" or A +1 to A at read time.

The encoding unit 127 is responsive to this command to gate the contents of the A register to the accumulator, gate a one bit to the accumulator, and transfer the result of the operation back to the A register. These lines are graphically depicted as "ATG" or A to G, "BIT1TG" or bit 1 to accumulator, "GHITA" or accumulator high to A register, and "GLOTA" or accumulator low to A register. Additionally, further terms defining the address of the bulk text storage unit 67 and the control storage unit 59 of FIG. 2 are provided by the encode unit 127. Thus, the term "R/WA" or read/write bulk text storage at the address indicated by the A register is provided. The term "R/WSM" denotes that the special memory portion of the control storage is read and written at the address of defined by the fixed register addressing. The additional clock input defining a read cycle and a write cycle is provided to the encode unit 127.

Referring now to FIG. 7 of the drawings, a detailed diagram depicting the combinational circuits utilized to effect the addition of one to the contents of the A register is depicted. Additionally, various ones of the registers depicted in FIG. 2 and the data paths between these registers are further shown.

As has been described, certain machine conditions initiate various programming step operations. In the example shown in FIG. 7, a text control or word optimization operation, TC, initiates the addition of one to the contents of the A register at a particular time in the operation, namely, when the I counter is in a one state, when the X10 counter is on (TC I1X10) and when the H clock is in a two state. At this time, if the general purpose indicator X1 is on the word decoded from the sense register is a space ("SESPACE"), the AND gate 131 provides an output signal to the OR gate 133 which in turn provides an output signal indicating that one is to be added to the contents of the A register and that the result will be stored in the A register at a read time interval. This line is connected to OR gates 135 and 137. OR gate 137 provides an output signal indicating that a one bit is to be gated to the accumulator at read time. This output signal is ANDED with clock time T11 by AND gate 139 and gates the OR gate 141 to provide an output signal effecting the transfer of a one bit to the accumulator. In a similar manner, the output of the OR gate 135 is utilized to gate OR gates 143, 145, and 147. OR gate 143 provides an output signal indicating that the contents of the A register are transferred to the G register at read time which signal is ANDED by AND gate 149 with clock interval T11 and provided to OR gate 151 to cause the contents of the A register to be transferred to the accumulator. The output signal of the OR gate 145 is utilized to gate the contents of the high side of the accumulator to the A registor. The AND gate 153 insures that the operation is effected at clock time T19 which insures that the addition is complete. In a similar manner, the OR gate 147 causes the OR gate 155 to generate an output signal at clock time T19 to gate the contents of the low side of the accumulator to the A register.

Summarizing, the combinational logic causes a one bit to be written into the accumulator at clock time T11 and effects a signal which gates the A register to the accumulator at clock time T11. Additionally, at clock time T19, the contents of the high side and low side of the accumulator are gated back to the A register. Referring to the accumulator 96, it can be seen that the gating term provided at the output of the OR circuit 141 is provided to the GB side input of the accumulator. Additionally, the output signal of the OR block 151 causing the contents of the A register to be gated to the accumulator 96 is provided to the GA side of the accumulator. Further, the 13 bits located in the A register 90 are connected to the accumulator 96 in a parallel manner. These 13 bits are gated into the accumulator when the "ATG" gating signal is provided. Additionally, a one bit is gated into the accumulator when the "-BIT1TGB" line goes positive. Thereafter, an accumulator cycle is effected wherein the contents of the A register and the one bit are added together. The addition operation is specified by the output signal of the OR block 133.

Once the addition operation is complete, the output of the accumulator is thereafter gated back to the A register. In a similar manner, the B register 91, the C register 92, and the D register 93 are connected into the accumulator as depicted and the accumulator is connected into them as depicted. Each of these lines have similar gating terms which are generated by combinational logic (not shown).

As is appreciated by those skilled in the art, the combinational circuits utilized to define the program steps and to effect the generation of the program by gating the various registers and the control storage and bulk text storage are great in number. Some of the additional gating terms of this additional logic have been placed on the block diagram of FIG. 7. In order to describe the overall operation of the system, all of the control logic and combinational circuits utilized could be depicted. However, since such a representation could lead to unwanted complexity in the description of the preferred embodiment of the device, the operation of the system will be described by the utilization of flow chart diagrams. These flow chart diagrams define the operation of the device in terms of the data flow between the various registers and in terms of the system timing. Thus, block 146 of FIG. 8 would be utilized in a flow diagram description of the system operation to indicate that at clock interval time H2, the contents of the A register are transferred to the accumulator, a one bit is transferred to the accumulator, the contents of the high portion of the accumulator are transferred to the A register and that the contents of the low portion of the accumulator are transferred to the A register.

Prior to entering into a description of the flow diagrams and operation of the machine, the following is a glossary of terms is utilized in the flow diagrams. These terms refer to the various registers and timing conditions which have been described with respect to FIGS. 2–7.

GLOSSARY

General Purpose Indicators
L1, L2, L3, L4, L5, L6 (latches)
X1, X2, X3, X4, X10, (triggers)

Operation Latches

| | | |
|---|---|---|
| CR | Cursor Right | |
| CL | Cursor Left | |
| CD | Cursor Down | |
| CU | Cursor Up | |
| DLTE | Delete | |
| DEJSY | Dejustify | |
| UNSCR | Underscore | |
| TRANS | Transpose | |
| JUST | Justify | |
| PU | Paragraph Up | |
| PD | Paragraph Down | |
| FADJ | Full Adjust | |
| HYP | Hyphen | |
| STRT | Start | Margin Control |
| REV | Reverse | Margin Control |
| ADV | Advance | Margin Control |
| FEED | Feed | Card I/O |
| READ | Read | Card I/O |
| REC | Record | Card I/O |

A Register Decode
(NOTE: The contents in each register are referred to by the name of the register.)

| | |
|---|---|
| AEEOM | A Equals the End of Memory |
| AE0 | A Equals Zero |
| AE53 | A Equals 53 |
| AE71 | A Equals 71 |

B Register Decode

| | |
|---|---|
| BEEOM | B Equals the End of Memory |
| BEEOTBF | B Equals the End of the Output Buffer |
| BE4 | B Equals 4 |
| BEPFULL | B Equals Page Full (Line 96) |
| BEEOFG | B Equals the End of the Format Groups |
| BEBIHZ | B Equals B in Hot Zone |
| BLT2 | B Less Than 2 (Top Line) |
| BGTPFULL | B Greater than Page Full |

C Register Decode

| | |
|---|---|
| CE0 | C Equals 0 |

E Register Decode

| | |
|---|---|
| EE0 | E Equals Zero |
| ELT4 | E is Less than 4 |
| ELT6 | E is Less than 6 |
| ELT8 | E is Less than 8 |

S (Sense Register) Decode

| | |
|---|---|
| SESPACE | S Equals 4 Unit Regular Space |
| SECR | S Equals Carrier Return |
| SECODEDCR | S Equals Required Carrier Return |
| SERCR | S Equals Required Carrier Return |
| SEIR | S Equals Index Return |
| SESPSPACE | S Equals Special Space (Indented Format) |
| SEHYP | S Equals Hyphen |
| SECRFLAG | S Equals Cursor Flag |
| SETRKLK | S Equals Track Link |
| SECDFN | S Equals Card Finish (Card Repeat or Card Eject) |
| SE4USPSPACE | S Equals 4 Unit Special Space |
| SE1UBS | S Equals 1 Unit Backspace |
| SETAB | S Equals Tab |
| SEINDEX | S Equals Index |
| SE96L | S Equals Line 96 |
| SE0 | S Equals Zero |
| SGT130 | S is Greater than 130 |

Processor Commands

| | |
|---|---|
| APDTAW | = A Plus D to A at Write Time |
| AMSTAR | = A Minus S to A at Read Time |
| AP1TAR | = A Plus 1 to A at Read Time |
| AM1TAR | = A Minus 1 to A at Read Time |
| AM1TAW | = A Minus 1 to A at Write Time |
| APSTAR | = A Plus S to A at Read Time |
| AMDTAR | = A Minus D to A at Read Time |
| AP1TADW | = A Plus 1 to A & D at Write Time |
| AMDTSR | = A Minus D to S at Read Time |
| ALOTSR | = A Low to S at Read Time (Low 8 Bits) |
| AHITSR | = A Hi to S at Read Time (High 5 Bits) |
| AMSTAW | = A Minus S to A at Write Time |
| AP9TAR | = A Plus 9 to A at Read Time |
| AP12TAR | = A Plus 12 to A at Read Time |
| APSTAW | = A Plus S to A at Write Time |
| APSTBW | = A Plus S to B at Write Time |
| ATEW | = A Plus 0 to E at Write Time |
| ATBW | = A to B at Write Time |
| ATADW | = A Plus 0 to A & D at Write Time |

| | |
|---|---|
| BP1TBW | = B Plus 1 to B at Write Time |
| BM1TBW | = B Minus 1 to B at Write Time |
| BM2TBW | = B Minus 2 to B at Write Time |
| BP3TBW | = B Plus 3 to B at Write Time |
| BP4TBR | = B Plus 4 to B at Read Time |
| BM4TBR | = B Minus 4 to B at Read Time |
| BM3TBW | = B Minus 3 to B at Write Time |
| BP2TBW | = B Plus 2 to B at Write Time |
| BM1TBR | = B Minus 1 to B at Read Time |
| BM2TBR | = B Minus 2 to B at Read Time |
| BHITSR | = B High (High 5 Bits) to S at Read Time |
| BLOTSR | = B Low (Low 8 Bits) to S at Read Time |
| BMDTDW | = B Minus D to D at Write Time |

| | |
|---|---|
| COMPESR | = Compare E to S at Read Time |
| COMPEDW | = Compare E to D at Write Time |
| COMPESW | = Compare E to S at Write Time |
| COMPE7R | = Compare E to 7 at Read Time |
| COMPCDER | = Compare C to D at Read Time |
| COMPE5R | = Compare E to 5 at Read Time |
| COMPC5R | = Compare C to 5 at Read Time |
| COMPC3R | = Compare C to 3 at Read Time |
| COMPC4R | = Compare C to 4 at Read Time |
| COMPE0R | = Compare E to Zero at Read Time |
| COMPJSR | = Compare J to S at Read Time |
| COMPC1R | = Compare C to 1 at Read Time |
| COMPADR | = Compare A to D at Read Time |
| COMPBDW | = Compare B to D at Write Time |
| COMPEDR | = Compare E to D at Read Time |
| CMPMTDW | = Zero Minus D to D at Write Time |
| COMPADW | = Compare A to D at Write Time |
| COMPEEUER | = Compare E to EU and do an E Minus EU to E at Read Time |
| CMPCLR | = Reset the Compare Triggers |
| CMPG | = Result of the Compare is Compare Greater |
| CMPL | = Result of the Compare is Compare Less |
| CMPE | = Result of the Compare is Compare Equal |
| CP1TCW | = C Plus 1 to C at Write Time |
| CP1TCR | = C Plus 1 to C at Read Time |
| CP2TCR | = C Plus 2 to C at Read Time |
| CM1TCW | = C Minus 1 to C at Write Time |
| CMDTSR | = C Minus D to S at Read Time |
| CM1TCR | = C Minus 1 to C at Read Time |
| CM4TCW | = C Minus 4 to C at Write Time |
| CP1TER | = C Plus 1 to E at Read Time |
| CPDTEW | = C Plus D to E at Write Time |
| CTDR | = C Plus O to D at Read Time |
| CTDW | = C Plus O to D at Write Time |
| CTSR | = C Plus O to S at Read Time |

| | |
|---|---|
| DPCTDW | = D Plus C to D at Write Time |
| DLOTSR | = D Lo (Low 8 Bits) to S at Read Time |
| DHITSR | = D Hi (High 2 Bits) to S at Read Time |
| DTEW | = D Plus 0 to E at Write Time |
| DP4TDR | = D Plus 4 to D at Read Time |
| DTAR | = D to A at Read Time |
| DP1TDW | = D Plus 1 to D at Write Time |
| DP1TDR | = D Plus 1 to D at Read Time |
| DPEUTBDR | = D Plus EU to B & D at Read Time |

| | |
|---|---|
| EP1TER | = E Plus 1 to E at Read Time |
| EM1TER | = E Minus 1 to E at Read Time |

| | |
|---|---|
| DP1TEW | = E Plus 1 to E at Write Time |
| EM1TEW | = E Minus 1 to E at Write Time |
| EM4TEW | = E Minus 4 to E at Write Time |
| ELOTSR | = E LO to S at Read Time |
| EHITSR | = E HI to S at Read Time |
| EMDTEW | = E Minus D to E at Write Time |
| EPEUTER | = E Plus EU to E at Read Time |
| EMEUTER | = E Minus EU to E at Read Time |
| EMDTSR | = E Minus D to S at Read Time |
| ETJ | = E Plus O to J |
| GTAR | = Accumulator to A at Read Time |
| GTAW | = Accumulator to A at Write Time |
| GTBR | = Accumulator to B at Read Time |
| GTBW | = Accumulator to B at Write Time |
| GTCR | = Accumulator to C at Read Time |
| GTCW | = Accumulator to C at Write Time |
| GTDR | = Accumulator to D at Read Time |
| GTDW | = Acumulator to D at Write Time |
| GTER | = Accumulator to E at Read Time |
| GTEW | = Accumulator to E at Write Time |
| JDOWNW | = Count J Down at Write Time |
| JDOWNR | = Count J Down at Read Time |
| JTDR | = J Plus O to D at Read Time |
| KTS | = Keyboard Latches to S |
| STALOR | = S to A Low (Low 8 Bits) at Read Time |
| STAHIR | = S to A Hi (High 5 Bits) at Read Time |
| STBLOR | = S to B LO (Low 8 Bits) at Read Time |
| STBHIR | = S to B HI (High 8 Bits) at Read Time |
| STDLOR | = S to D LO at Read Time |
| STDHIR | = S to D HI at Read Time |
| STELOR | = S to E LO at Read Time |
| STEHIR | = S to E HI at Read Time |
| STGLOR | = S to G LO at Read Time |
| STGHIR | = S to G HI at Read Time |
| STJLOW | = S to J LO at Write Time |
| STJHIW | = S to J HI at Write Time |
| STCR | = S to C at Read Time |
| SPJTDR | = S Plus J to D at Read Time |
| SP1TSR | = S Plus 1 to S at Read Time |
| SP1TDR | =S Plus 1 to D at Read Time |
| SP2TSR | = S Plus 2 to S at Read Time |
| INBFSTBW | = Input Buffer & S to B at Write Time |
| OTBFSTBW | = Output Buffer & S to B at Write Time |
| LGSTBW | = Line Group & S to B at Write Time |
| LGSTAW | = Line Group & S to A at Write Time |
| LGSP1TBW | = Line Group & S Plus 1 to B at Write Time |
| FGS2TBW | = Format Group & S Plus 2 to B at Write Time |
| FGSTBW | = Format Group & S to B at Write Time |
| LGTWB | = Line Group to B at Write Time |
| R/WA | = Read & write core memory at the address selected by the contents of the A register. |
| R/WB | = Read & write core memory at the address selected by the contents of the B register. |
| R/WSMX | = Read & write core memory at the location specified by X. The location is selected by a decode on the location selection mechanism of the core memory. Neither A nor B is needed to supply the address. In fact, R/WSM overrides any R/WA ro R/WB command. |
| Read Only A | = Read A but don't write back. In effect this clears that memory location. |
| Write B | = Write the contents of the S register into the location selected by register B. |
| Read A Write B | = This allows the contents in storage core at A to be moved to location selected by B (two address transfer). |

Write Control

The following codes may be written into the S register in giving a R/W command.

| | |
|---|---|
| CRTS | = Carrier Return to S |
| CFTS | = Cursor Flag to S |
| EOTFTS | = End of Text Flag to S |
| KTS | = Keyboard to S |
| RHTS | = Required Hyphen to S |
| SHTS | = Syllable Hyphen to S |
| TERMTS | = Card Eject Code to S |
| 4URSTS | = 4 Unit Space to S |
| 4USSTS | = 4 Unit Special Space to S |
| 5USTS | = 5 Unit Special Space to S |
| 6USTS | = 6 Unit Special Space to S |
| 7USTS | = 7 Unit Special Space to S |
| SPSPACETS | = Special Space to S |
| 0TS | = Zero to S |
| ZEROTS | = Zero to S |
| S7DCSET | = Write a 7 Bit Into Memory |
| S8DCSET | = Write an 8 Bit Into Memory |
| S7DCRST | = Reset the Seven Bit |
| S8DCRST | = Reset the Eighth Bit |
| S78INH | = Inhibit Writing a 7 or 8 Bit |

DETAILED DESCRIPTION

The following description relates to the sequential operation of the system depicted in FIG. 2. Several operations including word optimization, input-output, and display are described in detail.

WORD LINE OPTIMIZATION

Referring now to FIG. 9 of the drawings, a block flow diagram showing the various machine operations which can effect a word optimization operation is depicted. As has been described with respect to FIG. 1 of the drawings, data characters can be inserted into the displayed text from the keyboard, they can be keyboarded to replace existing text, displayed characters can be deleted, syllable hyphens can be inserted into words, paragraph definition can be formed or omitted by control of the operator keyboard, characters, words or lines of words can be underscored, and pre-existing margin boundaries can be changed by manipulation of the control keyboard. Additionally, as has been described with respect to FIG. 2 of the drawings, when it is desirous to input bulk text, such text can be inputed from a secondary media reader through an I/O channel. When performing each of these operations, the existing text in the bulk storage unit is re-optimized so that the maximum number of words occur on each line of displayed text. Thus, whenever there is a keyboard entry when in insert mode or whenever it is desirous to create a new paragraph by depressing the paragraph mark insert key on the control keyboard, an output signal is provided to the display system indicating the operation. This is denoted in FIG. 9 by block 161. This output signal causes the system program control to be set up to perform the designated operation. The system is placed in a specified state as denoted by block 163. Thus, when a keyboard entry is made while in insert mode, the system assumes a state denoted "TCIOX10*" which effects a character insert setup operation. During this text control operation, the I counter is set to its zero state and the X10 latch is turned off. Various internal latches are set which will later indicate to the system that a character insert operation is in progress. Once the internal latches have been set up, the system is transferred to the TCI9X10* condition. In this condition, the I counter is advanced to a count of 9 and the X10 latch remains off. This operation is denoted by block 165 and during this operation, various internal latches and conditions are set. Since these latches and conditions are set each time a word optimization operation is performed, for example, when a keyboard entry is effected in insert mode as denoted by block 161 or after a keyboard entry when in replace mode as denoted by block 167, block 165 is shown only once in the flow diagram operation depicted by FIG. 9. The detailed operations of the system which are effected when in a text control operation with the I counter set at 9 and the X10 latch turned off as noted by block 165 are further described in FIG. 12 of the drawings. Referring briefly to FIG. 12 of the drawings, various operations and corresponding H clock time intervals are depicted. These operations are those which are performed by the system when the program advances to block 165.

Referring once again to FIG. 9 of the drawings, operator depression of the backspace key when in insert mode as denoted by block 169 causes the system to assume a status wherein special conditions are set up indicating that a backspace operation is in progress as denoted by block 171. In a similar manner, the insertion of a syllable hyphen or the deletion of a paragraph mark as denoted by block 173 causes the system to be set up with different internal conditions as denoted by block 175 while a keyboard entry when in replace mode or delete mode as denoted by block 167 effects different machine setup conditions as denoted by block 177. A margin adjust operation which is effected by depressing a margin adjust keybutton and thereafter effecting movement of the margin is denoted by block 179. This operation causes the new margins to be placed in special storage for the line addressed by the cursor. This operation is effected when the system assumes the status denoted by block 181. Thereafter, as denoted by block 183, a test is made to determine whether the operator is specifying that the margins of the entire paragraph in which the cursor is located are to be adjusted. If the entire paragraph is to be adjusted, the system assumes a status denoted by block 185 and if the margins of the entire paragraph are not to be adjusted, the system assumes a status defined by block 177. When an input operation is effected as denoted by block 187, the machine assumes the status denoted by block 189. Once the initial setup operations have been effected, the system proceeds to the operational state defined by block 165 wherein various conditions are set up which are common to all word optimization operations. Thereafter, the X10 indicator is set and, according to the operation defined, the system proceeds to the adjust routine with an I1X10 status or with an I0X10 status as denoted by connectors "BB & EE". These connectors connect to the diagram depicted in FIG. 11 of the drawings.

Referring now to FIG. 10 of the drawings, a block diagram depicting the overall operation of the system when a word optimization operation is depicted. As has been previously described, various system functions initiate a word optimization operation. When the system enters into such an operation, it is necessary that certain internal conditions and factors be set up and stored for future reference. This setup operation was briefly described with respect to FIG. 9 of the drawings and is connotated by block 201 of FIG. 10. Thereafter, the line length of the line being operated upon is retrieved from the control storage 59 of FIG. 2. Since the margin boundaries for each line are variable, it is necessary to first ascertain margin boundary, and line length in escapement units of the line prior to determining the number of characters and hence words that can fit onto the line. The operation of retrieving the line length is connotated by block 203. Once the line length has been retrieved, the text is scanned to determine the escapement values of the characters which will be located on the display line. If the first line of display were being optimized, the text scan would start with the first text character stored in the bulk text storage of FIG. 2. In a similar manner, if the word optimization operation is proceeding on the fifth line of display, the text scan would start with the first character to be displayed on that line. The operation of scanning text and determining the escapement values of each character scanned is denoted by block 205. As the text scanning operation proceeds, there are basically two conditions which may exist: the number of characters in the retrieved display line exceeds the number of characters to be displayed in the newly defined optimized line or, the number of characters in the retrieved line are less than the number of characters to be displayed in the newly optimized line. When this latter condition exists, it is necessary to pull up the characters from the previously defined line of text characters following the line of text characters being optimized so that the newly created line of text characters will have the optimimum number of words appearing thereon. Thus, the control storage which defines the parameters of the next lower line of text characters is examined to determine whether that line is a special case such as the initial line of a new paragraph, the end of text, etc. This operation is denoted by block 207.

When a special condition does not exist, further text characters defined by the control parameters which previously defined the next lower line are retrieved as denoted by block 209 for the text scanning operation. These newly retrieved characters from the next lower line are then scanned as denoted by block 205 until either all of the thus retrieved characters are fitted onto the newly optimized line or until the escapement value of the characters scanned exceeds the line length. If the newly retrieved characters fit onto the line, the operation proceeds as before testing the next lower line for a special condition and, if no special condition exists, retrieving additional characters. If a special condition does exist when the test performed by block 207 is effected, the routine proceeds to block 211 whereupon any blank lines existing between the newly tested line and the line being optimized are eliminated.

For example, if the margin boundaries had been expanded so that more than two lines of previously displayed text could fit within the new margin boundaries, the two lines of previously displayed text must fit onto the newly optimized line of displayed text and the next lower line would be tested for a special condition. If such a special condition were noted, such as, for example, a paragraph mark, the line of displayed characters which existed between the newly optimized line and the line containing a paragraph designation would have been eliminated. Thus, it is necessary to move the line containing the pargraph mark up on the display so that blank display lines are not created. This close-up operation is preformed by block 211.

Once the close-up operation has been completed, any text which must be shifted within storage and various internal indicators, such as the end of text line number, are updated as denoted by block 213 and the routine ends.

As previously described, it is also possible that the number of characters appearing in the previously defined line of text exceeds the number of characters which may be inserted into the newly optimized line of text. When this occurs, it is necessary to shift those characters which exceed the line length and which define whole words to the next lower line of display. Naturally, those characters appearing on the next lower line of display must shift to the right or down page. Thus, the stored factors which define the next lower line of text are examined to determine whether the next lower line is a special condition such as the beginning of a new paragraph. If the next line of text is the beginning of a new paragraph, it is desireous to shift this line down page and create a new line of text. Thus, the operation proceeds to block 217 whereupon a new line is created duplicating the margin boundaries and format of the last line optimized. Thereafter, the operation proceeds to scan the excess test and fit it onto the newly defined line. In this manner, multiple newly defined lines may be created so that all the text fits within the newly defined boundaries without contaminating the first line of the next paragraph.

When the next lower line does not define a special condition, the operation proceeds to block 219 whereupon the line length for this line is retrieved and the number of characters appearing in this line is also retrieved from the control storage. Thereafter, the operation proceeds to block 205 whereupon the remaining text is scanned. This remaining text consists of that text which overflowed plus the text defined by the next line. This text is placed on the next line within the boundries defined for that line and obtained by the operation of block 219. Thus, within a paragraph of text, the existing margins for each line are retained. When it is necessary to increase the length of the paragraph, the margin boundaries of the last line occurring in the paragraph are utilized for the further lines which appear in the paragraph.

As the text is being scanned, it is necessary to recall which line the cursor is located on. The operation of storing the cursor factors and recalling them from storage is generally indicated by block 221.

Summarizing, a text control operation consists of optimizing the number of words or characters which appear on a displayed line of text. Multiple machine operations such as inserting characters into existing text, defining new margin boundaries, inputing additional information, etc., initiate the word optimization operation.

Referring briefly to FIG. 2 of the drawings, all text characters are stored in the bulk text storage 67 in adjacent storage addressed locations. The control storage unit 59 contains information which defines the margin locations as well as the number of characters which appear on each line of display. In effect, this information masks the characters which serially appear in the bulk text storage so that they are displayed on the display unit 11 as lines of characters, with an optimum number of words appearing within the margin boundaries associated with each line of display. The processor is arranged to scan the characters in the bulk text storage upon entry into a word optimization operation and redefine the number of characters which appear on a line of display in accordance with fitting the maximum number of words on each line of display within the defined boundaries for that line. Once a line has been newly defined and re-optimized, factors located in the control storage 59 associated with that line are updated and changed. Whenever the number of characters appearing in a display line are changed, it may change the number of characters which appear in the next line of display. In this case, the factors which define the next line of display must be examined and that line must be optimized. The optimization process thereafter continues to optimize each line of display until a new paragraph of words is found or until a line is found which does not need changing.

Various ones of the depicted registers are utilized to contain control information during the word optimization operation. Since these registers almost always contain the factors necessary for proper performance of the operation, the following will briefly review the factors thus retained. In a word optimization or text control operation, the E register is initially set up with the maximum number of escapement units which can appear on the line to be optimized. This number is derived from the line group information which defines the left margin boundry and the line length in terms of escapement units. As each character located in the bulk text storage 67 is scanned, it is gated to the sense register 57 and thence examined under the control of the processor 73 to determine its escapement value. This escapement value is subtracted from the contents of the E register in the accumulator 96 under the control of the processor 73. When the E register is equal to 0, it signifies that the maximum number of characters have been placed on the line being optimized.

Both the D register and the J register are initially set with the number of characters which appear on the line to be optimized. This information is obtained from the register 101. Thereafter, the J register is decremented with each character scanned so that it contains the number of characters remaining in the line which have not yet had their escapement units evaluated. As described heretofore, there are essentially two conditions which may exist during a word optimization operation on a particular line of display: the escapement units of the number of characters previously existing in the line to be optimized exceed the number of escapement units allowable on the newly optimized line resulting in a character overflow or they are less than the number of escapement units which may appear in the newly optimized line resulting in a character underflow. When a character overflow exists, the contents of the J register are subtracted from the D register by the accumulator under the control of the processor control and the resultant factor is stored as the number of characters which appear in the newly optimized line of display test. Thereafter, the overflow characters are placed on the next line as will be described hereinafter. When an underflow situation exists, the J counter reaches a count of 0 prior to the E counter reaching a count of 0. When this condition exists, it is necessary to obtain the characters from the next line and place some or all of these characters on the newly optimized line. This operation will also be described hereinafter.

Summarizing, the E register contains the number of escapement units which may thereafter be placed on the line being optimized, the D register contains the number of characters previously appearing on the line, and the J register is utilized to maintain a count of the number of characters in the defined line which have not yet had their escapement units added into the word optimization operation.

Of course, when the last character fitting in a newly optimized line is not a word ending character such as an innerword space, hyphen, etc., it is necessary to backup in the line to a proper word ending condition. At this time, the J counter is incremented with each character scanned until a word ending condition is reached. Thereafter, the number of characters appearing in the line is calculated and written into the control storage 59. Additionally, it should be noted that various ones of the registers may be utilized during the operation to contain other factors. Such use of these registers is incidental to their major use described above. The incidental use is merely to effect maximum utilization of the system components without occurring additional expenses.

One additional operation that should be referred to prior to entering into a detailed description of the operation of the processor 73 with respect to a word optimization operation is the storage of cursor factors referred to in the block diagram of FIG. 10. Whenever a character is to be inserted into the bulk text storage from the operator keyboard, it is stored in a special position of control storage. Additionally, the character located at the cursor position is removed from the bulk storage and stored in a second special location in control storage. A cursor flag character is inserted in the bulk text storage at the position thus vacated. During the scan line forward operation of the word optimization routine, when the cursor flag is encountered, it is necessary to provide an escapement decode for both the newly inserted character and thereafter for the character previously adjacent to the cursor. Further, if the character previously located adjacent to the cursor is caused to overflow the boundary of the newly optimized line, a special operation is necessitated whereby the word in which the cursor is located will be redefined as the first word appearing in the next line. Thus, several operations are effected upon encountering the cursor flag operation as will be described in detail hereinafter.

Referring once again to FIG. 9 of the drawings, once the device is set up for a word optimization process as denoted by block 165, the routine proceeds either to connection point BB or connection point EE in accordance with the count located in the J register 95 of FIG. 2. If the count in the J register is equal to 0 indicating that no characters remain in the line to be optimized, the routine proceeds through connection point EE. If, on the other hand, characters are remaining, then the operation proceeds through connection point BB of FIG. 11.

Figure 13:
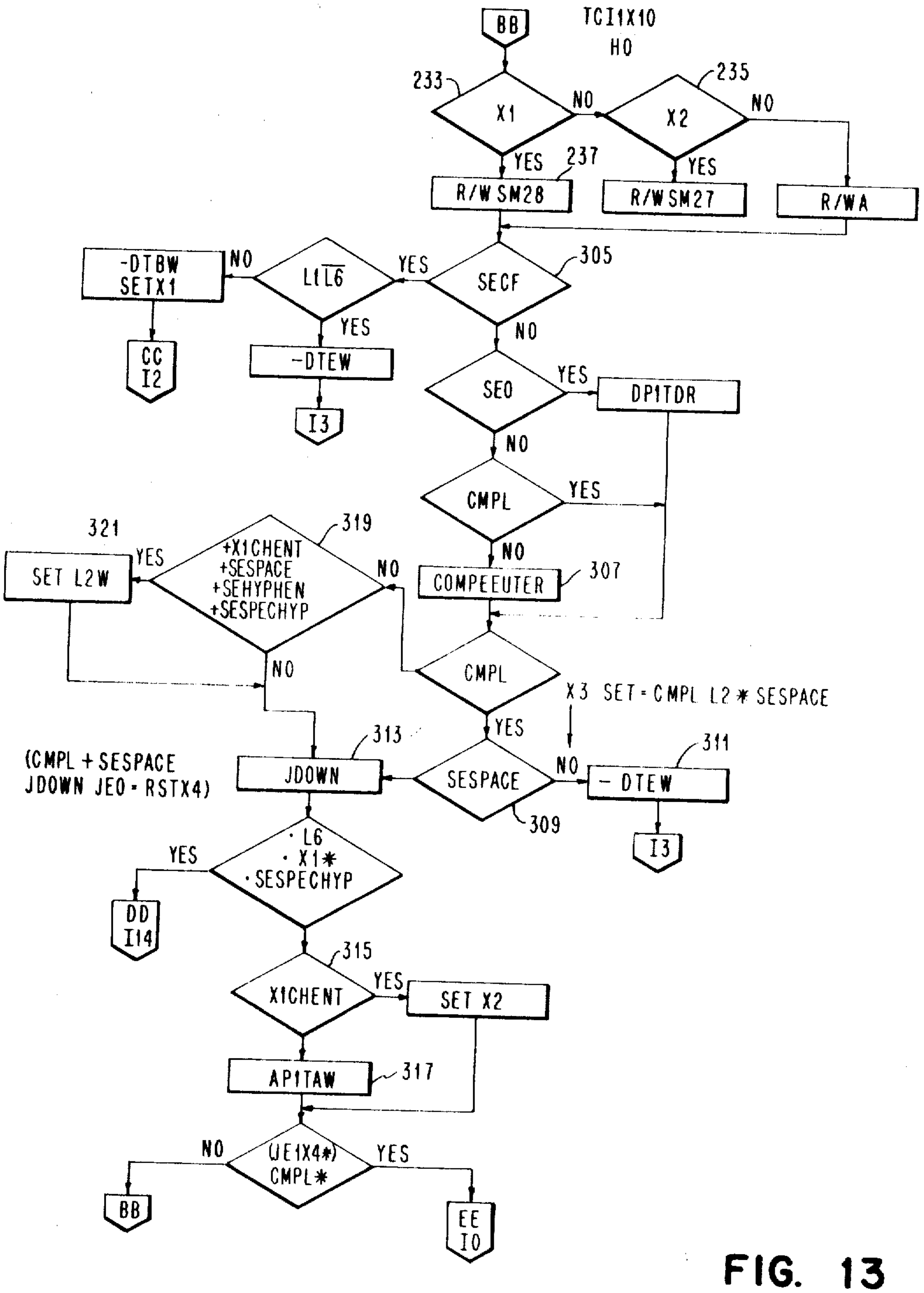

Referring now to FIG. 11 of the drawings, the connections from the initial setup operation described in FIG. 9 of the drawings are shown at connection points BB and EE. If the J counter does not equal 0 when entering into the operation, the text control operation (TC) causes the control counter to assume its I1 state. At the same time, the X10 status indicator is turned on. This indicator remains on during the remainder of the text control operation. Thus, only the I states will change to define further operations and hence, only these I states will be referred to. Thus, when the processor control tests the J counter and determines that it is not equal to 0, the operation preceeds to an I1 state as defined by block 231 thereby initiating the scan line forward operation. This operation is defined in detail by the block diagram of FIG. 13. Referring briefly to FIG. 13, it can be seen that the control state, namely a text control I1X10 operation is defined at the top of the drawing. Additionally, the operation is entered into through the BB connector. The first step of the operation is to text the X1 indicator as denoted by block 233 and the operation proceeds to either test the X2 indicator as denoted by block 235 or to read and write the special memory location 28 as denoted by block 237. The details of this operation will be described hereinafter, reference being made to this drawing here only to show that the scan line forward operation is defined by a particular I counter state which further defines a detailed machine operation.

Referring once again to FIG. 11 of the drawings, a scan line forward operation is initiated as denoted by block 231 wherein the first character located on a line to be optimized is read out of the text storage unit, its escapement value determined and subtracted from the contents of the escapement register (E register), the J counter is decremented denoting that a character has been read. Thereafter, the second character is read out and the same operation proceeds as denoted by the loop 239. This operation continues until the cursor flag is encountered or until the J counter is equal to 0. If the cursor flag is encountered prior to the J counter reaching the count of 0, the operation proceeds to the I2 state as denoted by block 241 whereupon the cursor information is updated and thereafter proceeds back to block 231 and the scan line forward operation. Another special condition which can exist is if a syllable hyphen is encountered during a scan line forward operation. When this occurs, the operation proceeds to an I14 state as defined by block 243 whereupon the syllable hyphen is removed. Again, the operation returns to the scan line forward operation until an underflow or overflow condition exists. If an underflow condition exists, the J counter will reach a count of 0 whereupon the operation proceeds to the I0 state defined by block 245. In this state the next line of storage is tested to determine whether a special condition exists such as the existence of a new paragraph. If such a condition does not exist, the special memory register defining the next line of text is read to determine the number of characters which appear on that line. If no characters appear on that line indicating a blank line, the operation is again repeated. This operational loop is denoted by the loop 247. If a special condition does not (e.g. exist and characters are located on the next line of text, the operation proceeds back to the scan line forward operation wherein the text characters located on the next line proceed to fill out the line being optimized. If a special condition does exist, the operation proceeds to the I3 state defined by block 249 whereupon internal indicators are interrogated to thereafter determine whether it is necessary to close text up page, etc.

When a text overflow condition is determined because the character scanned would cause the escapement counter to assume a value less than 0, and when the character scanned is a non-space character, the operation also proceeds to the I3 state defined by block 249. The operation proceeds from block 249 in accordance with the condition of the L2 indicator which indicates whether a valid line termination point exists in the line being scanned. If such a termination point exists (e.g. hyphen, innerword space, etc.), the operation proceeds to the I5 state denoted by block 251 whereupon a reverse text scan is initiated and the counter containing the number of characters located on the line to be optimized is decremented until the line end point is reached. If during the reverse text scan, a blank is encountered in text storage indicating that a hyphen previously existed at that point, the operation proceeds to the I4 state denoted by block 253 whereupon this syllable hyphen is replaced. Once a valid line end point is found either through the replacement of a syllable hyphen as denoted by block 253 or by the sensing of a line termination character such as innerword space as denoted by block 251, the operation proceeds to the I6 state as denoted by block 255. Block 255 is also reached from block 249 if the L2 indicator is off indicating a single word line.

When the processor advances to the I6 state, the number of characters which will appear on the newly optimized line is now contained in the external registers of the system. These factors are transferred to the appropriate registers in the control storage. At this point, a line of display has been optimized and it may or may not be necessary to re-optimize the next line of display. In order to determine whether the operation should continue optimizing additional lines, a check is made to determine whether the last line of text which has been read is the same as the line of text being adjusted. If the lines correspond, a test is made to see whether the contents of the J counter is equal to 0. This indicates that no letters of remaining text are to be scanned. If the J counter is equal to 0, the operation proceeds to an I10 or I13 state as will be described hereinafter. If however, the contents of the J counter is not equal to 0 or if the line adjusted does not correspond to the line read, it is necessary to add overflow text to the next succeeding line. This overflow text is added as a new line of text whenever the next successive line contains a new paragraph designation. If the next line does not contain a new paragraph designation, the overflow words are placed as the first characters of the next line pushing the information on that line to the right and then down page. Thus, a test is made during the I6 state to determine whether the next line contains a paragraph designation.

When a paragraph designation is contained on the next line of text, the operation proceeds to an I7 state as denoted by block 257 whereupon the determination is made as to whether the line to be newly created will effect the generation of more than 96 display lines. If more than 96 display lines will be created, the text located in the bulk text storage unit which had previously been assigned to line number 96 is removed. Thereafter, the operation proceeds to an I8 state as denoted by block 259 to effect the creation of a new line which will contain the overflow text. The line boundaries of this new line are the same as the last optimized line. These new line boundaries are inserted in the register 101 of the control storage 59 of FIG. 2 and the information relating to the line numbers down page from the newly created line are shifted to the right in the control storage. The operation then proceeds to an I9 state as denoted by block 261 and the overflow text is placed on the newly created line. It should be noted that it may be thereafter necessary to create further lines of text upon which the overflow text characters are placed.

As described heretofore with respect to block 255, if the next line following the just optimized line does not contain a special designation, such as a paragraph mark, the characters of the next line of text are added to those which overflowed the just optimized line of text and the next line of text is thereafter optimized. Thus, the operation proceeds from block 255 directly to block 261.

At time I9, the number of escapement units of the new line to be optimized are gated into the E register. Thereafter, a test is made to determine whether the contents of the J counter is equal to 0 indicating that there are no additional characters to be added to the next line of display to be optimized. This occurs on a random basis when multiple lines of text are to be optimized. Whenever it occurs, the operation proceeds directly to an I0 state whereupon the number of characters appearing on the next line is ascertained and thereafter scanned. If the contents of the J counter do not equal 0, the operation proceeds to an I1 state whereupon the overflow text is scanned until the J counter equals 0 or until one of the other conditions described with respect to block 231 is met. In this manner, the operation proceeds from the leftmost portion of a line to be optimized to the rightmost portion and down page until a paragraph definition or end of text condition is reached or until the same words appearing on a newly optimized line also appeared in the previous corresponding line. When this condition exists, the conditions which are examined as previously noted with respect to block 255 cause the system to proceed either to an 110 state as defined by clock 263 or to an 113 state as defined by block 265. The operation proceeds to block 263 whenever text has been moved up page in the display thereby creating blank lines of displayed text which must be closed over and eliminated. This operation is effected in the I10 state by removing those line groups from the register 101 which contains no text characters as indicated in FIG. 2 by the letter "N" of register 101. Additionally, the remaining line groups located down page from those deleted are moved up in the register or shifted left as graphically depicted in FIG. 2.

Referring once against to FIG. 11 of the drawings, when new lines of text have been created, it is necessary to determine the new last line of the page. This operation is effected when the control counter advances to its 113 state and the X10 status latch is reset. With the system in this status, the end of the text line number is updated and the operation proceeds to the I13 X10 status denoted by block 267 provided that an input adjust operation has not been specified. In a similar manner, the operation proceeds from block 263 to block 267 provided an input adjust operation has not been specified. The operation specified by block 267 is to replace the cursor flag with the character previously located at that position. In all operations except the insert operation but including the input adjust operation, the bulk text storage is closed to delete all blank characters as denoted by the I12 state defined by block 269. That is, text is actually shifted up page so that no blank characters appear in storage. Blank characters can be inserted into storage during delete operations and whenever a syllable hyphen is deleted as described heretofore.

During an insert operation, it is necessary to effect the shifting of all characters located to the right of the cursor marked character in the bulk text storage and the cursor marked character down page to make room for the character to be inserted. This operation is defined by the I11 status noted by block 271. When this operation occurs, it may be possible that the newly added character exceeds the capacity of the bulk text storage. In this case, the last character is eliminated from the end of the text storage as defined by the I15 state denoted by block 273 and thereafter the operation proceeds back to the I11 state whereupon the actual opening of the memory is effected. Thereafter, the operation is terminated as denoted by block 275. If more than one syllable hyphen were deleted during the text adjust operation, the operation proceeds from block 271 to block 269 to effect the closing up of the memory over the thus created blanks. If one syllable hyphen were deleted, it would not be necessary to proceed to block 269 since the newly inserted character would utilize the blank space created by the deletion of the syllable hyphen. The operation also proceeds from block 279 to the termination of the operation as defined by block 275.

As has previously been described, the various operations specified by the blocks of FIGS. 9 and 11 are further defined in terms of internal system timing and in terms of the processor control gating effected to shift data from the various registers and storage devices. Referring briefly to FIG. 9 of the drawings, the operations defined by block 165 or the I9 X10* machine status are depicted in FIG. 12 of the drawings.

Referring to FIG. 12 of the drawings, that portion of the setup operation common to all word optimization operations is depicted. During the first clock time interval, H0, the character to be inserted is read from its special memory location 27 and rewritten back into the special memory location as denoted by block 301. If a character entry or insertion operation other than the insertion of a paragraph mark is being performed, the character read from the special memory location 27 is rewritten back in. However, if any other operation is being performed, a blank character is written into the special memory location. During the next clocking intervals H1 and H2, the line number of the line being optimized is read from the B register and stored in special memory locations 25 and 26. Thereafter the B register addresses the margin group corresponding to the line number. This margin group is read at clock time H4 from the register 101 of FIG. 2. Thereafter, high order bits are added to this information now located in the sense register 57 so that the B register thereafter contains the address in the register 100 of the margin group pertaining to the line to be optimized. Since a plus two operation was also specified, the line length portion of the margin information is addressed by the contents of the B register. Thereafter, at clock time H6, this information is gated into the sense register and transferred to the E register 94 of FIG. 2. Thus, the E register now contains the escapement units of the line to be optimized. An additional operation that takes place at H4 time is that the contents of the J register are transferred to the D register. At time H8, special memory 7 is set to 0. This special memory location indicates the number of hyphens read during a text scan forward operation. Additionally, at clock time H8, the X10 indicator is set on and a test is made to determine whether the J counter is equal to 0. If the J counter is equal to 0, the I counter is set to its I0 state whereas it is set to its I1 state if the J counter does not equal 0.

Assuming that the J counter does not equal 0, the operation proceeds to block 233 of FIG. 13. It will be recalled that this operation defined by the I counter being in its 1 state is a scan line forward operation whereupon text characters are scanned for their escapement values until an overflow or underflow condition exists or until a syllable hyphen is encountered or the cursor is encountered. All of the operations depicted in FIG. 13 are done during clock interval H0. The operations specified by blocks 233 and 235 insure that the character which has been replaced by the cursor flag and is located in special memory and that the character to be inserted are recalled at the proper time from their special memory locations. Thereafter, a check is made to determine whether the cursor flag has been sensed as denoted by block 305. If the cursor flag has been sensed, and if a paragraph mark is being inserted, the operation transfers the contents of the D register and proceeds to program step 13. If a paragraph mark is not entered and the cursor flag is encountered, the algebraic sign of the contents of D register is inverted and transferred to the B register, the X1 indicator is set and the operation proceeds to an I2 state. This insures that when the operation is re-entered, that the X1 indicator will be set effecting the reading of the special memory location containing the character displaced by the cursor flag instead of reading the memory location specified by the A register.

Assuming that the cursor flag is not encountered, the operation tests the contents of the sense register to determine whether a blank character was detected. If a blank character was not detected, the operation proceeds to block 307 whereupon the contents of the E register containing the remaining escapement value in the line is compared with the decoded escapement value of the character sensed. Additionally, the escapement value of the character is subtracted from the contents of the E register and the resultant factor is rewritten back in the E register.

If the comparison is less indicating that the just read character will exceed the line length, and if the just read character is not a space character as indicated by block 309, the operation proceeds to block 311 where the algebraic sign of the contents of the D register are transferred to the E register and the operation proceeds to the intermediate setup operation defined by I3. If a space character is encountered which causes the overflow, the J counter is decremented as denoted by block 313 and a test is made to determine whether a special hyphen situation exists. If this situation exists, the control counter is stepped to state I14 for the removal of a hyphen. Otherwise a test is made to determine whether the X1 indicator is on during a character entry operation as denoted by block 315. In this occurrence, it is necessary to thereafter address the special memory location containing the character to be inserted. Otherwise, the contents of the A register are incremented by 1 as denoted by block 317. Thereafter, a test is made to determine whether the J counter will be equal to 0 indicating that no further characters exist and a test of the compare latch is made to insure that there are remaining escapement characters. Assuming that the J counter did not decrement to 0, the operation is re-initiated with the next character being read either from the special memory locations where a cursor flag has been found or from the bulk text storage defined by the address located in the A register.

When, as a result of the compare operation performed by block 307, it is indicated that there are additional escapement units to be utilized in a line (no overflow), the operation proceeds to block 319 to determine whether the character thus decoded is a valid line ending character. If it is a line ending character, the L2 latch is set as indicated by block 321. In either instance, the operation proceeds to block 313 whereupon the J counter is decremented by 1 and then to the exit points BB or EE depending upon the contents of the J counter.

As has been previously described, during a scan line forward operation when the J counter is equal to 0, it is necessary to read the number of characters on the next line so that they may thereafter be examined during the scan line forward operation. This operation is defined by the I0 state and it is entered through the EE connector depicted by block 325 of FIG. 14. The overall operation is depicted by block 245 of FIG. 11.

Figure 14:
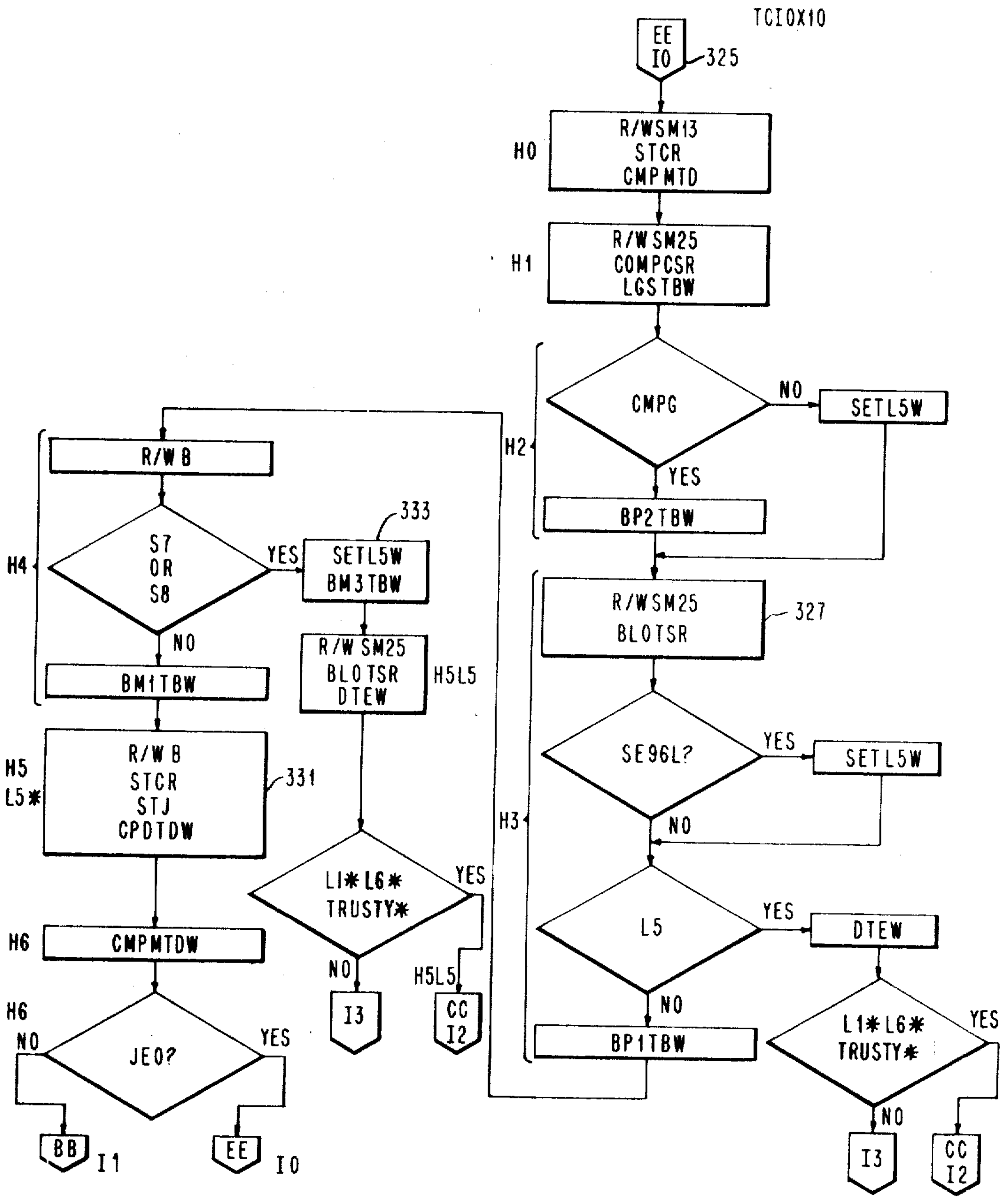

Referring now to FIG. 14 of the drawings, when the I counter assumes a 0 state, the end of text line number is read from special memory location 13 during clock H0, the line number of the last previous line read for a scan line forward operation is read from special memory 25 during clock time H1. The last line read is then compared with the end of text line number and the L5 indicator is set indicating that the additional lines can not be read if the last line of text has already been read. If, however, the last line of text has not been read, the B register is incremented by 2 so that it now addresses the next line to be read and this factor is stored in special memory location 25 as denoted by block 327. A test is then made to determine whether the last line is being operated upon at which time the L5 indicator is set on. If the L5 indicator has been set on by the operation, the contents of the D register are transferred to the E register and various internal indicators are sampled to determine whether the system assumes an I3 or an I2 status. If the last line of text is not being operated upon, the B register is incremented to address the paragraph mark location of the newly addressed line to be read.

Thereafter, the paragraph information is gated out of storage and a test is made to determine whether the paragraph indicator is on or off. If the paragraph indicator is off, the B register is decremented so that the number of characters on the line can be thereafter read. This number is added to the contents of the D register and also placed into the J register at clock time H5 as denoted by block 331. A test is thereafter made to determine whether the J counter is equal to 0. This can occur if a blank line has been addressed. If the J counter does not equal to 0, the system assumes an I1 status which has previously been described with respect to FIG. 13 of the drawings.

If a paragraph indicator is sensed, the L5 indicator is turned on as denoted by block 333 and the B register is decremented by 3 so that it addresses the last line number read. Thereafter, this information is stored in special memory 25. Various indicators are thereafter sampled so that the line group information may be appropriately updated by the system assuming either an I3 or an I2 state.

Figure 15:
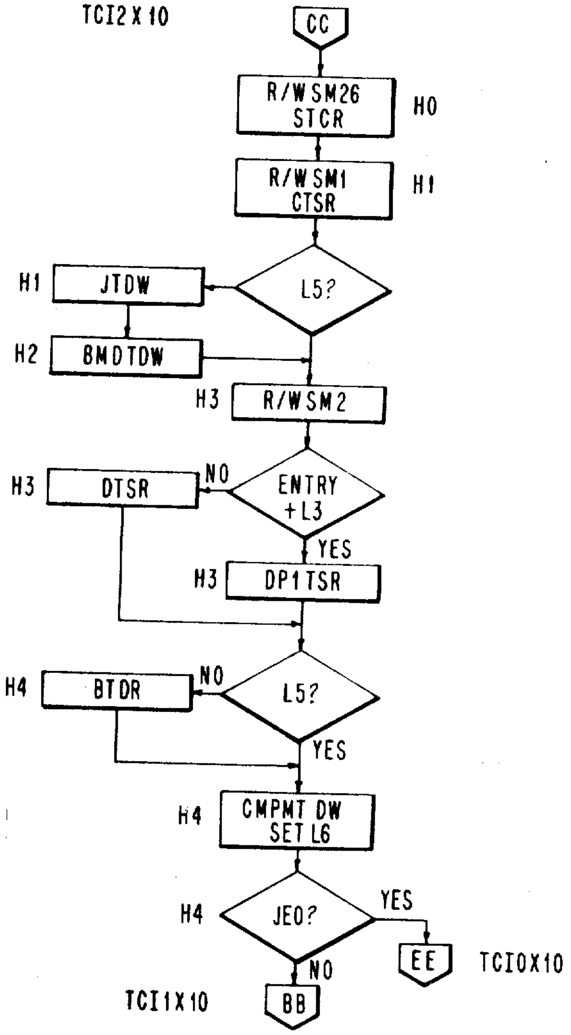

Referring now to FIG. 15 of the drawings, the operation effected when the cursor information is updated as shown by block 241 of FIG. 11 is depicted. The cursor horizontal position is defined by a line number and the number of characters from the first character in the line. The operation effected by this flow diagram effects the generation of the cursor address and its storage in special memory locations 1 and 2.

Figure 16:
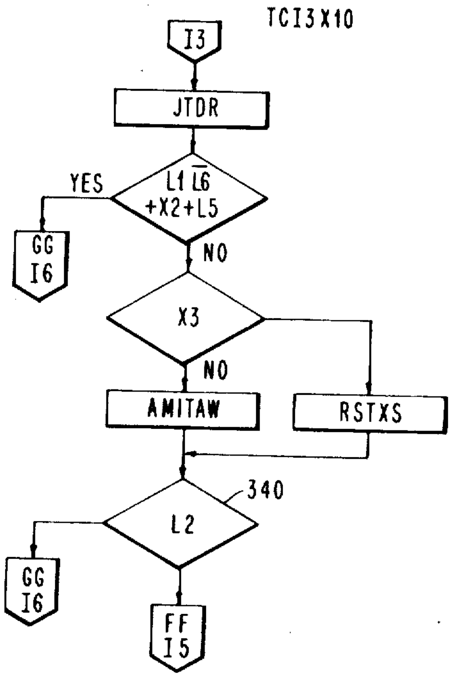

Referring to FIG. 16 of the drawings, the intermediate setup operation defined by I counter state I3 as depicted by block 249 of FIG. 11 is shown. Various internal indicators are quizzed by this operation to determine whether the I counter assumes an I5 or an I6 status. For example, the L2 indicator is sampled as denoted by block 340 to determine whether a valid line ending exists in the line being optimized.

Referring briefly to FIG. 11 of the drawings, it can be seen that when the I5 state is entered, a reverse scan operation is initiated and the line end point is searched. If a blank character is encountered during the reverse scan, it is possible that this blank character may be a deleted syllable hyphen. Therefore, the operation proceeds to state I4 as denoted by block 253.

Figures 17, 18:
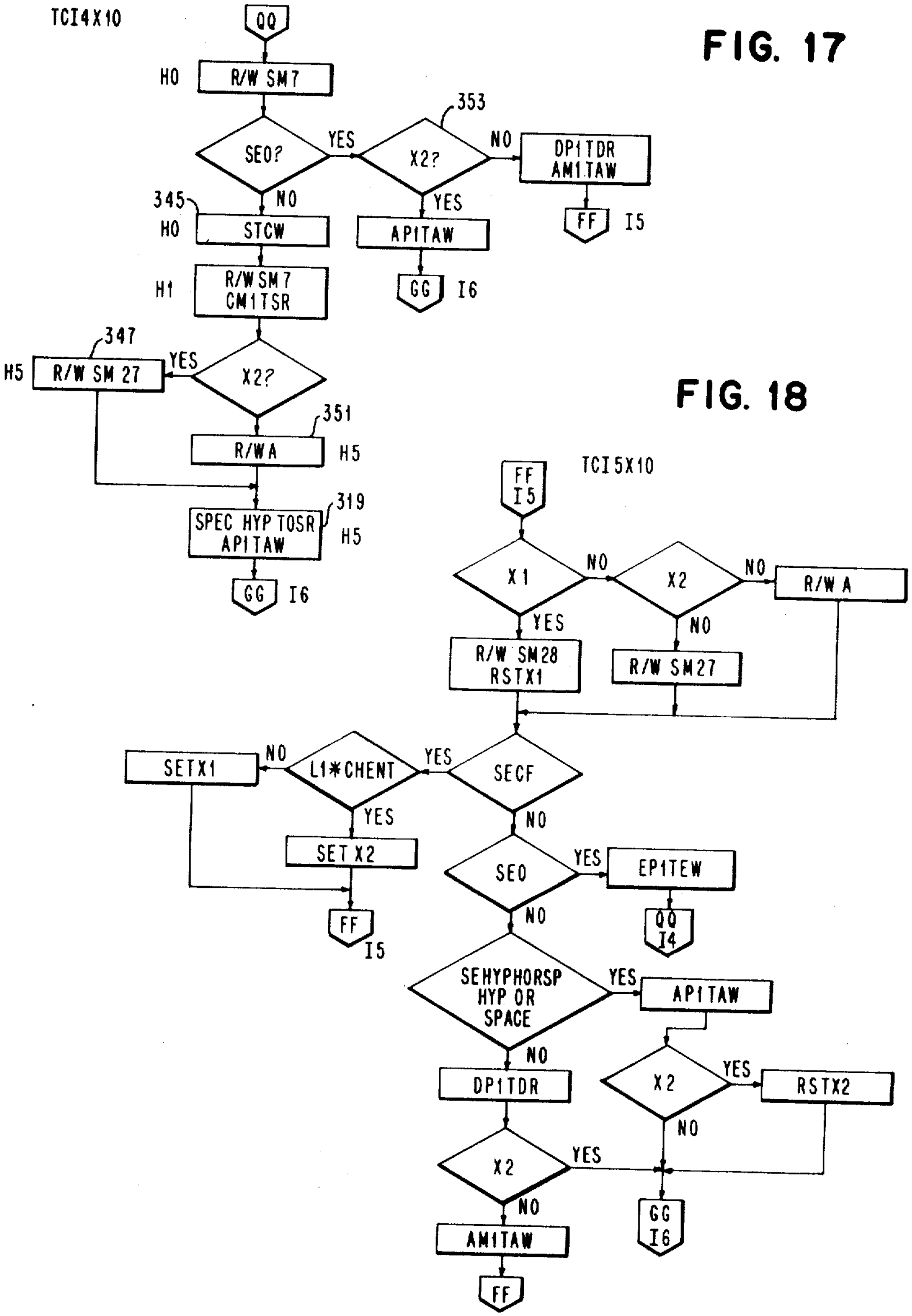

Referring now to FIG. 17 of the drawings, the operation defined by state I4 checks to determine whether a hyphen character has been previously encountered. This information is stored in special memory location 7. If hyphens have been deleted, the operation will proceed to block 345 and the number stored in the special memory location indicating the number of hyphens previously deleted is decremented during clock time H1. Thereafter, a check is made to determine whether the character located at the cursor flag is being operated upon. If this character is being operated upon, it is necessary to write the hyphen character in special memory location 27 as denoted by block 347 and block 349. Otherwise, the text location defined by the A register is written with the special hyphen character as denoted by block 351.

If no hyphens have been eliminated previously during the operation and a blank had been encountered, a test is made as denoted by block 353 to determine whether the blank is located at the cursor address. In this case, the line is terminated and the system assumes an I6 status. If a blank is encountered at other than the cursor location and no hyphens have been deleted, the operation assumes its I5 status and continues backing up trying to find the line termination character.

Referring now to FIG. 18 of the drawings, the reverse scan operation is depicted. This operation is similar to the forward operation previously described. The characters are read from the text storage and the counter containing the number of characters remaining to be inserted into the line is incremented since the scan is in the opposite direction. Various tests are made to determine whether a valid line ending condition is detected. Once such a line ending condition is detected, the system assumes its I6 status.

Figure 19:
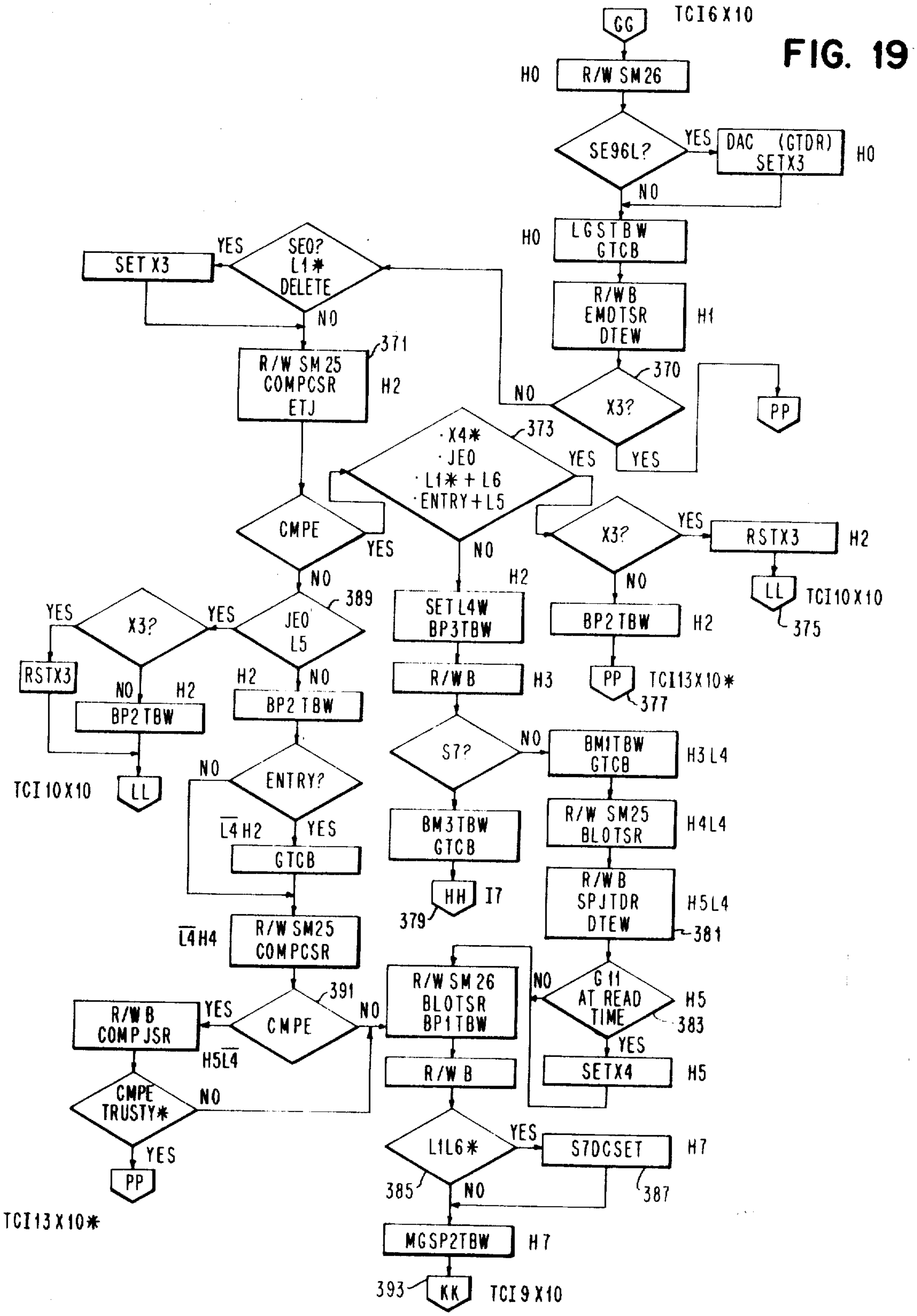

Referring now to FIG. 19 of the drawings, the operations performed by the system when the program counter assumes its I6 state are depicted. During this operation the number of characters which appear on the newly optimized line are defined and applied to the register 101 of the control storage of FIG. 2. This operation occurs during clock intervals H0 and H1. Thereafter, a test is made to determine whether the X3 indicator is on as denoted by block 370. This indicator defines that the operation has been completed with the exception of updating certain internal factors and insuring that the memory is properly opened or closed. Assuming that the operation has not been completed, the sense register which contains the number of characters on the newly optimized line is sampled to determine whether it is equal to 0 thereby indicating that a blank line has been optimized. In this instance, the X3 indicator is set. If the sense register does not equal 0, the operation proceeds to block 371 whereupon the line number of the last line optimized is compared with the line number of the characters scanned during the scan line forward operation. If these two factors are equal, there is a possibility that the operation can be terminated. Thus, as indicated by block 373, a test is made to determine whether the contents of the J counter is equal to 0 indicating no further characters to be placed on succeeding lines and the X4 indicator indicating that the J register had been previously overflowed is not on. When these conditions are satisfied along with various other internal latches, the X3 indicator is sampled to indicate whether blank lines are existent which must be closed. If such blank lines exist, the operation proceeds to the I10 state as denoted by connector block 375. If no blank lines which must be closed exist in the text storage, the X10 indicator is turned off and the operation proceeds to status I13X10* as denoted by connector block 377.

If the J counter does not equal 0 as indicated by block 373 or if the other conditions are not met, the L4 steering indicator is set and the next line is checked for a paragraph mark. If a paragraph mark exists, it is necessary to create a new line of display text having the same margin information as the last line optimized. When this occurs, the operation proceeds to connector block 379 and the system changes status to an I count of 17. If no paragraph mark is detected, it is thereafter necessary to determine the format information of the next line which must be re-optimized. The information content of the next line which is re-optimized will contain those characters which overflowed the preceding line along with those characters previously existing on the new line. The number of characters on the new line are added to the number of characters in the J counter as denoted by block 381. A test is then made as denoted by block 383 to determine whether the number of characters stored in the counters is exceeding the capacity of the registers. In this event, the X4 indicator is set for later inquiry to insure that the information is not lost. The line number of the new line is thereafter stored in the special memory location and the operation proceeds to machine status I9.

In the special case of a paragraph mark insert operation wherein a new paragraph has been designated, the L1 L6* indicator is on as denoted by block 385. When this event occurs, a paragraph mark is set into the format information of the new line as denoted by block 387.

It will be recalled that the operation defined by block 371 compared the line number of the line just optimized with the line number of the line last scanned during a line scan forward operation. The description thus far has related to the operation thereafter effected when these two line numbers are equal. When they are not equal, the operation proceeds to block 389 whereupon a test is made to determine whether a blank line has been written. If a blank line has been written, the system assumes its I10 status whereupon blank lines of text are thereafter closed. If the J counter does not equal 0, a check is made to determine whether the last line read during a scan forward is the line following an optimized line. In this special case, a comparison is made with the number of characters appearing on this line and the contents of the J counter as indicated by block 391. When this comparison is equal, the operation proceeds to the I13 state indicating that the optimization process has been completed. When these two are not equal, the word optimization process is not completed and the processor is set to its I9 state as has been previously described through block 393. Referring once again to FIG. 11 of the drawings, the I7 state is entered when an overflow condition exists and a paragraph mark is encountered on the next line indicating that a new line must be created between the newly defined paragraph to contain the overflow information.

Figure 20:
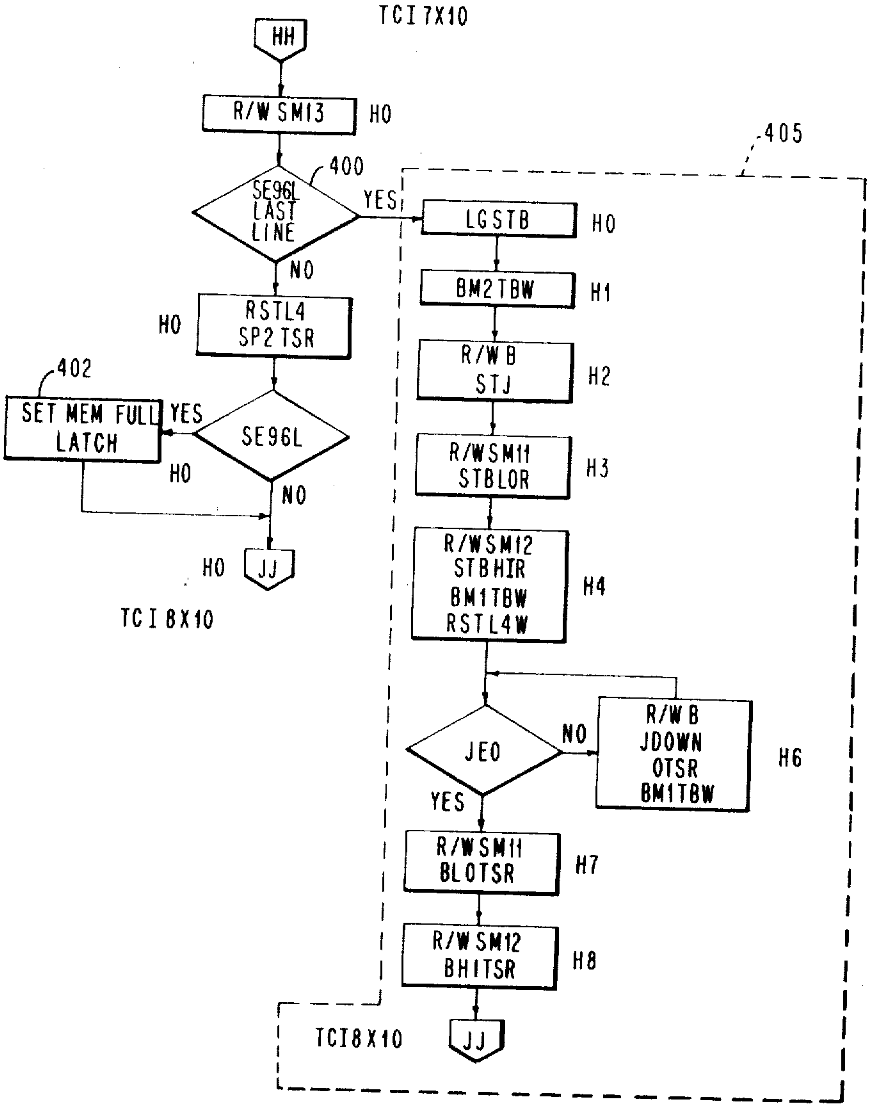

Referring now to FIG. 20 of the drawings, the system operations performed during the I7 state are depicted. During this operation, a test is made to determine whether 96 line groups have previously been defined as indicated by block 400. If 96 line groups have not been defined, a test is made to determine whether the newly created line will cause the creation of the 96 lines. In this special case, the memory full latch is set as indicated by block 402. In the special case where 96 lines have previously been defined and a new line must be defined, the characters on the last line are deleted as indicated by the blocks in loop 405. In either event, the operation then proceeds so that the program counter is set to its I8 state.

Figure 21:
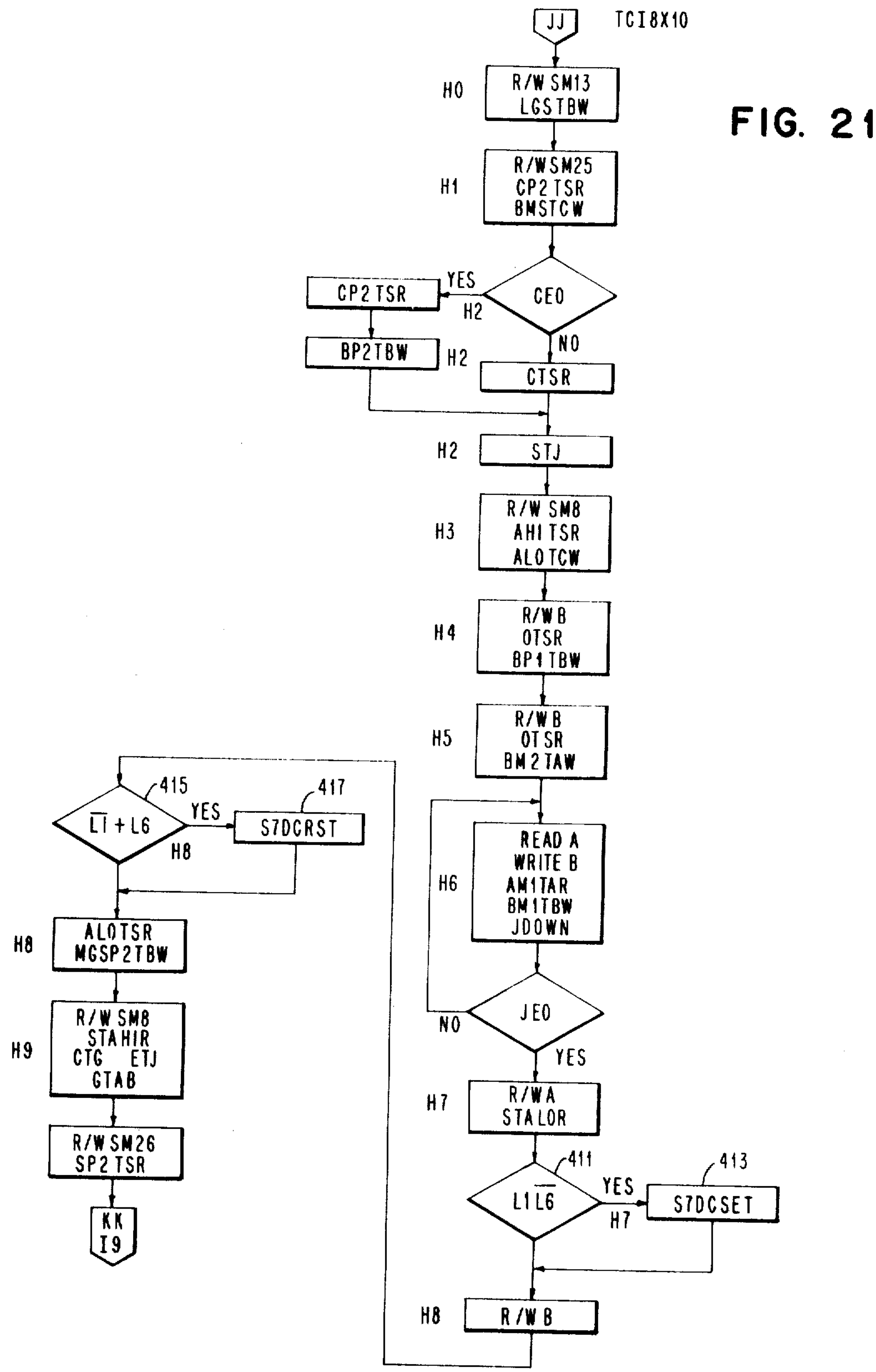

Referring now to FIG. 21 of the drawings, the operation which effects the creation of a new line is depicted. In this operation, all line group information contained in register 101 of FIG. 2 having a line number greater than the next line to be optimized is shifted to the right in the register as depicted. Thereafter, the line group information of the line previously optimized is transferred into the thus vacated position. Once this operation is complete, the system proceeds to its I9 state. A special test is made as indicated by block 411 to determine whether a new paragraph is being created. If a new paragraph is being created, a paragraph mark is set into the line group information as denoted by block 413. The test performed by block 415 and the operation defined by block 417 insures that a paragraph mark from the previously optimized line group information is not transferred to the newly created line group.

Figure 22:
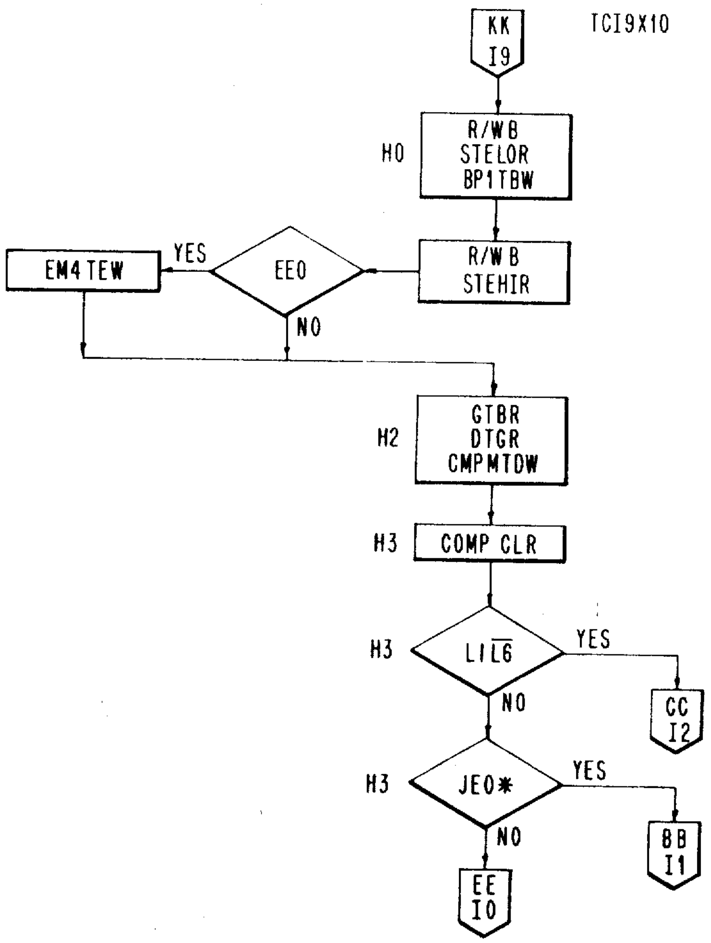

Referring now to FIG. 22 of the drawings, the system operation effected by the processor control unit 73 of FIG. 2 when the I clock assumes its I9 state is depicted. During this operation, the escapement units for the newly created line created during the I8 operation or for the next line defined by the I6 operation are transferred into the E register. Various indicators are then tested to determine whether the operation proceeds to an I0, I1, or I2 state.

Figure 23:
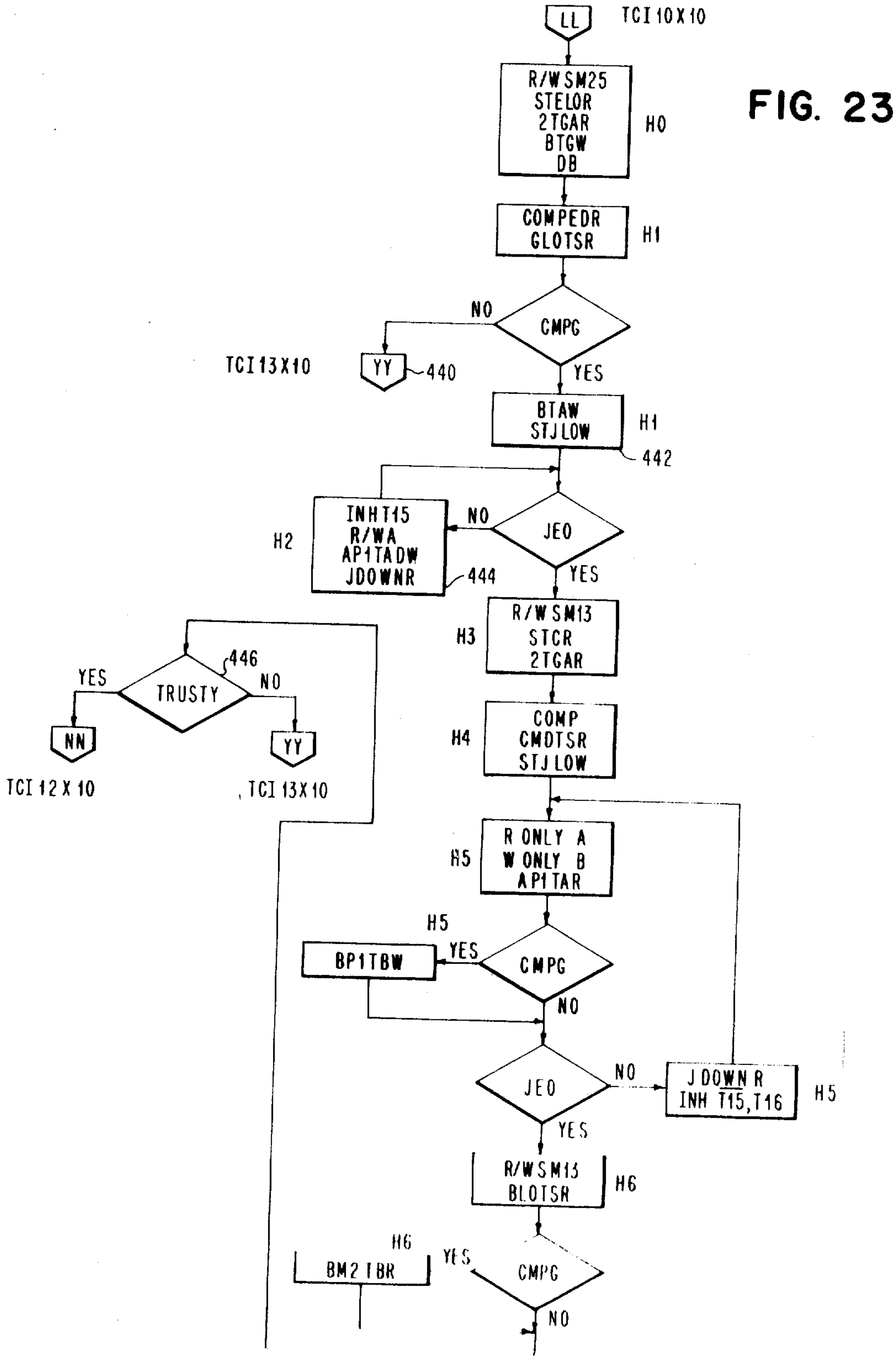

Referring now to FIG. 23 of the drawings, the system operations effected when the processor counter assumes its I10 state are depicted. During this operation blank lines which may exist in display storage are closed over. It will be remembered that the text is stored in serial fashion and that the line group information specifies the display that the text appears on. When the line group information specifies that no text characters appear on a particular line number, a blank line would be created. This can occur when text is pulled up page during a word optimization as the result of a character insertion operation, character deletion operation, margin adjust operation, etc. In order to close over the blank lines, it is only necessary to shift the line group information relating to display lines located down page from the blank lines upward thereby eliminating the blank line group information. This operation is effected during the I10 state as shown in FIG. 23. During clock interval H0 and the first portion of clock interval H1, a test is made to insure that blank lines do exist in the register 101 of FIG. 2. If a blank line does not exist, the operation proceeds to the I13 state as noted by the connector block 440. If a blank line does exist, the number of blank lines is transferred into the J register as denoted by block 442 and a test is made to determine whether the contents of the J register is equal to 0. If J does not equal 0, the line group information relating to the blank lines stored in register 101 of FIG. 2 is deleted and the J counter is stepped down as indicated by the operations performed by block 444. Once all of the information relating to the blank lines has been deleted (margin group number, number of characters in the line), the J counter will be equal to 0 and the operation proceeds to its H3 state. At clock times H3 and H4, a test is made to determine whether the blank line just eliminated is the last line of text. Additionally, the number of lines which must be moved upward in the line group storage register 101 of FIG. 2 is calculated and placed in the J register of FIG. 2. During clock time H5, the information in the register is shifted upward starting with the first line occuring after the blank line(s) and shifting that line group information into the first vacated line group information. Once all of the line groups have been shifted upward to thereby eliminate the blank line, the end of text line number is stored during clock time H6 and the operation proceeds to block 446 to determine whether to proceed to the I12 state or the I13 state. The I13 state is assumed when it is necessary to replace the character at the cursor location.

Figure 24:
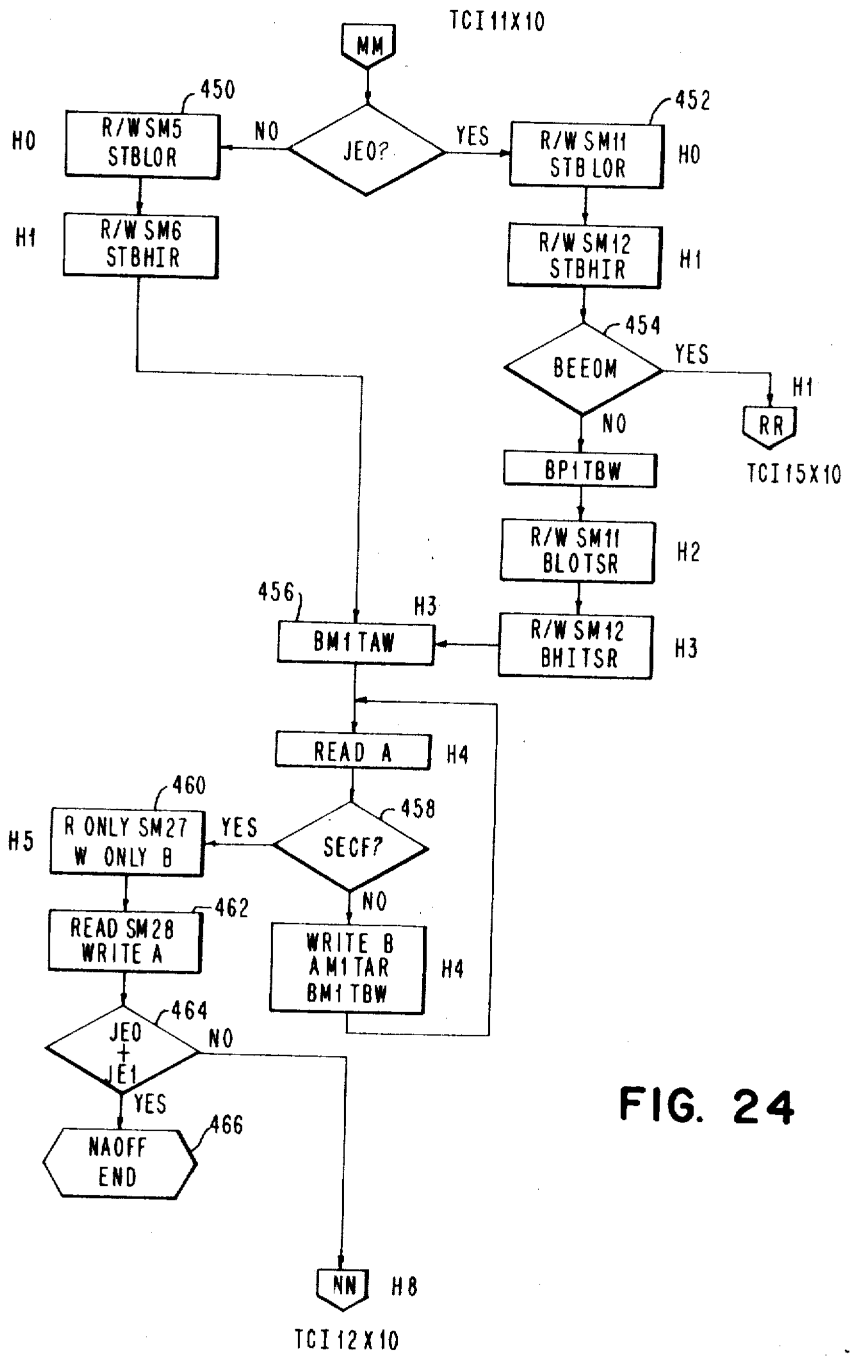

Referring now to FIG. 24 of the drawings, the system operation when opening up the text storage as defined by the I11 state of the program counter is depicted. When entering into this operation, the number of hyphens which have been replaced is contained in the J register of FIG. 2. This information is stored in the J register during the operation performed when the control counter is in its I13 state as will be described hereinafter. If a hyphen had been deleted from the text storage, the operation proceeds to block 450 whereupon text is shifted up page into the blank storage location. If no hyphens had been deleted during the insert operation, the operation proceeds to block 452 whereupon the last character in the text storage is examined to determine that it is not located in the last text storage position. If it is thusly located, it is necessary to shift this character out of the text storage unit and make room for the newly inserted character. Thus, a test is performed as noted by block 454 to determine whether the end of memory has been reached. Assuming that the end of memory was not reached, the end of memory address is updated by 1 and the operation proceeds to block 456. When the routine reaches the operation defined by block 456, the B register contains either the location of the first blank text position created by a deleted hyphen or the end of text address. It is from the point defined by the B register that text is shifted to during an open storage operation. Thereafter, text is shifted down page to the blank location defined by the address in the B register until the cursor flag is reached in text storage. At that time, the operation proceeds from block 458 to block 460 whereupon the character replaced by the cursor flag is restored to the location of the cursor flag and the character to be inserted is placed immediately preceding that character as defined by block 462. Thereafter, a test is made as indicated by block 464 to determine if further hyphens had been eliminated from the text storage. If the J counter is equal to 0 or to 1, the word optimization operation ends as denoted by block 466. If, however, additional blank characters resulting in the removal of further hyphens exist, the operation proceeds to a text close operation defined by process counter condition I12.

Figures 25, 26:
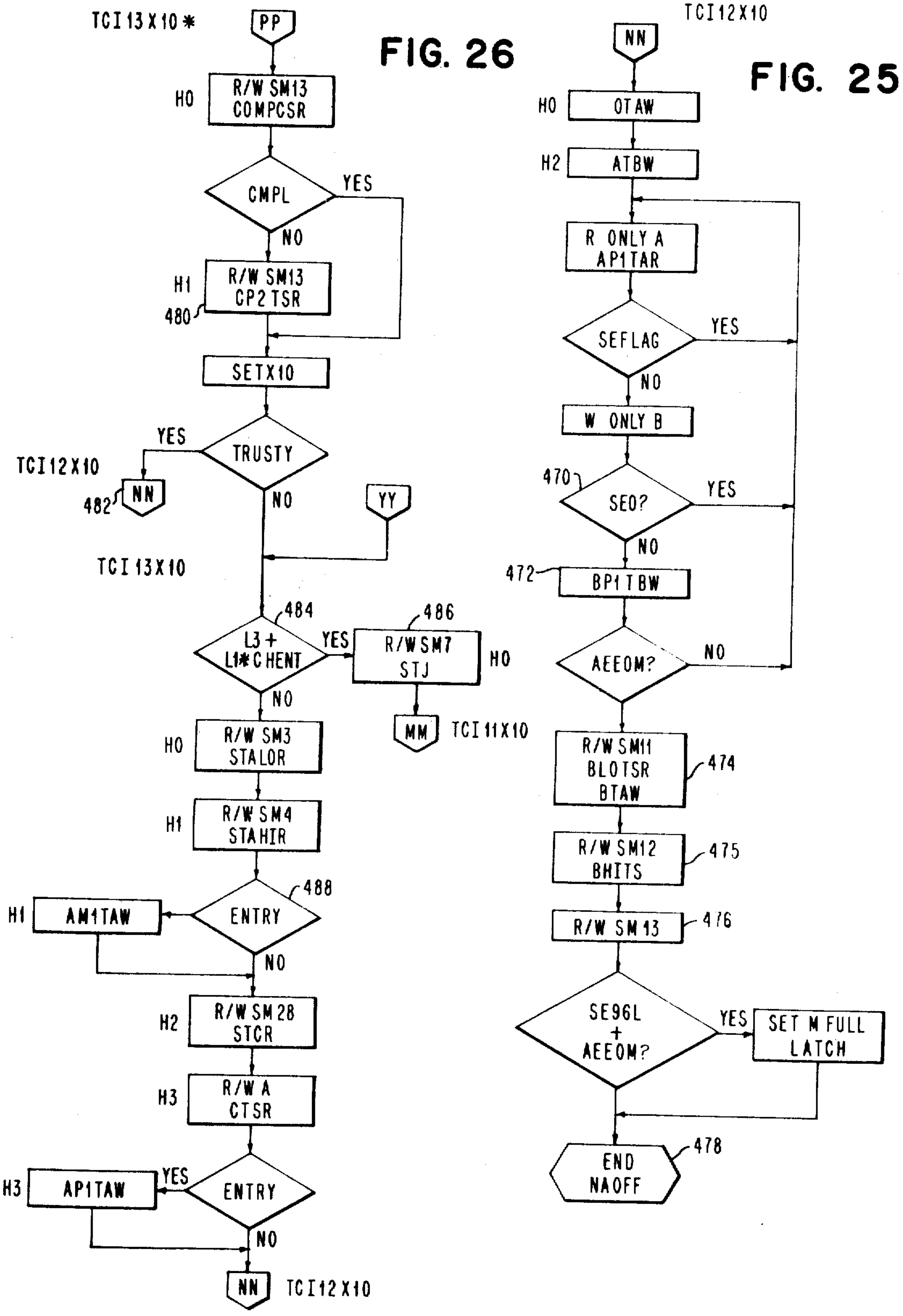

Referring now to FIG. 25 of the drawings, a text close operation is depicted which is defined by the process counter reaching an I12 state. During this operation, blank characters located in the text storage are removed and characters located down page from the blank storage positions are moved upward to fill the blanks. This operation starts at the beginning of the text store and each character is successively gated out. A test is made as denoted by block 470 to determine whether the character thus gated out is a blank. If the character is a blank, the operation proceeds to read the next character and write it in over the blank character. If the character is not a blank, the B address counter is incremented by 1 as denoted by block 472 thereby insuring that the next read character will be stored in the next location. When the end of memory is reached, the end of text address is thereafter updated as indicated by blocks 474, 475, and 476 and the memory full latch is set if the end of text character is equal to the end of memory location or the end of text line number is equal to 96. Thereafter, the word optimization operation halts as denoted by block 478.

Referring now to FIG. 26 of the drawings, the operation utilized to update the end of text line number which occurs when the process counter obtains an I13 state is depicted. During this operation, if the last line optimized corresponds to the end of text line number, the end of text line number is updated and incremented by 1. In the actual operation defined by block 480, 2 is added to the end of text line number because of the particular system configuration utilized wherein 2 bits of addressable text storage are required to define the line number. A test is then made to determine whether an input adjust operation was in progress. If such an operation was in progress, the operation proceeds to its I12 state as denoted by block 482. A test is then made to determine whether a character insert operation is in progress as denoted by block 484. If a character insert operation is in progress, the number of hyphens which have been deleted is inserted into the J counter as denoted by block 486 and the operation proceeds to that defined during the I11 state. If an insert operation is not in progress, the cursor flag location is determined and the character displaced by the cursor flag is rewritten back into the text storage. A test is performed as denoted by block 488 to determine whether a replace operation was in progress. If a character replace operation is in progress, the cursor position would have been incremented at this point and it is therefore necessary to decrement the contents of the A register to insure that the character replaced by the cursor flag is properly written into its location in storage. Thereafter, the operation proceeds to the I12 state described heretofore.

Figure 27:
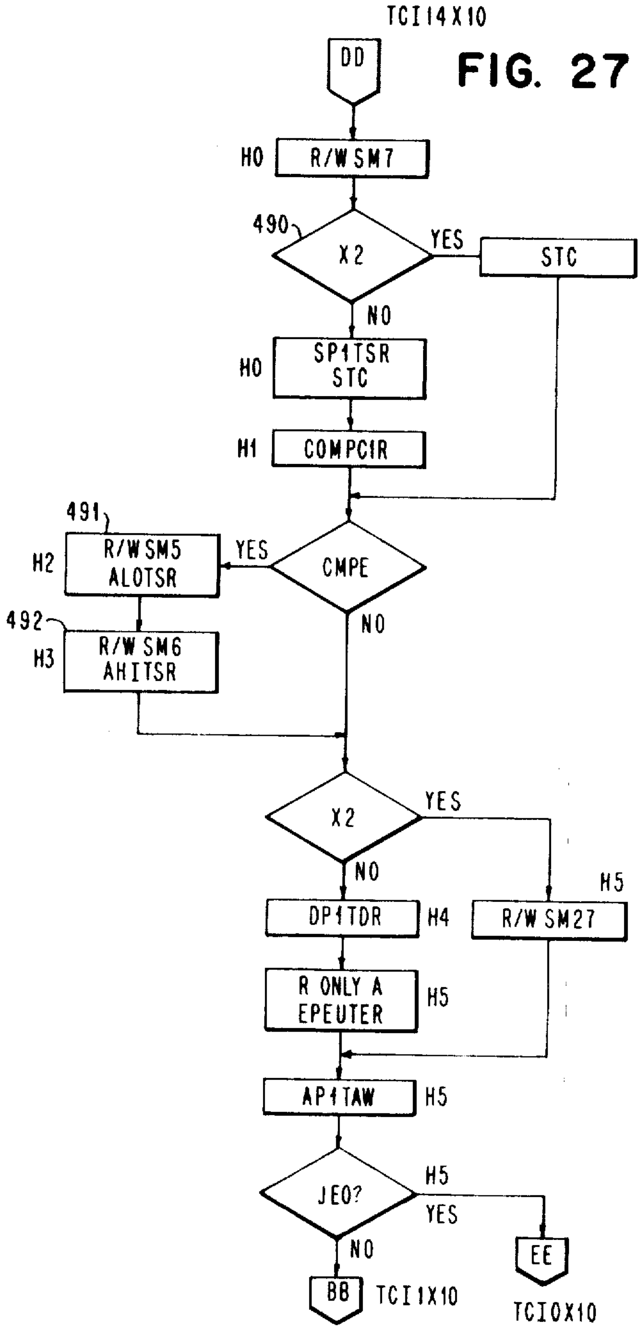

Referring now to FIG. 27 of the drawings, the operation of replacing syllable hyphens incurred during a scan line forward operation which is effected during an I14 state is depicted. The number of hyphens previously removed is first ascertained and a test is made as denoted by block 490 to determine whether a hyphen is being inserted. If a hyphen is not being inserted, the number of hyphens deleted is incremented and a test is made to determine whether this is the first hyphen deleted. The address of the first hyphen is stored as denoted by the operations of blocks 491 and 492. If a hyphen character is not being inserted, the D register is thereafter incremented so that a proper count is contained relating to the number of characters on the line being optimized and the hyphen is replaced with a blank. Additionally, the escapement unit register is updated to delete the escapement units previously added for the character. In the special case where a hyphen is inserted, it is known that that is the desired line ending point and therefore the hyphen is not deleted.

Figure 28:
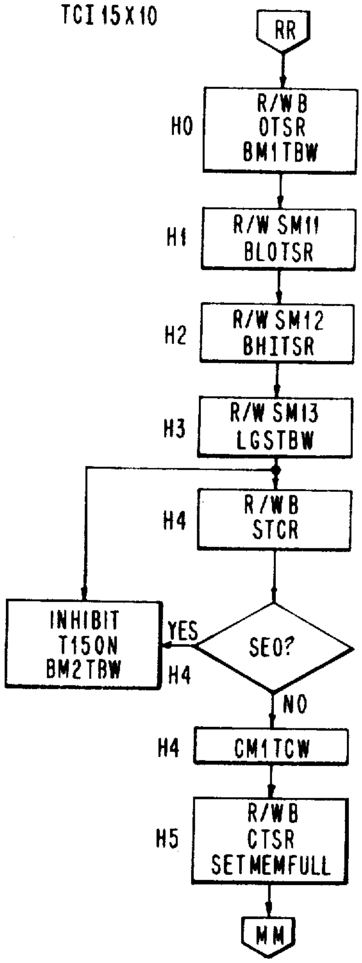

Referring now to FIG. 28 of the drawings, the operation defined when the process counter assumes its I15 state is depicted. This operation causes the last character located in the end of memory location to be removed to create a vacant spot during on open up memory operation which has previously been described with respect to the I11 state. In this operation, a blank character is inserted into the end of memory location and the line number containing that character is determined. Thereafter, the number of characters stored for that particular line number in the register 101 of FIG. 2 is decremented to show the last character is no longer associated with that line. The memory full latch is thereafter set.

Referring once again to FIG. 11 of the drawings, the operations effected during each status of the system depicted has been described. As has been previously described, the text control or word optimization operation can be initiated by several system operations. This operation preempts the display operation and utilizes the same hardware registers to effect its operation as are utilized during the display operation. Referring to FIG. 9 of the drawings, the various operations initiated by the system operator which place the system in a word optimization operation are depicted. As has been described, various setup operations are effected in accordance with the operation defined prior to entering the word optimization operation. These setup operations are further described in the following description relating to FIGS. 29–34 of the drawings.

When the operator desires to insert a character in the data stream at the point defined by the cursor mark or desires to insert a paragraph mark at the point defined by the cursor thereby causing text located to the right of the cursor to form a new paragraph, an appropriate keybutton located on the typewriter keyboard corresponding to the character desired to be inserted is depressed. This operation is depicted by block 161 of FIG. 9. For example, in the insert paragraph mark operation, the cursor would be located at any intermediate point in the text such as a sentence beginning in the center of a paragraph. The proper key is depressed which effects the formation of two paragraphs. The reverse operation can be accomplished to rejoin any paragraphs. Thereafter, the character or paragraph insertion operation is set up prior to proceeding to the word optimization operation. Referring to FIG. 29 of the drawings, the setup operation for the character and paragraph mark insertion operation is depicted. As noted by block 500, this operation is entered only when the character located on the keyboard latches during an insert operation is not a backspace character, is not a tab character, and is not a delete operation specifying the deletion of a carrier return. If the keyboard latches contain a carrier return symbol, this designates a paragraph insert operation. Thus, a special latch is set as denoted by block 501. The character to be inserted is stored in special memory location 28 and the cursor address is determined. The character located at the cursor address is stored in special memory location 27 and replaced in the text storage by a special cursor flag character. This latter operation is accomplished during time intervals H4 and H5. If the operation is a character insert operation, the cursor address is updated by 1 and the A register is thereafter decremented to address the cursor flag location. During time H9, the address of the first character located on the line containing the cursor is calculated and stored in the A register. At clock time H10, the number of characters located on the line to be optimized containing the cursor flag is incremented by 1 and placed into the J register. The operation then proceeds to the word optimization operation.

Referring now to FIG. 30 of the drawings, the set up operation effected by the system when the operator depresses the backspace key when an insert mode is depicted. The horizontal position of the cursor is ascertained and a test is made as denoted by block 510 to determine whether the cursor is located at the left margin boundary. If the cursor is located at the left margin boundary, the operation is terminated since it is undesirous to move the "print point" beyond the margin boundary. If the cursor is not located at the left margin boundary, the cursor horizontal position previously stored in the C register is decremented and the cursor address is also decremented. It should be pointed out that the cursor address corresponds to the address in the bulk text storage unit of the text character having the cursor located adjacent thereto. This information is in addition to the information relating to the cursor line number and cursor horizontal position which is also stored. The cursor flag is then stored in the text storage position defined by the cursor address. The number of characters located on the cursor line number is then stored in the J counter during clock time H6. Thereafter, the updated cursor address is stored in its special memory 3 and special memory 4 locations and the address of the first character on the cursor line is thereafter determined and placed in the A register. A blank character is then written into the special memory 28 location so that no character is thereafter placed where the cursor flag is now located. Thereafter, the operation proceeds to the word optimization routine previously described.

Referring now to FIG. 31 of the drawings, the operation effected when a paragraph mark is deleted or when a syllable hyphen is inserted is depicted. This operation sets the system up to optimize the line preceding the cursor line. This is because the deletion of the paragraph mark from the line addressed by the cursor enables the first words located on that line to be placed on the preceding line if they fit. Thus, it is necessary to optimize the preceding line. In a similar manner, when a syllable hyphen is inserted, the word being split with the syllable hyphen is placed on the preceding line if it fits. Therefore, it is again necessary to optimize the line preceding the cursor line. During clock times H0 and H1, the cursor address is stored in the A register and the L3 indicator is set if a syllable hyphen operation is in progress. The character located at the cursor address is then stored in the C register and the special cursor flag is stored in its position in text storage. In a paragraph delete operation, the displaced character is stored in special memory location 28 while in an insert hyphen operation, the hyphen character is stored in special memory 28 and the displaced character is stored in special memory 27. The cursor address is thereafter incremented by 1 and stored in special memories 3 and 4 during clock times H5 and H6. Thereafter, the cursor line number factor is read and if in a paragraph delete operation, the paragraph mark associated with that line number is deleted from the register 101 of FIG. 2. If the operation is a hyphen insert operation, the cursor horizontal position is incremented by 1 and stored in the D register. During clock times H9 and H10, the line number of the line to be optimized is decremented provided that a paragraph mark does not exist on that line number during a syllable hyphen insert operation. Thereafter, the address of the first character on the line to be optimized is calculated and the operation proceeds to the word optimization routine previously described.

Referring now to FIG. 32 of the drawings, the replace operation setup is depicted. This operation is entered whenever the operator places the system in the replace mode to replace a pre-existing character in text storage with a newly entered text character from the keyboard. Additionally, the operation is entered when the operator deletes previously stored text characters from the storage and also is utilized as a portion of the margin adjust operation to be described hereinafter. Referring now to FIG. 32, the cursor address is stored in the A register during clock times H0 and H1. Thereafter, the character located at the cursor address is replaced with the special flag character and if a replace operation is in progress, the character located on the keyboard latches is stored in special memory location 28. Otherwise, the replaced character is stored in the special memory location 28. During clock times H4 and H7 the cursor line number is determined and thereafter, the number of characters located on the cursor line is ascertained. During clock time H8, the location of the cursor is checked to determine whether it is beyond the last character on the line and the L3 indicator is set if it is beyond the last character when in a replace operation. When in replace mode, the cursor horizontal position is incremented by 1 during clock times H9 and H10. Further, during clock time H11, the replaced character located in the C register is stored in special memory location 27 and the number of characters on the cursor line located in the E register is transferred to the J register. During clock time H12, the address of the first character of the line addressed by the cursor is calculated and the operation proceeds to the word optimization routine previously described.

Referring now to FIG. 33 of the drawings, the initial setup effected when the operator performs a margin adjust operation is depicted. During this operation, the operator specifies a new margin group to be utilized with the displayed line of text containing the cursor. That is, the operator specifies new left and right boundaries for a line of text or for an entire paragraph of text. Thereafter, the words located between the old margin boundaries are re-optimized to the new margin boundaries.

The format group containing the new margins to which the text will be adjusted is read from its location in special memory 9. The cursor line number is then read and the new format number is placed into the register 101 in place of the old format number for that line number. If the line addressed by the cursor has a paragraph mark associated therewith, the paragraph mark is rewritten back into the register 101. A test is then performed to determine whether the entire paragraph is to be adjusted. If the entire paragraph is to be adjusted to the new margins, the end of text line number is read for later utilization during a compare operation and the cursor line number is incremented by 1 during clock time H0 of the new I3 state. If the thus incremented line number does not equal the end of text line number and if this line number does not contain a paragraph indication, the operation continues. The operation is halted when the end of text is reached or when a paragraph mark is found. During clock time H3, the new format number is written into each line number accessed. Thus, each line of a paragraph or each line until the end of the text is set with the new format number specified by the operation. Thereafter, the operation proceeds to the replace setup routine previously described.

Referring now to FIG. 34 of the drawings, the input adjust setup operation is depicted. This operation is effected each time the input buffer 63 of FIG. 2 is transferred to the bulk text storage 67 of FIG. 2. During clock times H0 and H1, the end of text address is accessed for later utilization and two indicators, L6 and TRUSTY are set. The end of text line number is then placed in the B register and from this point, the line groups stored in the register 101 are sequentially adjusted in reverse scan until a line group containing a paragraph mark or until the end of text is reached. At that point, the word optimization operation is initiated by setting the text control latch which resets the input latch.

Referring once again to FIG. 2 of the drawings, it has been described how information can be inputed into the device from the card reader-recorder 15 through the I/O channel 53. In a similar manner, information can be outputed from the bulk text storage unit 67 through the sense register 57 and the I/O channel 53 to the card reader-recorder. In the description which immediately follows, the overall operation of reading characters from the card reader-recorder will be described. Thereafter, a description of outputing character information to the card reader-recorder will follow.

Referring now to FIG. 35 of the drawings, a card input operation is initiated when the operator depresses a read key located on the control keyboard of the system. Thereafter, a magnetic card is incremented with respect to a recording transducer so that a serial track of data characters is sensed. As the card is travelling, the data character is sensed and loaded into a register associated with the card deck. Thereafter, the card deck requests a system interrupt to load the character into the input buffer 63 of FIG. 2. In this manner, each of the characters are serially read until all of the characters located on a track on the card have been read into the input buffer. At this time, the indicator 550 indicates that a complete track has been completed. Thereafter, the number of spaces located at the beginning of the input buffer 63 are examined to select a desired left margin location. If no space characters are located at the beginning of the track, the format information contained in the register 100 having the leftmost left margin location is selected. If a tab code is sensed prior to the sensing of character information, the format information containing the left margin location located immediately to the right of the leftmost left margin location is selected and the operation thusly proceeds for each tab code sensed. Once the format information has been selected, it is assigned to the line group contained in register 101 for the line being inputed. Thereafter, the characters located in the input buffer are sequentially scanned and examined to determine whether each code is to be stored in the bulk text storage unit. Certain control codes are not stored while all remaining codes are stored. The characters are sequentially stored in the bulk text storage unit 67 until the track terminate code is sensed. Since this is a code which is not stored in the data stream, and which indicates that all of the characters have been examined, the operation proceeds to block 554 whereupon the newly inputed text is adjusted to the selected margins as has been previously defined. Thereafter, the next track of information is read from the card until all of the tracks containing information have been read.

If a code to be ignored is sensed which is not a track terminate code, it is analyzed as connotated by block 556 and written into the text memory location. During certain special cases, it is necessary to convert a code or sequence of codes on the card to a code, sequence of codes, or other action that is recognizable by the data editing system. This operation is defined by block 558.

Referring now to FIG. 36 of the drawings, the data output operation is depicted. This operation is initiated when the operator depresses a record key located on the control keyboard. The operator must further specify the last line that is desired to be outputed and the lines located after the designated line in the text storage being retained and shifted upward to fill in the blank locations left by the outputed text. The format information of the line to be outputed is examined by the operation denoted by block 560 to determine the left margin location. Thereafter, the number of space codes necessary to create this left margin location is determined and transferred to the character output buffer. Next, each character on the line to be outputed is sequentially read from the text memory and stored in the output buffer until the complete line of text characters has been outputed at which time a track terminate code is loaded into the output buffer as denoted by the operation defined by block 562. As in the input operation, codes and code sequences in the data editing system may be converted for the output card. Thereafter, an interrupt control is initiated which effects the transfer of text characters from the output buffer to the card track. If the code thus transferred is not a track terminate code as denoted by block 564, or a card terminate code as denoted by block 566, the next character is thereafter accessed. Eventually, the track terminate code is reached at which time the operation proceeds back to block 560. If the page end flag indicator is found indicating that text located down page is not to be transferred to the output device, a card terminate code is loaded into the output buffer as denoted by the operation of block 568. Thereafter, the text which has been outputed to the output device is deleted from the bulk text storage unit and the remaining text is shifted up page.

DISPLAY

Referring once again to FIG. 2 of the drawings, the various operator initiated functions such as character insert, margin adjust, character replace, input and output, etc. have been described. Each of these operations utilizes the various registers 90–95 and the format information contained in the control storage 59. Additionally, the characters located in the bulk text storage are examined during these operations. As has been described, the same registers and storage devices are utilized during the display of the information contained in the bulk text storage unit. That portion of the system which is unique to the display consists of the F register 75, the character generator 76, the serializer 81, and the display unit 11. The processor control 73 contains additional logic to effect the display operation. The clock 79 is also utilized to effect the display operation. This dual utilization of the registers for text control and display functions effects the efficient use of these registers for the complex text calculations as well as for the display.

Referring briefly to FIG. 3 of the drawings, the dot times of the clock 73 of FIG. 2 are depicted. As has been described, 18 dot times are utilized to effect a single scan line of one displayed character, the first three dot times being utilized for retrace. Dot times 4–18 are thus utilized to effect the display of a scan line of one character. The CRT beam is selectively blanked and unblanked in accordance with the information to be displayed during that scan line. The number of scan lines per character is dependent upon the escapement value of the character. When standard spacing is utilized, the number of scan lines is a constant and is equal to 9.

The scan lines are vertical scan lines and are serially effected to form a character representation. Each character is sequentially generated in the same manner until the beam has completed displaying a line. The beam is then blanked and returned to the leftmost position awaiting the next line of display. In all, eight lines of display are generated. The 96 possible lines of display are divided into frames of eight lines each for the purpose of effecting the display. The initiation of each display frame is synced to the line frequency. Thus, a 60 cycle line will initiate a display every 1/60th of a second. This results in a display which does not flicker or jitter.

Referring once again to FIG. 2 of the drawings, the processor control 73 controls the gating of the characters and the calculation of the various factors which are necessitated during the display operation. During this operation, the A register 90 is primarily used to contain the address in the bulk text storage of the character to be displayed and the B register contains the address of the line number to be displayed. Additionally, the number of characters appearing on the line to be displayed, the cursor vertical and horizontal position, the left margin location and the line length of the displayed line are also necessary factors utilized during the display operation and are retained in various ones of the registers.

As has been described, the processor control 73 controls the gating of the text from the bulk storage to the display unit. The operation of this device is depicted in FIG. 37 of the drawings. Referring now to FIG. 37, the various I states assumed by the process counter during a display operation are depicted. As described heretofore, a display operation is initiated with the 60 cycle sync detector. At this time, it is desirous to initiate the display of the top line of display. The operation thus proceeds from an I15 state denoted by block 600 to an I7 state denoted by block 602. During this time, initial factors are set up. These factors include the line number to be displayed, the text address of the first character of that line, and the cursor line number. The operation then proceeds to its I8 state as denoted by block 604 whereupon further initialization is effected. Thereafter, the operation proceeds to control state I0 as denoted by block 606. It should be noted that 21 H states are utilized by the operation defined by blocks 600–604. During this time interval, the blanked beam is reset to the leftmost display position. During control state I0, various transient conditions effected by the high speed retrace of the beam are allowed to be dampened. During control clock times I1 and I2, the line number of the line to be displayed is displayed. Although each line number could thusly be displayed, only every fifth line has a line number displayed with it. This line number refers to the line number 1–96 of the line as it is located in the text storage. During clock time I3, the paragraph mark is displayed if there is a paragraph mark associated with the line being displayed. During clock time I4, the blank space between the paragraph mark and the display of the left margin is effected, the display of the left margin is effected, the text character display is effected, blank space between the last text character displayed and the right margin is effected and the display of the margin is thereafter effected. The operation then proceeds to an I15 state as denoted by block 608. Since the top line is not to be thereafter displayed until the next frame, the memory address of the first character to be displayed on the next line is calculated, the left margin and line length of the next line is calculated, etc. during clock time I7 as denoted by block 610. Thereafter, each of the remaining lines to be displayed are processed in a similar manner. When the eighth line has been displayed, the operation proceeds to block 600 awaiting the next sync pulse to initiate the display of the next frame. It should be noted that the operations effected by block 600 and 602 are timed with the beam sweep as are each of the operations performed during the various I states. In this manner, the processor is synced to the dot clock which in turn controls the display.

Figure 38:
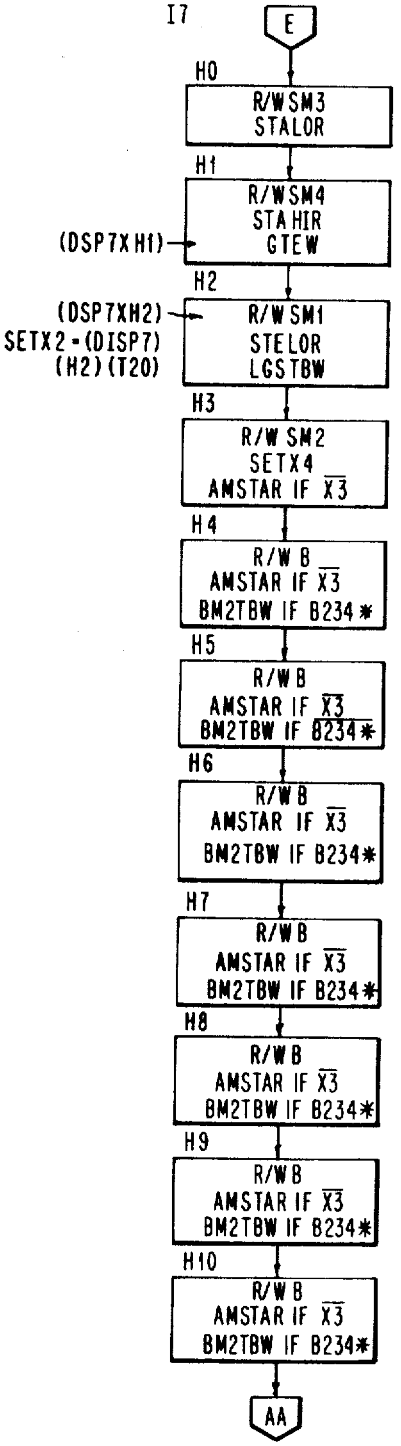

Referring now to FIG. 38 of the drawings, the operation performed when the process counter is in its I7 state is depicted. This operation establishes the position of the eight line viewing frame on the 96 line page based on the cursor vertical position. When the top line is to be displayed, the cursor address is accessed to determine the line number addressed by the cursor. Thereafter, a determination is made to see whether this line number is any multiple of 8 in which case the line addressed by the cursor is displayed as a top line of display. If the line number is not an even multiple of 8, 1 is subtracted from the line number count and the comparison is further made until a line number having a multiple of eight is determined. This is then utilized as the first line of display. It will be noted that at clock time H4, 2 is subtracted from the B register which contains this line number factor. This is due to the hardware utilized to implement the system which utilizes binary numbers to maintain the line number count. Once the top line is determined, the operation proceeds to clock time I8. It should be noted that this operation is entered for each line to be displayed. For these additional lines, the only operations performed are those in clock times H1 and H2 denoted by the term "DSP7X." Other than these two operations, the H clock is utilized merely to control the amount of time utilized by the processor during retrace of the beam.

Figure 39:
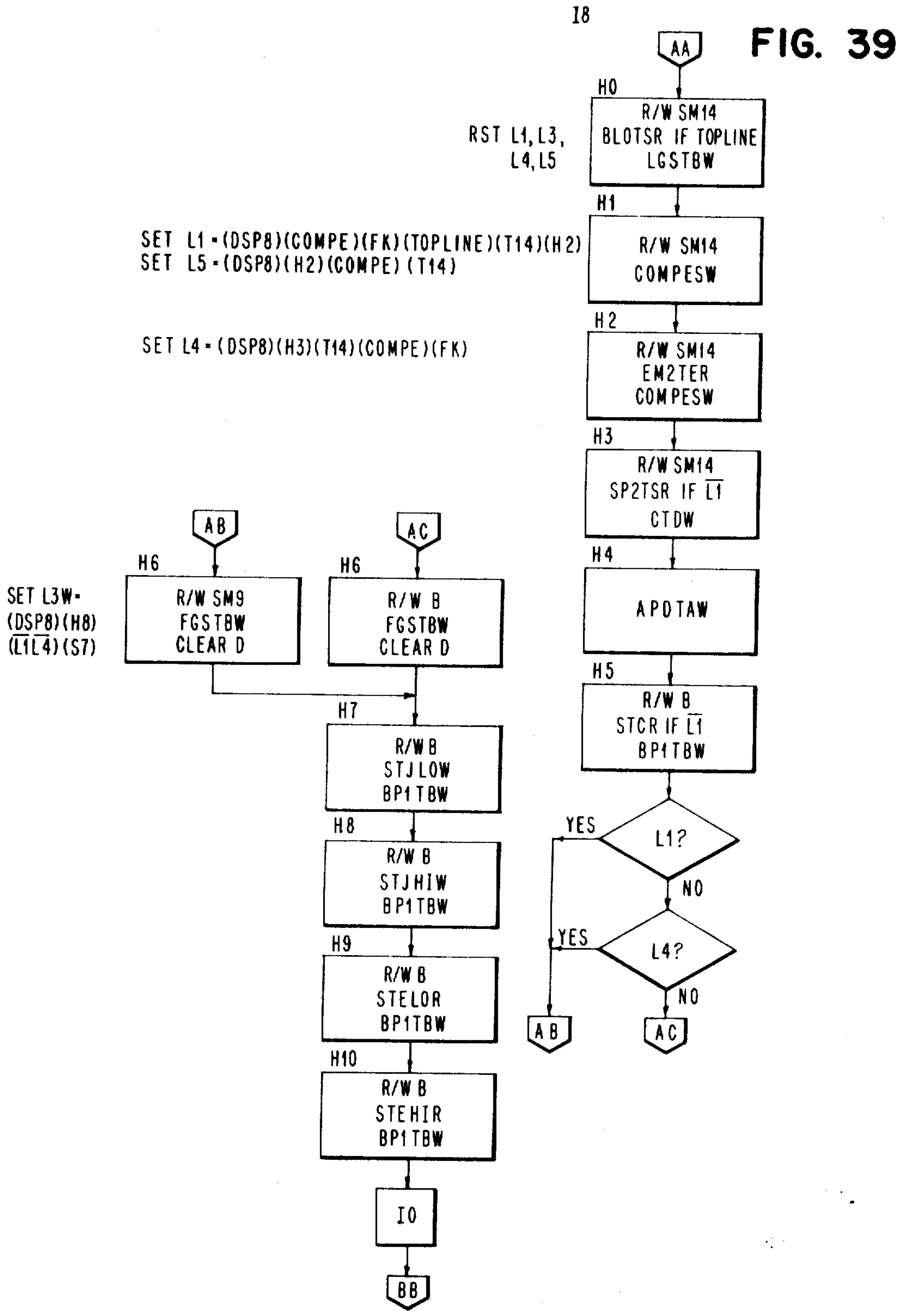

Referring now to FIG. 39 of the drawings, the operations effected during clock time I8 are depicted. During clock time H0, the number of the line to be displayed is stored in the B register. Thereafter, a determination is made as to whether the cursor will be displayed during this line and an appropriate indicator is set. Additionally, various indicators relating to the display of scale information are set during clock time H2. During clock time H3, the display line number is updated and during clock time H4, characters of the preceding line which were not displayed are skipped over by changing the address of the A register to the text character which is the first character of the line to be displayed. This can occur for one or more space codes past the last word on a line that exceed the right margin and are not to be displayed on either line. During clock time H5, the number of characters on the line to be displayed is loaded into the C register if a scale display is not effected. During clock time H6, the format number of the line to be displayed is obtained provided a scale is not to be displayed. Thereafter, during clock time H7 and H8, the left margin for the line to be displayed is stored in the J register and during clock times H9 and H10, the line length in escapement units of the line to be displayed is stored in the E register. As has been described before, during clock time I0, blank timing cycles are effected.

Figure 40:
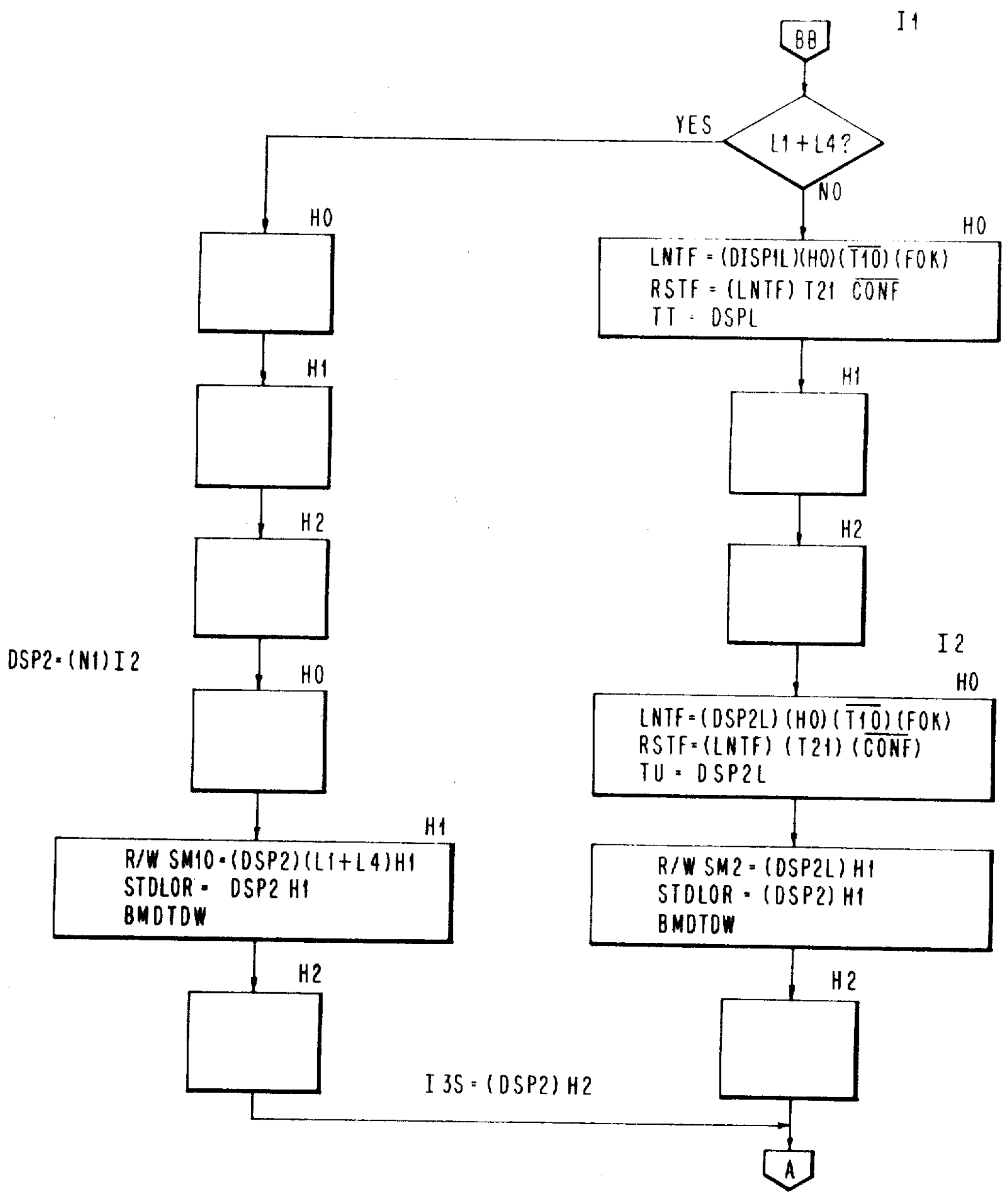

Referring now to FIG. 40 of the drawings, the system operation during clock time I1 is depicted. A test is first made to see whether scales are being displayed. Assuming the scales are not to be displayed, the ten's position of the line number of the line to be displayed is gated into the F register 75 of FIG. 2 during clock times H0–H2 and this digit is displayed. Thereafter, the system progresses to its I2 state whereupon the units position of the line number is displayed. As previously described, only the line numbers which are multiples of 5 are displayed. Additionally, during the H1 time of this operation, the cursor horizontal position is stored in the D register.

Figure 41:
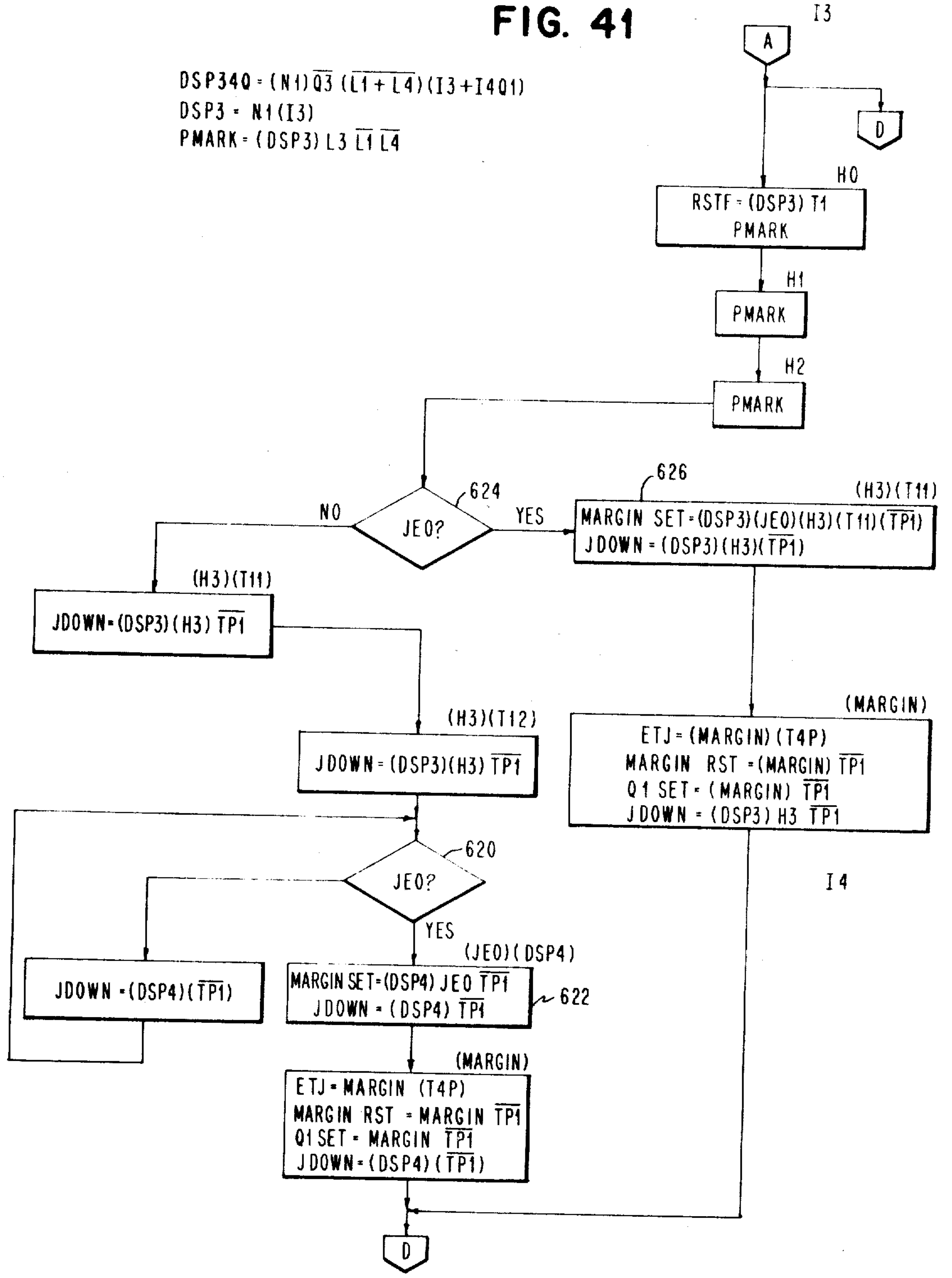

Referring now to FIG. 41 of the drawings, the operations effected by the system during clock time I3 are depicted. During this operation, the format character containing a paragraph mark designation for the displayed line is checked to determine whether a paragraph mark should be displayed. This paragraph mark is displayed during clock times H0 through H2. It will be recalled that the location of the left margin is contained in the J counter in terms of escapement units. After the display of the paragraph mark, if J does not equal 0, each scan line counts the contents of the J counter down until the point at which the left margin is to be displayed is reached. At this time, the contents of the J counter is equal to 0 and the operation proceeds from block 620 to block 622 which effects the display of the left margin indicator at that point. Additionally, the contents of the E register which designates the line length is transferred to the J register. Once the display of the margin has been effected, the spaces and characters on the line to be displayed are successively gated out. Eventually, the J counter reaches a count of 0 whereupon the right margin indicator is displayed. A special condition exists when the left margin is at its full leftmost limit. When this occurs, the count in the J counter is equal to 0 immediately after the display of the paragraph mark and the operation proceeds from block 624 to block 626. At this time, the left margin is immediately displayed and the contents of the E counter are transferred to the J counter and the operation proceeds as previously described.

Figure 42:
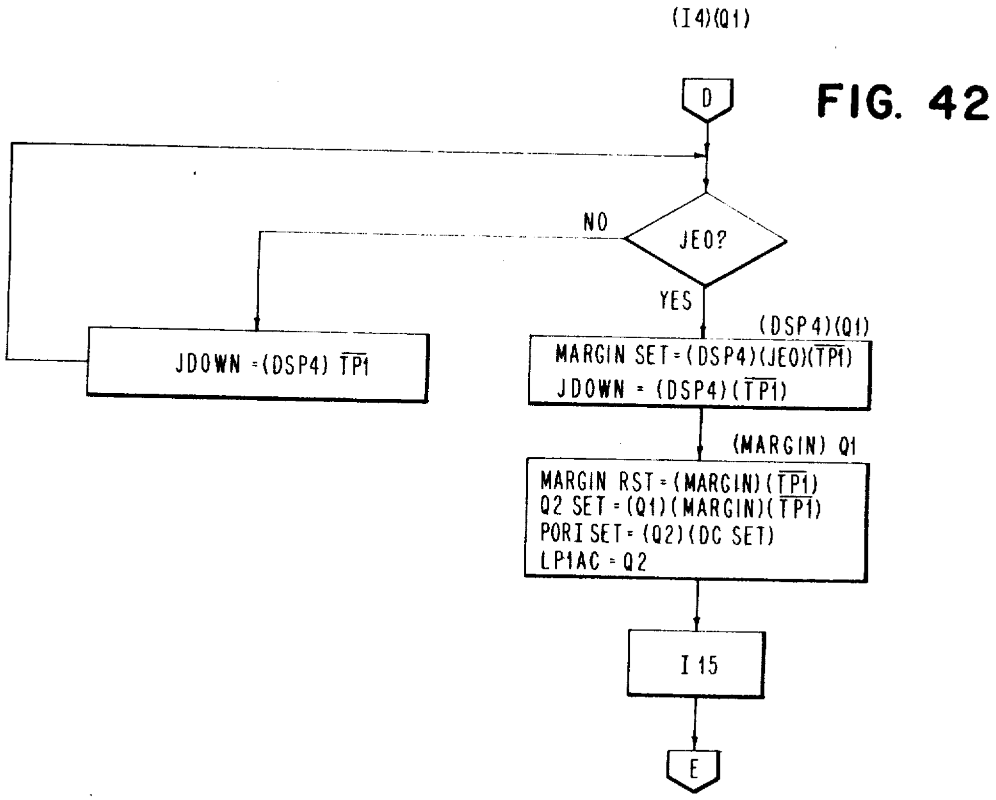

Referring now to FIG. 42 of the drawings, the operation which keeps track of the display of the right margin is depicted. This operation runs in parallel with the processor which is displaying the text. That is, the information content of the J counter is decremented with each scan line which in turn is a function of the display device. When the count in the J counter reaches 0, the right margin is displayed and the control clock is advanced to I15.

Referring now to FIG. 43 of the drawings, the operation of the processor when displaying text characters in a line of display is depicted. It will be recalled that two scan lines are effected for each H cycle which in turn includes a read/write cycle. Since the character having the minimum escapement contains four scan lines, it is necessary to effect two H cycles to display that character. Sine the access of the next character to be displayed and the appropriate calculations made during this access can be accomplished during one H cycle, the other H cycle is free for a cursor motion calculation or an interrupt operation. During this interrupt operation, a character may be processed from or to the card input/output unit. This interrupt cycle takes place when it is desirous to make such an I/O transfer during clock time H1 of the 14 display cycle. If no such input/output operation is effected during this time, the horizontal position of the cursor located in the D register is decremented by 1. If an I/O interrupt is effected, it takes three H0 cycles to perform the I/O operation. Thus, the I/O operation is effectively overlapped with the display of three characters. If an interrupt operation had been effected, it is necessary to decrement the horizontal position of the cursor located in the D register by 4 instead of by 1 to insure that the cursor is displayed in the proper position. During clock time H1, the next character to be displayed is accessed and retained in the S register and the address in the A register containing the text storage address of the character to be displayed is incremented by 1. As depicted in blocks 650 and 653, when the "T" clock keeping track of the number of scan lines does not equal the number of escapement units for the character displayed, the "T" clock continues providing additional dot times until the complete character is displayed. For proportional display, the escapement units are furnished by the EU decode identified as block 77 in FIG. 2. For standard display, this same decode is forced to render a 9 unit value. Once the complete character is displayed, the next character to be displayed is gated from the S register into the F register. Providing the number of characters does not equal 0 and the cursor horizontal position is not yet detected, the next character is thereafter displayed during clock times H0 and H1 and additional necessary clock times depending upon the width of the character. When the cursor position is located, it is displayed by the set cursor operation. When the last character on the line to be displayed has been displayed, the C counter equals 0 and the Q3 indicator is set. The Q3 indicator keeps the operation cycling through the H0 and H1 states without displaying text characters thereby providing for an I/O interrupt. Once the right margin location is reached, the right margin is displayed and the operation is terminated.

FIG. 44 relates to the display of scale information.

FIG. 45 is a timing diagram of the I2 through I4 states of the system during the display operation. As has been described, during the I3 state, the location of the left margin which is to be displayed is determined by counting the J counter down. When the J counter reaches the count of 0, (initial value assumed to be 9), the left margin is displayed and the line length escapement value (assumed to be 45) is transferred into the J counter. Thereafter, the I4 operation is initiated and the text characters are displayed.

CURSOR OPERATION

Referring once again to FIG. 1 of the drawings, it has been described how a cursor indicates visually the point of action. For a character operation, the point of action is defined as the character located adjacent to the cursor which is, of course, stored in the bulk text storage of FIG. 2. If a line operation is specified, multiple characters appearing on a line addressed by the cursor are involved in the specified operation. Thus, the cursor specifies, for example, the point at which a new character is inserted during an insert operation, a character to be replaced during a replace operation, a character to be deleted during a delete operation, a character to be underscored, the point at which a paragraph mark is to be inserted during a paragraph mark insert operation, and the character to be removed during an error correct backspace. All of these operations are character at a time operations. Additionally, the cursor specifies line operations such as the line to be adjusted to new margin boundaries, a line justification operation, deletion and underscore of all characters located to the right of the cursor on the line, and display frame control whereby movement of the cursor to a different multiple of eight lines effects the display of the newly addressed eight lines. The cursor may be moved incrementally a character at a time, or when in a different mode, can be moved a word at a time, line at a time, paragraph at a time, or frame at a time. The cursor may be moved to the right and to the left, up page and down page. All cursor motion is controlled by the cursor control keyboard 33 of FIG. 1.

Referring now to FIG. 46 of the drawings, the overall state diagram for cursor motion operations is depicted. A cursor motion operation is effected when the operator depresses a cursor key on the cursor keyboard. As has been described, the cursor moves a character at a time, a word at a time, a line at a time, a paragraph at time, or a frame at a time forward or backward in accordance with the keybutton depressed and in accordance with the mode of operation which the machine is placed into. For example, when the machine is in insert mode, the cursor is moved a word at a time when the operator depresses a horizontal motion cursor key. When the system is in replace mode, depression of the same key effects motion of the cursor by one character position. It should be noted that the cursor is also moved under the control of the word optimization operation, the input/output operation and various other control operations during the internal processing of text data. As has been described, the display operation always determines the frame to be displayed in accordance with the location of the cursor position.

During a cursor motion operation, the cursor factors which include the cursor line number, cursor horizontal position, and memory address of the character adjacent to the cursor are accessed. A test is then made to determine whether a page record operation has just been completed. If so, it is desirous to move the cursor to the first position of text storage and delete all text which was outputed and move the remaining text intact to the page start. If a record operation was not completed, the characters are restored to their special memory locations. Storage of the cursor factors in a special memory location prevents their being lost when a power off operation and a subsequent power on operation is effected. The cursor factors are again accessed from their special memory locations when the process counter assumes its I1 state as denoted by block 703. These cursor factors are located in various registers so that they may be later updated in accordance with the operation specified.

When the operator specifies a cursor left operation, the process counter assumes its I12 state and the text characters are scanned in the reverse direction from the text character adjacent to the cursor position. If the system had been in replace mode, and the rapid motion key had not been depressed, the text character located to the left of the cursor would be accessed from the storage unit and replaced. The address of this text character would then be utilized to denote the new cursor storage address and the register containing the horizontal position of the cursor is decremented by one character thereby giving a new horizontal position for the cursor. If, however, an insert mode operation was designated, the text characters are accessed until a space character following a previously accessed text character is found or until the left margin boundary is reached. As each character is read out, the cursor horizontal position is decremented by 1. When the operation ceases, the address of the character located to the right of the space character is utilized to define the new cursor address. If the rapid motion key had been depressed, the operation moves at three-word jumps. Release of the rapid motion key during this type of scan causes the cursor to halt its motion at the beginning of the next word which is accessed following the release of the key or the motion will halt at the left margin. If the operator places the cursor adjacent to the left margin and thereafter specifies a cursor left operation, the cursor is moved to the rightmost position of the preceding line and proceeds as has been described. Once the new cursor factors have been determined, the process counter is set to its I3 state and these factors are stored in their special memory locations.

In the one instance where the cursor is moved to the preceding line or when an operation other than a cursor left operation is specified, the process counter assumes its I2 state. This state has graphically been depicted as two blocks, 705 and 707 although these blocks are both part of the I2 cycle time of the system and are defined by their unique H times. During the first portion of the I2 state, the output flag information specifying the last line of a page being outputed which the cursor is prevented from addressing, the paragraph information, and the margin group information is accessed from the line group information register. During the cursor left operation as has been described, the line factors for the next higher line are thereafter accessed and the cursor vertical and horizontal positions are calculated so that the cursor may be placed adjacent to the rightmost keying position of the line. Thereafter, the I3 state is assumed as has been previously described. Also, during a cursor up operation or a paragraph up operation, the factors for the next higher line are obtained and the cursor horizontal position is moved so that the cursor is adjacent to the leftmost character of the line. If a single cursor up operation has been specified or if the line group information indicates that the next line has a paragraph mark on it, the processor assumes its I3 state. If the paragraph up key had been depressed and a paragraph mark were found located on the next higher line, the cursor continues to move upward until such a paragraph designation is found or until the top line which can be accessed is located.

If the rapid motion key has been depressed, and the cursor up key is depressed, the operation remains in the loop between block 705 and 707 until eight lines have moved up which is cursor motion by frame. At this time, the operation proceeds to the I3 state.

Thus far, a cursor up, paragraph up, and cursor left operation have been described. In the following description, a cursor right, cursor down, and paragraph down operation will be described. When such an operation is specified, the operation proceeds to its I4 state from block 705 to block 709. During time I4, the factors which define the next lower line including the number of characters located on the line are accessed. Thereafter, the operation proceeds to an I5 state whereupon the line group information defining the line which was previously accessed controls movement of the cursor to the right and down. It is during this operation that the text is actually accessed and modified in accordance with the operation specified (e.g. delete, underscore, etc.) and the operation continues until a stopping point is reached. If a single character is to be deleted or if the cursor is to be moved one character to the right, the operation proceeds immediately from block 711 to block 713 after one character has been accessed. However, if the cursor is to be moved through an entire word or if the word is to be deleted etc., the operation remains in block 711 until all of the characters of the word have been deleted. In a similar manner, if a cursor down or paragraph down operation has been defined, all of the characters remaining on the line addressed by the cursor are accessed in block 711 until the rightmost margin is reached. Thereafter, the operation proceeds to block 713 whereupon various tests are made to determine whether the operation should be terminated or should continue. In all operations except a delete operation, the cursor factors are stored in their special memory locations prior to accessing the next lower line. Thus, the operation proceeds from block 713 to block 715. If a valid stop point had not been reached, the operation proceeds from block 715 back to the I4 state defined by block 709 and the factors for the next lower line are obtained. This operation continues until a stop point, such as a paragraph mark found during a paragraph down operation is reached. At this point, once the cursor factors have been stored during processor control time I3, the operation halts.

If a delete operation had been specified, the operation loops from block 713 to block 709 until a valid stop point is reached. At this time, the operation ceases and the word optimization operation is entered. The cursor factors which are presently in storage at that time locate the cursor location which existed at the beginning of the operation. That is, during a delete operation, it is desirous to leave the cursor in its present position and to shift text which is not deleted up page so that it is adjacent to the cursor, the deleted information being removed from the text storage unit.

Figure 47:
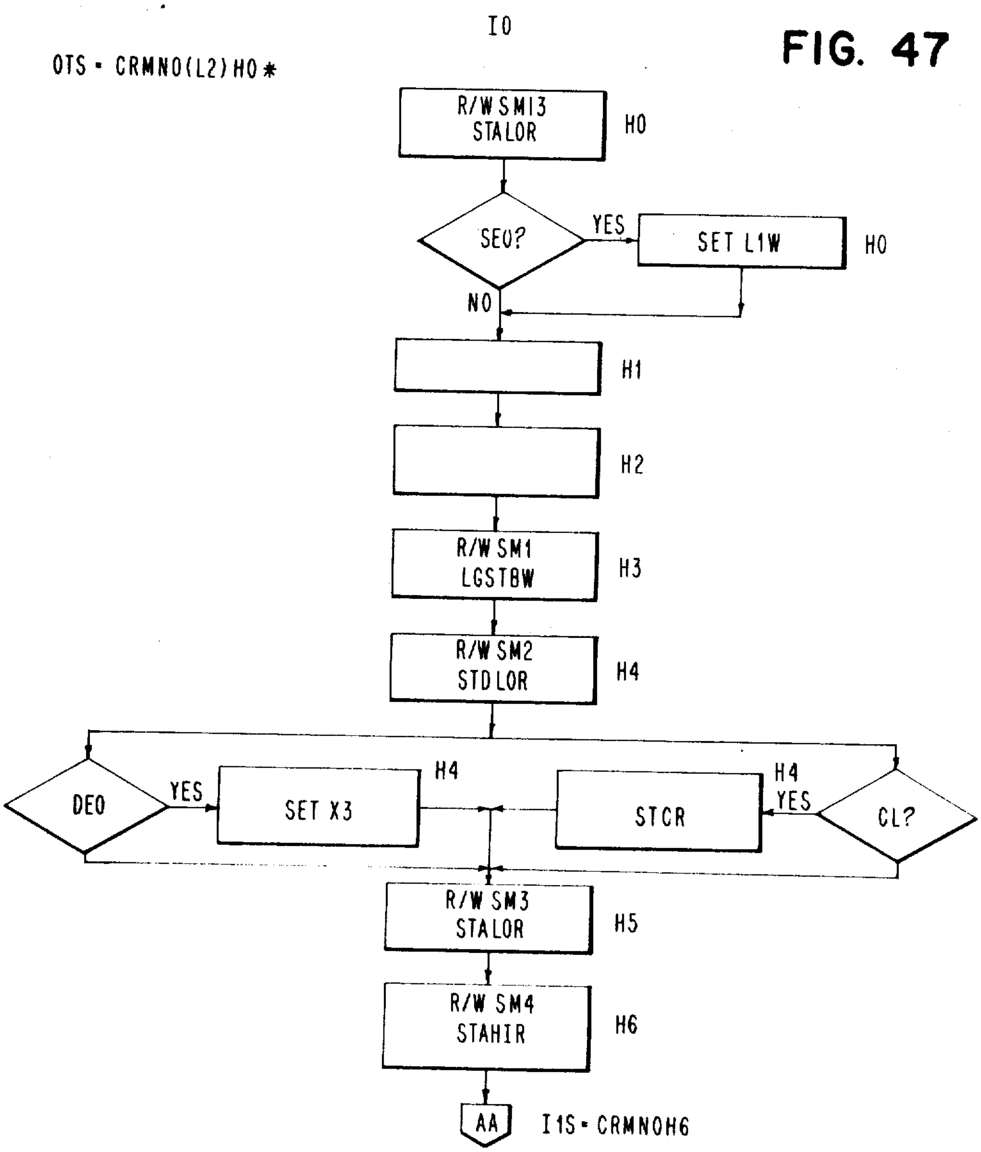

Referring now to FIG. 47 of the drawings, the processor operations defined during the I0 state of a cursor motion operation are depicted. During the I0 state, the end of text line number is sampled to check if it is located at the top of the text storage unit. If it is, the L1 indicator is set for later utilization. Thereafter, the cursor factors are accessed from the special memory locations and various indicators are set if the cursor is located at its leftmost horizontal position or if a cursor left operation is specified. The remaining cursor factors are read during clock times H5 and H6. As has been described, a 0 is set into the sense register during all clock times except H0 during a page delete operation. In this manner, the cursor is placed adjacent the first position in the memory and located at the leftmost position of the top line of display. The delete operation is thereafter effected until the output flag indicator is found.

Referring now to FIG. 48 of the drawings, the operations effected during clock time I1 are depicted. This operation is virtually identical to that described previously with respect to the I0 state, except that the page delete operation is not effected and a test is made as denoted by block 717 to determine whether a cursor left operation is in progress. If such an operation is in progress and the various other conditions described heretofore with respect to a cursor left operation have been satisfied, the I12 state is assumed.

Figure 49:
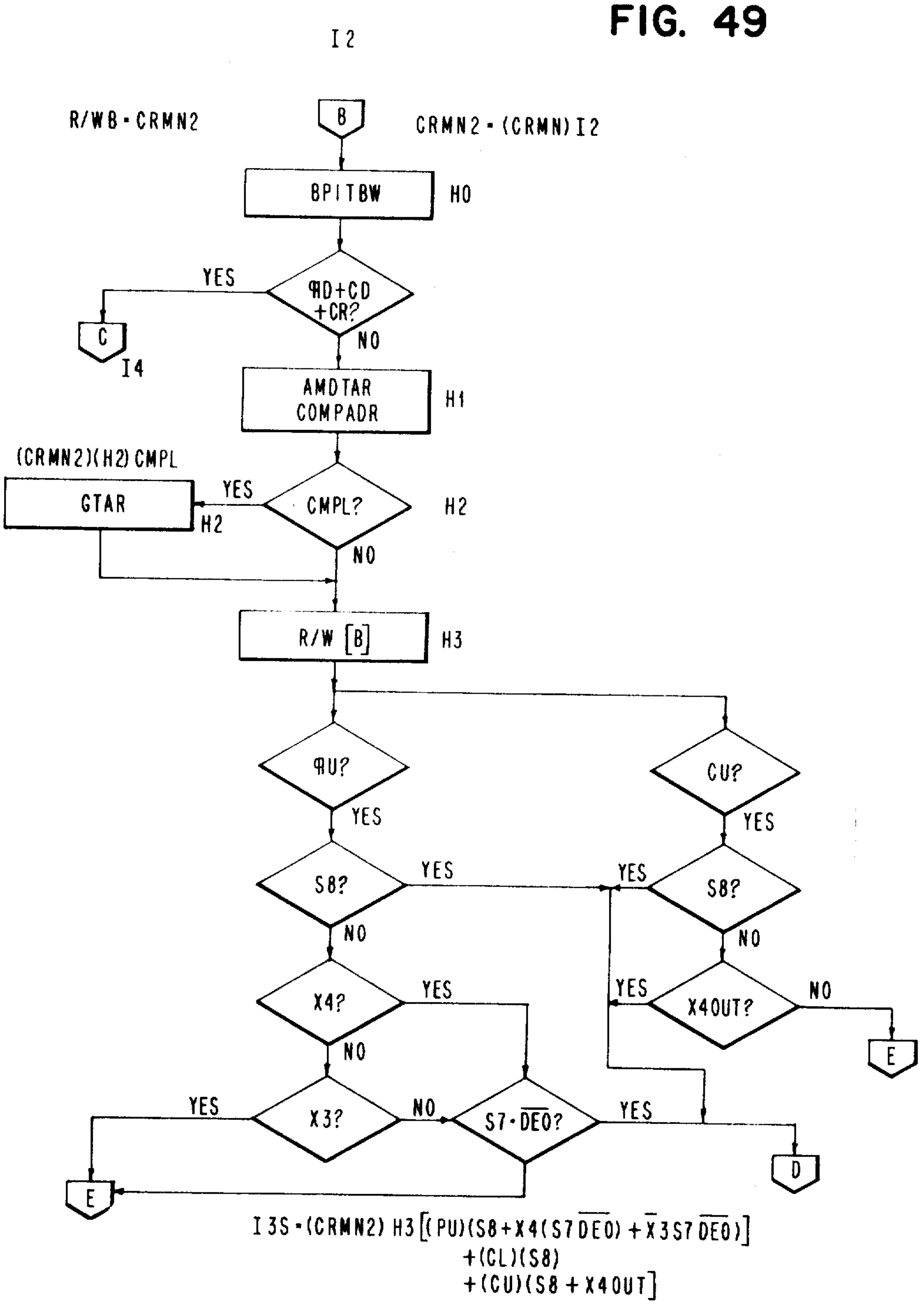

Referring now to FIG. 49 of the drawings, the operation effected during processor time I2 of a cursor operation is depicted. During this operation, the B register is advanced to address the line group information of the line on which the cursor is located and, if a paragraph down, cursor down or cursor right operation is specified, the operation proceeds to clock time I4. During a cursor left or cursor upward operation, the text address is set to the start of the line during clock time H1. An error check is made during clock time H2 and the line group information is accessed during clock time H3 with tests being made to determine whether paragraph marks, etc. exist. Thereafter, the operation proceeds directly to the I3 state during a paragraph up operation and an output flag is found, or if a paragraph symbol is found and the cursor was not originally located at the left margin. Additionally, the I3 state is assumed when the output flag (S8) is located during a cursor up or cursor left operation or when it is determined that during a rapid motion operation, eight lines have been examined. If the operation does not proceed directly to the I3 state, it proceeds through connector block E to connector block E of FIG. 50. A check is made as denoted by block 719 of FIG. 50 to determine whether the top of the page has been reached, in which case the I3 state is assumed. If the top line is not being accessed, the next higher line is accessed and the number of characters on the line is transferred to the D register and to the C register if a cursor left operation is specified. If a cursor left operation is specified, the operation proceeds directly to I3. It continues to loop through I2 if a cursor left operation is not specified.

Figure 50:
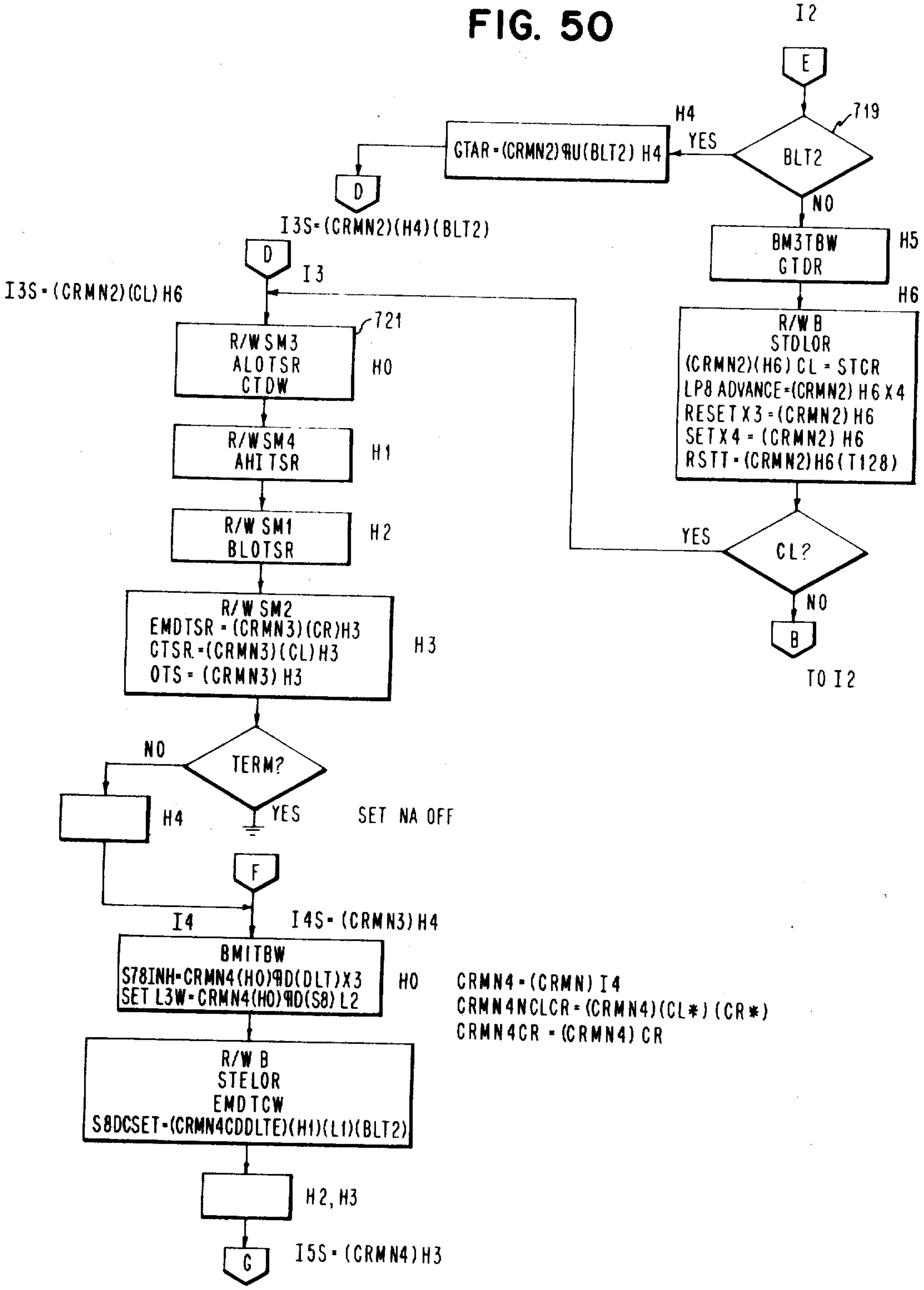

The operation of the system during clock time I3 is further described in FIG. 50. During clock time H0 of that cycle, as defined by block 721, the low part of the cursor memory address is stored. Thereafter, various other cursor factors are stored and indicators are checked to determine whether the operation should be terminated or to determine whether a cursor right, cursor down, or paragraph down operation is in process without having found a valid stop point. Thereafter, the operation proceeds to clock time I4 during which time the number of characters located on the cursor line to the right of the cursor is determined and the paragraph mark is deleted if the line initially addressed by the cursor is being deleted. The output flag is sampled and sets the L3 latch for later utilization, and an automatic delete operation is specified if the L1 latch had been previously set indicating an error condition. Thereafter, the operation proceeds to the read forward operation defined by clock interval I5.

Figure 51:
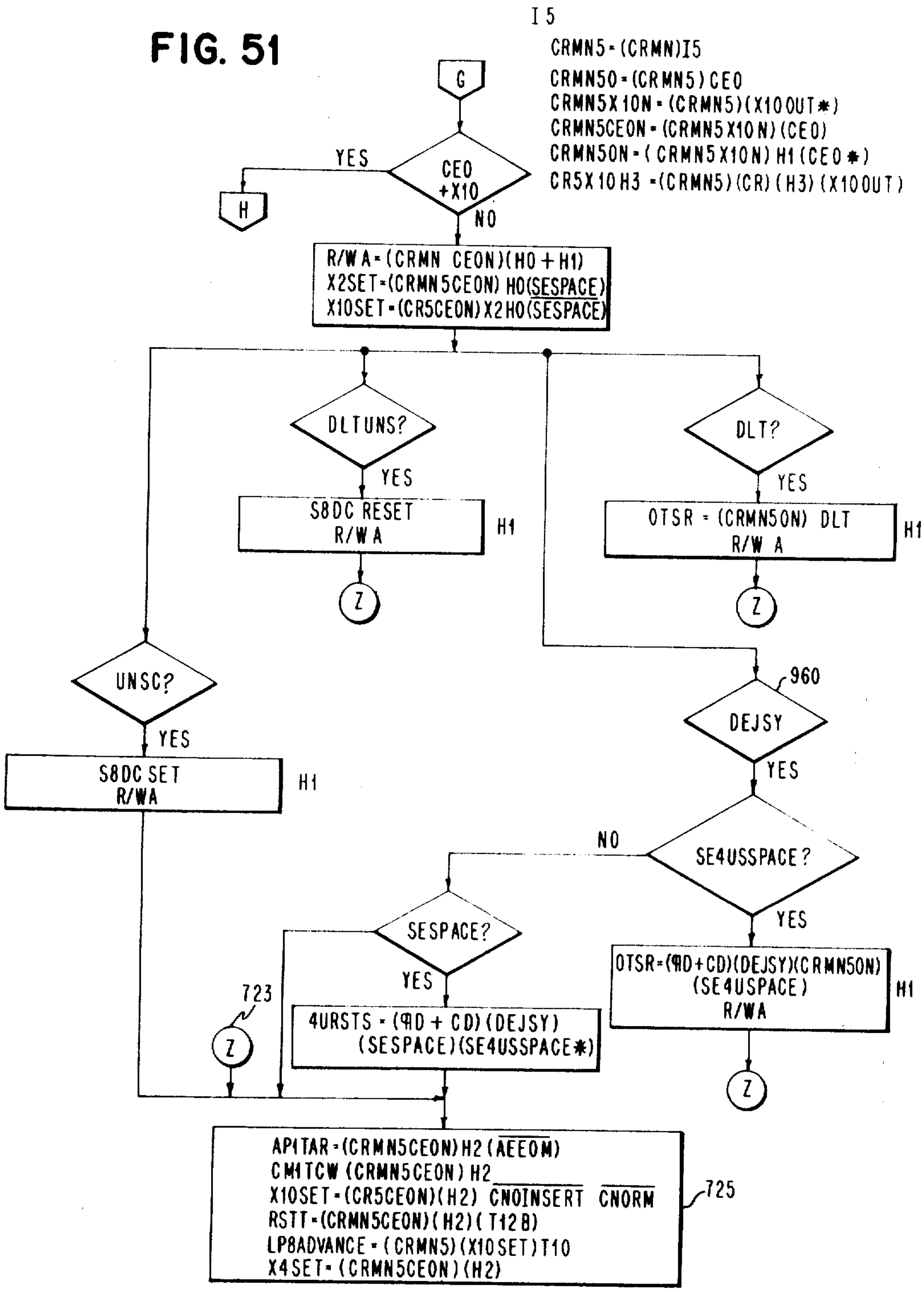

Referring now to FIG. 51 of the drawings, when the I5 operation is entered, a check is initially made to determine whether any characters remain on the line addressed by the cursor or whether the X10 latch indicating termination of the operation has been set. If a termination condition has not been noted, a text character is read and the X2 latch is set if a space character is detected. The X10 latch is set if a space character had been previously found and a non-space character was thereafter found. At H1 time, the storage location is again read and a check is made to determine whether it is an underscore operation, a delete underscore operation, a dejustify operation, or a delete operation. If none of these operations are specified, the operation proceeds directly to entry point Z denoted by numeral 723. If an underscore operation had been specified, the character is rewritten back into text storage with an underscore flag. If a delete underscore operation is specified, the character is rewritten into text storage without its underscore flag. If a delete operation is specified, a blank character replaces the character read out of memory and if a dejustify operation is specified, a test is made to determine whether the character read is a character other than a special space character having more than 4 escapement units. Thereafter, the operation proceeds to block 725 where the memory address is incremented and the number of characters remaining on the line is decremented. The X10 latch is set if in the character mode, the counter which keeps track of multiple operations is advanced, and the X4 latch is set to remember that the loop has been passed through at least one time.

Figure 52:
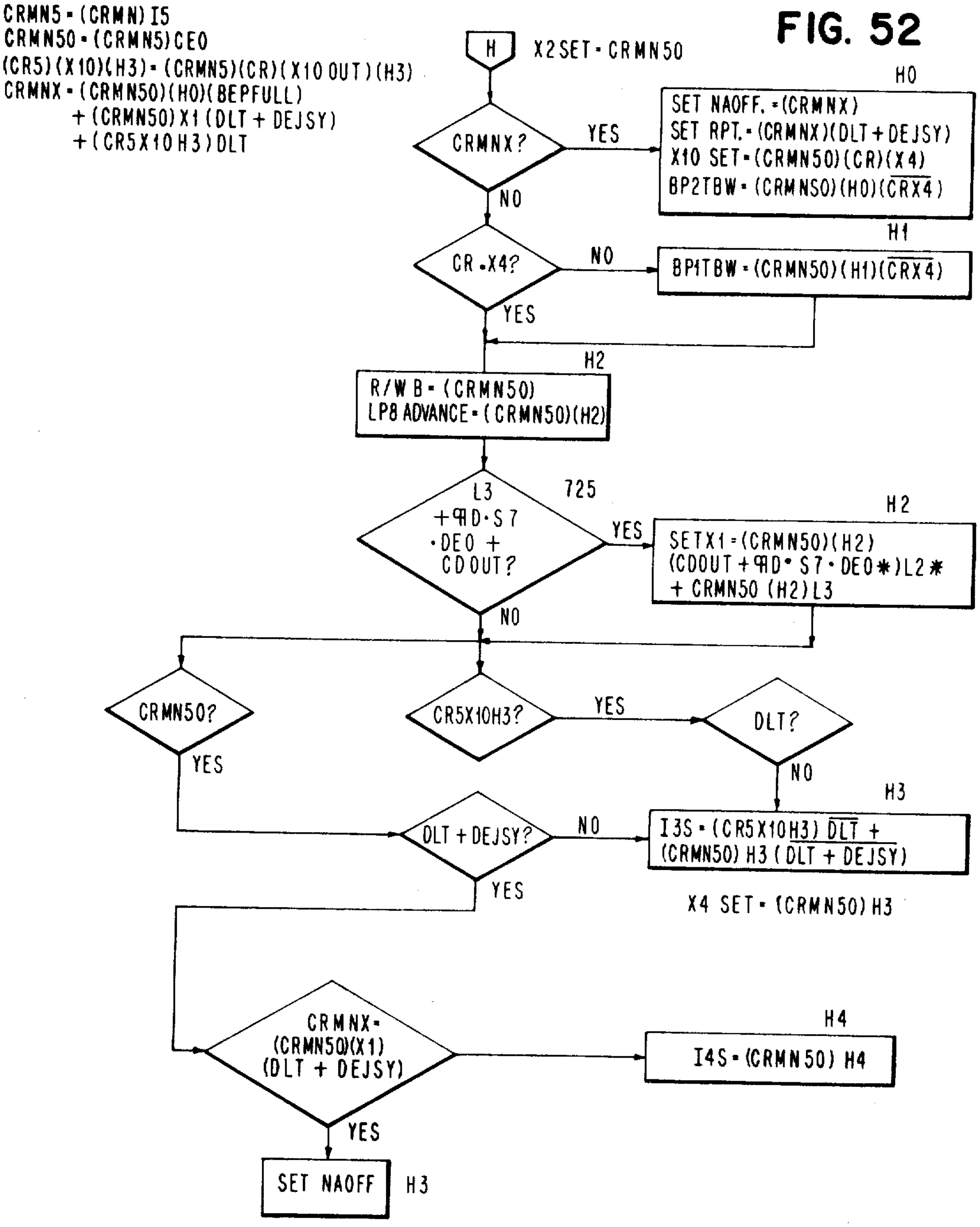

Referring now to FIG. 52 of the drawings, that portion of clock interval I5 is depicted wherein an ending condition has been met. When a delete or dejustify operation has been completed, the word optimization operation is to be specified. As denoted by block 725, a test is made to determine whether the output flag was found, whether a paragraph down operation is specified and the paragraph mark found in a non zero line, whether a line down without rapid motion is specified, or whether the cursor had moved through eight lines during a rapid motion down operation. In each of these cases, the X1 indicator is set so that the operation may thereafter be terminated. Provided that a delete or dejustify operation has not been specified, the operation thereafter proceeds to I3 whereupon a test is made as has been described to determine whether the X1 indicator is on or other terminating conditions are met. If so, the operation is terminated. If, however, these conditions are not met, the operation continues to loop through, as has been described, with respect to the delete operation.

Figure 53:
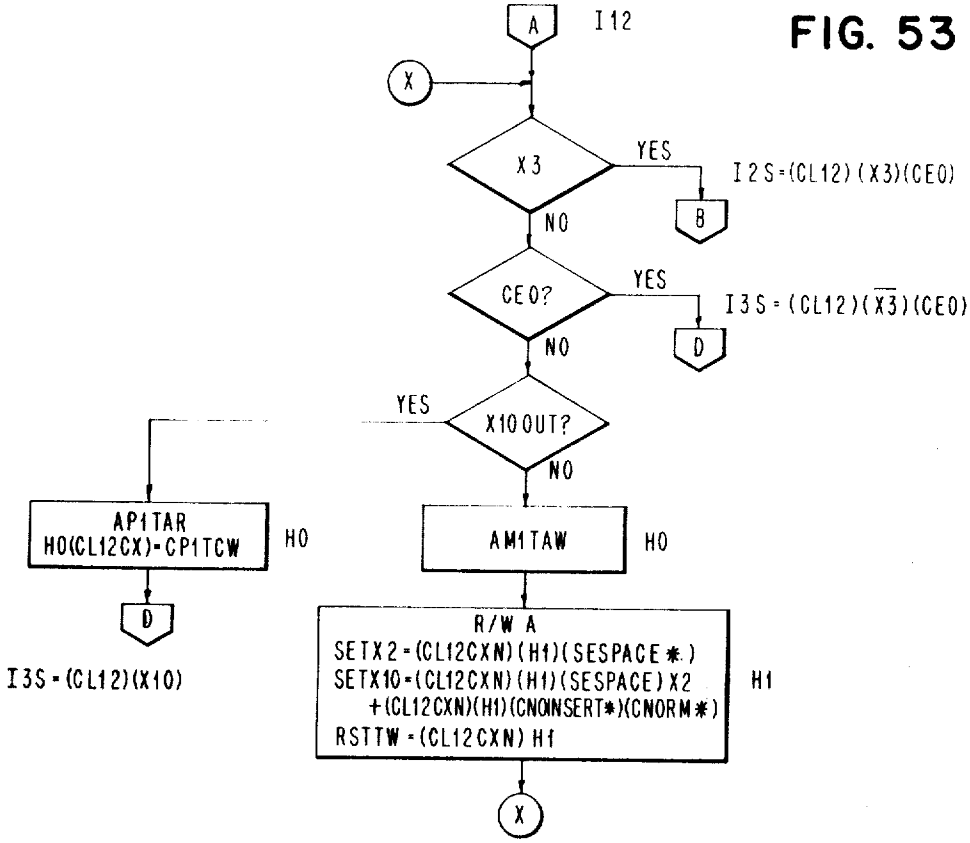

Referring now to FIG. 53 of the drawings, the operation of the processor during clock time I12 is depicted. This operation is effected during the reverse scan of the line when a cursor left operation has been specified. The X3 indicator is tested to determine whether the operation was initiated when the cursor was adjacent to the left margin. A test is then made to determine whether the left margin has been reached. Thereafter, the stopping condition is tested to determine whether the operation is complete. If the operation is not complete, the first non-space character is accessed and thereafter, the first space character is accessed. Once the first space character has been accessed, the cursor is backed up one position to the right to address the first text character of a word.

The foregoing has related to the word optimization operation, the display operation, and the cursor motion operation of the visual editing system of the present invention which incorporates controls for justifying and dejustifying display text. As has been described, once the text is entered and optimized, it may thereafter be justified by the insertion of additional space between text characters. In the description which follows, a device is described wherein the additional space is inserted between words of text characters, it being understood by those skilled in the art the additional space could also be distributed between each of the various text characters resulting in innerletter spacing. Further, both methods of justifying, that is, distributing innerword spaces and innerletter spaces may be utilized in the same system. Each of these methods of calculating justification data are in themselves well known in the graphics art. Therefore, the following description which relates to innerword spacing is deemed sufficient to appraise ones skilled in the art of the various justification techniques well known in the art which could be utilized in lieu of the specific embodiment to be described.

It should be noted that the justification operation, like the word optimization operation, is done serially with the display operation and thus shares with the word optimization operation and display operation, the various registers and storage units depicted in FIG. 2 of the drawings.

Prior to entering into a detailed description of the justification operation, it should first be noted that the space characters stored in the bulk text storage unit are generally decoded as four unit space characters. A different coded character can be utilized to designate a five unit space character, a still further code can be utilized to designate a six unit space character and a still further code can be utilized to designate a seven unit space character. Additionally, a special code is utilized to designate special four unit space characters as will be described. In operation, the processor calculates the line deficit which must be replaced with additional innerword spacing. Thereafter, the line deficit is distributed equally among the various innerword spaces. If this results in each innerword space being, for example, six escapement units, the special six unit space code is substituted for the normal four unit code. If the escapement values of the innerword spaces exceed seven escapements units, it is necessary to use combinations of space codes to specify the innerword space. Thus, additional space codes are inserted into the data stream necessitating the opening up of the text storage unit to receive these additional spaces. As will be described here-in-after, during a dejustify operation, all special space codes are removed and all but the special four unit codes are replaced by a four unit regular code.

Referring now to FIG. 54 of the drawings, the overall block diagram of the justification operation is depicted. As indicated by block 750, certain indicators are set and various factors are accessed immediately following the operators specification of a justify operation. During clock time I1, a test is made to determine whether any characters are located on the line for which the operator specified the justify operation. Assuming that a character was existing on the line, a line scan reverse operation is effected and the space characters between words are counted. During the same time, the escapement values of each of the characters examined during the reverse scan are added to an escapement counter. At the completion of a reverse scan operation, the operation proceeds to clock time I3 wherein a forward scan of spacing which may exist at the line beginning is effected and space codes which are encountered are subtracted from the innerword space code count. Prior to doing the forward scan, a test is made to determine whether the escapement units encountered during the scan are exactly equal to the number of escapement units specified for the line. In this case, the line is justified. Assuming that the line was not previously justified, the first and last character on the line are stored in special memory locations and replaced by special flag characters which indicate the beginning and ending of the line. The operation then proceeds to clock time I5 wherein a calculation is made to determine the value that the innerword spaces must assume to achieve a justified line. A special test is made to determine if a one word line exists. In the special case, the justification operation is not effected.

Assuming more than one word on a line, the operation proceeds to clock time I6 wherein a calculation of the number of spaces which must be inserted into the data stream is effected. It will be recalled that it is not necessary to insert additional spaces unless the innerword space value calculated during clock time I5 exceeds seven space units for any space character. When the innerword space value exceeds seven escapement units, the total number of escapement units specified for each innerword space is divided by four and the result of this division operation specifies the number of innerword space characters which are inserted between each word. Thereafter, the operation proceeds to clock time I7 where the text characters located in the storage are shifted down page from the end of text position by the number of additional space characters which must be inserted. This operation stops when the flag that marks the end of the line to be justified is encountered. During clock time I8 the last character on the line is restored to its memory location and displaced in text storage by the number of special space characters to be inserted. Thereafter, the operation proceeds to clock time I9 where the text characters are scanned in the reverse direction and a test is made to determine whether a space character is encountered. When a space character is encountered, the operation proceeds to clock time I11 wherein the existing space code is changed to a five, six, or seven unit escapement in accordance with the remainder specified in the division by four operation. That is, if it had been determined that 14 additionals units had to be added to each space character, the division by four operation would indicate three with a remainder of two. Thus, three four unit special codes and one six unit special code would specify the total space escapement.

During clock time I11, the existing four unit code is changed to a six unit code in the above example. Additionally, the additional special four unit codes are inserted into the data stream. Thereafter, the operation proceeds to its I12 state where a test is made to determine whether any additional escapement units resulting from an unequal distribution of escapement units for innerword spacing exist. This occurs whenever the total number of escapement units to be added cannot be equally divided amongst all the innerword spaces. When this occurs, the innerword spaces located at the end of a line are expanded by one additional escapement unit. These additional escapement units are kept in an counter and each time one such unit is added to a space character the counter is decremented. If such additional escapement units are in the counter, a test is made of the special space character to determine whether it has a seven unit escapement. If it is not a seven unit escapement character, the one additional unit can be added thereto and the operation proceeds in a reverse scan operation. If, however, a seven unit space character had previously been specified during clock time I11, it is necessary to insert an additional four unit space character. This operation is effected during clock time I13.

Summarizing, the operation proceeds from clock time I9 to clock time I11 each time an innerword space is located during a reverse scan operation. During clock time I11 through I13, the proper amount of innerword spacing is specified and inserted into the data stream. Eventually, the scan line backward operation is completed when the flag character indicating the start of a line is reached. The operation then proceeds to clock time I10 where the flag character is replaced by the first character located on the line and thence to clock time I14 where a test is made to determine whether the next lower line should be justified. This operation occurs when a paragraph justification operation has been specified.

Figure 56:
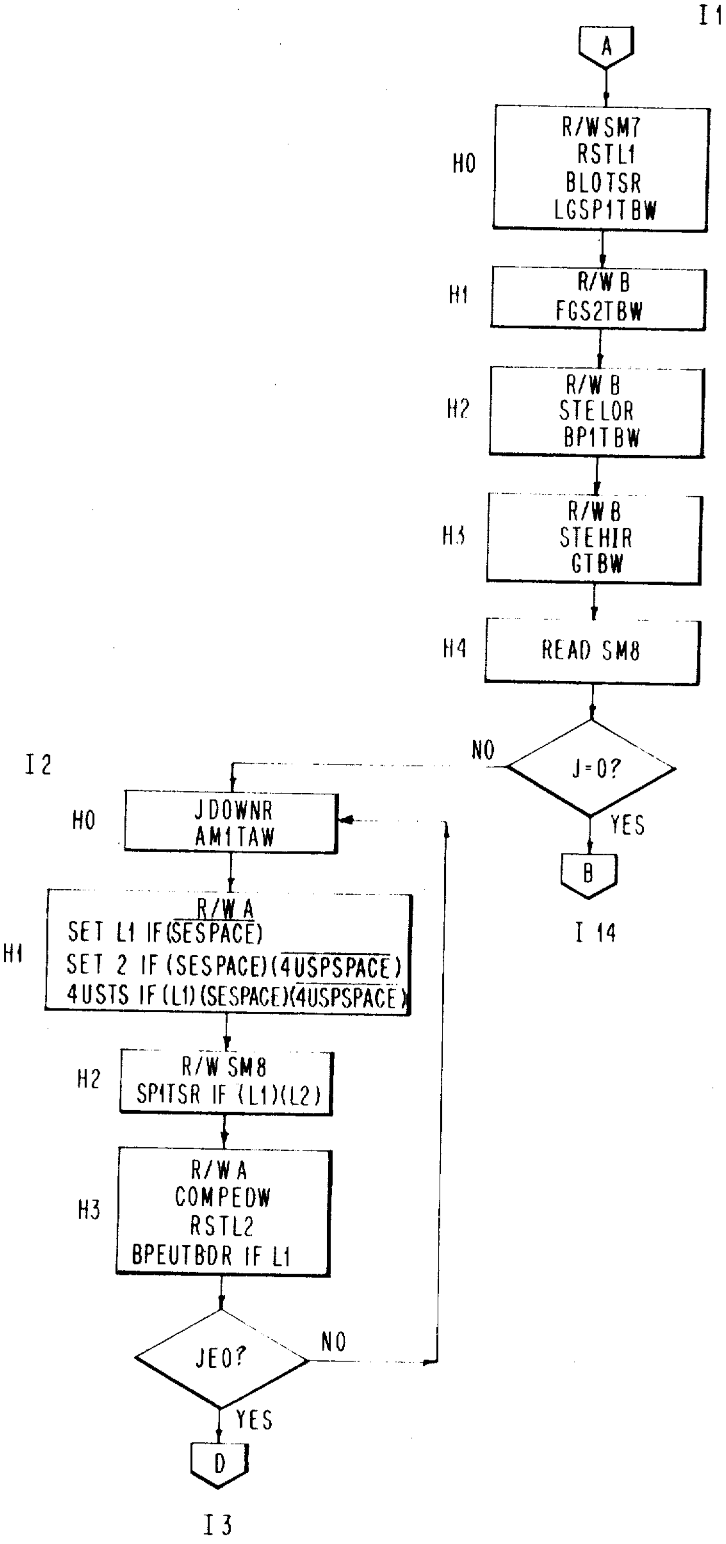
Figure 57:
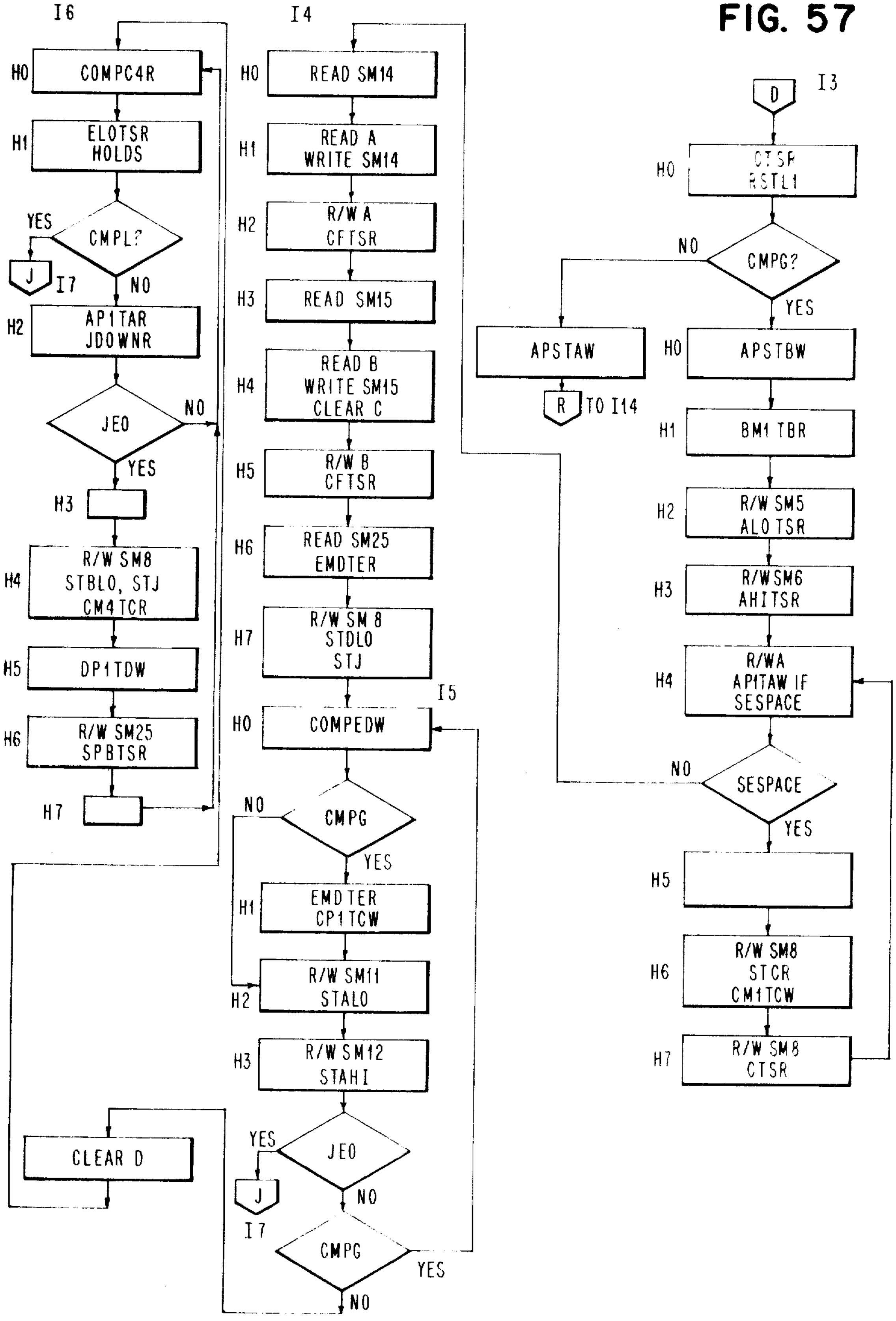
Figure 58:
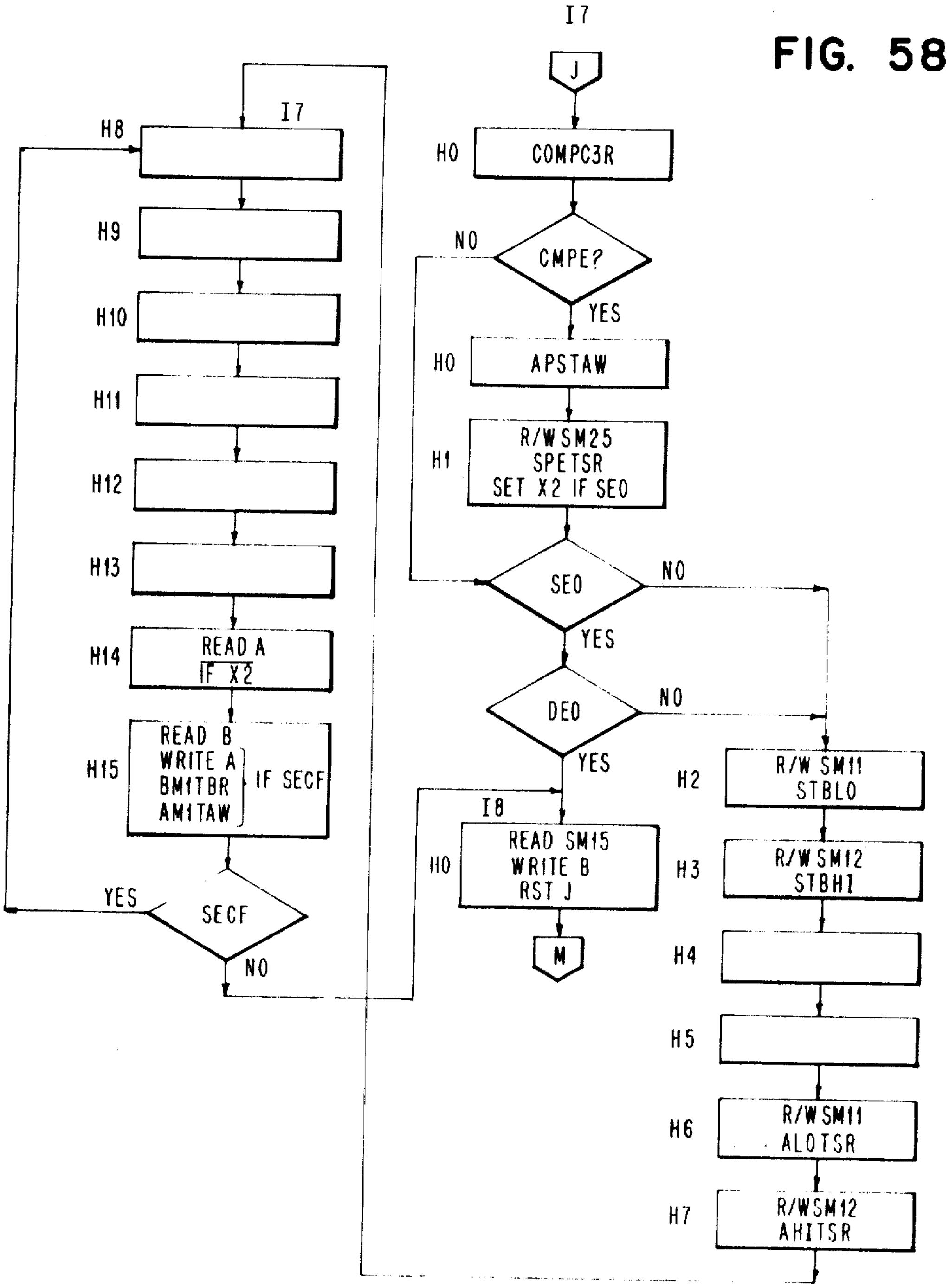

Referring now to FIG. 55 of the drawings, the detailed system operations which are affected during clock time I0 are depicted. During this clock time, the cursor line number, cursor horizontal position and cursor address are located and the cursor address is stored in the A register. Thereafter, during clock time H4, registers D and J are set to 0 and during clock time H6, the number of characters on the cursor line is read from the special register location and stored into the C, J, and D registers. Thereafter, the A register addresses the first character on the next lower line. During clock time I1 as depicted in FIG. 56, the line number of the line to be justified is stored in the special memory 7 location, the format number for the line to be justified is stored in the B register, and during clock times H2 and H3, the line length of the line to be justified is stored in the E register. Thereafter, a test is made to determine whether characters exist on the line. If no characters exist on the line, the operation proceeds to its I14 state where it is terminated. Otherwise, the operation proceeds to its I2 state and a reverse scan operation is effected.

During the reverse scan operation, the number of characters located on the line as stored in the J counter is reduced by one each time a character is read. During clock time H1, space characters which are encountered at the end of the line are ignored. Thereafter, once text characters have been scanned, each space character read is counted as an innerword space during this clock interval. During clock interval H3, the escapement value of the character read is added to a counter and a test is made to determine if any characters remain. Once the end of the line is reached, the operation proceeds to its I3 state shown in FIG. 57 wherein spacing existing in the line beginning is subtracted from the innerword space counter. During clock time H0, a test is made to determine whether the line exceeds or equals the specified format width. If it does, it means that the line has either previously been justified or has not been optimized in which case the operation proceeds to its I14 state and terminates. If the format width is not exceeded, the D register is made to address the line end character and the contents of the A register are stored during clock times H2 and H3. The A register addresses the line beginning.

During clock time H4, a forward scan operation is effected wherein spaces at the beginning of a line are subtracted from the total innerword space count. Thereafter, when the first text character is located, the operation proceeds to its I4 state wherein flags are inserted for the first and last characters on the line. The operation then proceeds to its I5 state wherein the number of units to expand each innerword space is calculated. During this operation, the J register contains the number of innerword spaces, the E register contains the units to be added to the line, the D register contains the number of innerwordspaces spaces and the C register contains the number of units needed to expand each space. During clock time H0 thru H3, the number of units that each innerword space is to be expanded is calculated and stored in the C register. The remainder, if any, is left in the E register. This remainder refers to those escapement units which cannot be equally distributed among each innerword space. Thereafter, the operation proceeds to clock time I6.

During clock interval I6, the number of four unit special spaces to be inserted for each innerword space is calculated and the end of text address is shifted down page by a corresponding amount. The number of units to expand each space is contained in the C register. A test is then made to determine whether each space is to be expanded by less than four units. If not, one is added to the end of text address during clock time H2 for each four units of space to be inserted. A test is then made to determine whether the J counter is equal to zero. The J counter contains the number of spaces on a line. Thereafter, during clock time H4, the number of innerword spaces is loaded into the B and J register and the number of spaces to be inserted for each such internal space is calculated during clock time H5. During clock time H6, the total number of 4 unit spaces to be inserted is calculated and stored in the D register. Eventually, when the number of escapement units remaining is less than four units, the operation proceeds to its I7 state depicted in FIG. 58 of the drawings.

During clock interval I7, the number of spaces to be inserted is modified by the remaining units which could not be equally divided among the innerword spaces. Thus, a calculation is made to determine whether these remainder units will effect the placement of additional four unit spaces into the data stream. During clock time H0, the A register contains the remaining units which must be added to each space character. This thus specifies whether five, six, or seven unit spaces will be utilized in accordance with whether the value is 1, 2, or 3 respectively. If the value is 3, the additional escapement units which were not equally distributed amongst each innerword space will necessitate na additional four unit space. Thus, if the remainder is 3, a number of four unit spaces equal to the number of undistributed escapement units is added to the number of spaces to be inserted. A test is made during clock time H1 to determine whether the total number of spaces to be inserted is equal to zero. If it is, a test is then made to determine whether the contents of the D register containing the number of spaces to be inserted for each internal space is equal to zero. If it is, the flag character is restored at the line end and the operation proceeds directly to clock interval I9. If the total number of spaces to be inserted is greater than zero, it is necessary to update the end of text storage position and store the new end of text address. Thereafter, the operation proceeds to its I7 state whereupon the text characters located in storage are shifted to the right by a number of characters equal to the number of innerword spaces to be inserted. This operation stops when the flag character at the end of the line to be justified is encountered.

Figure 59:
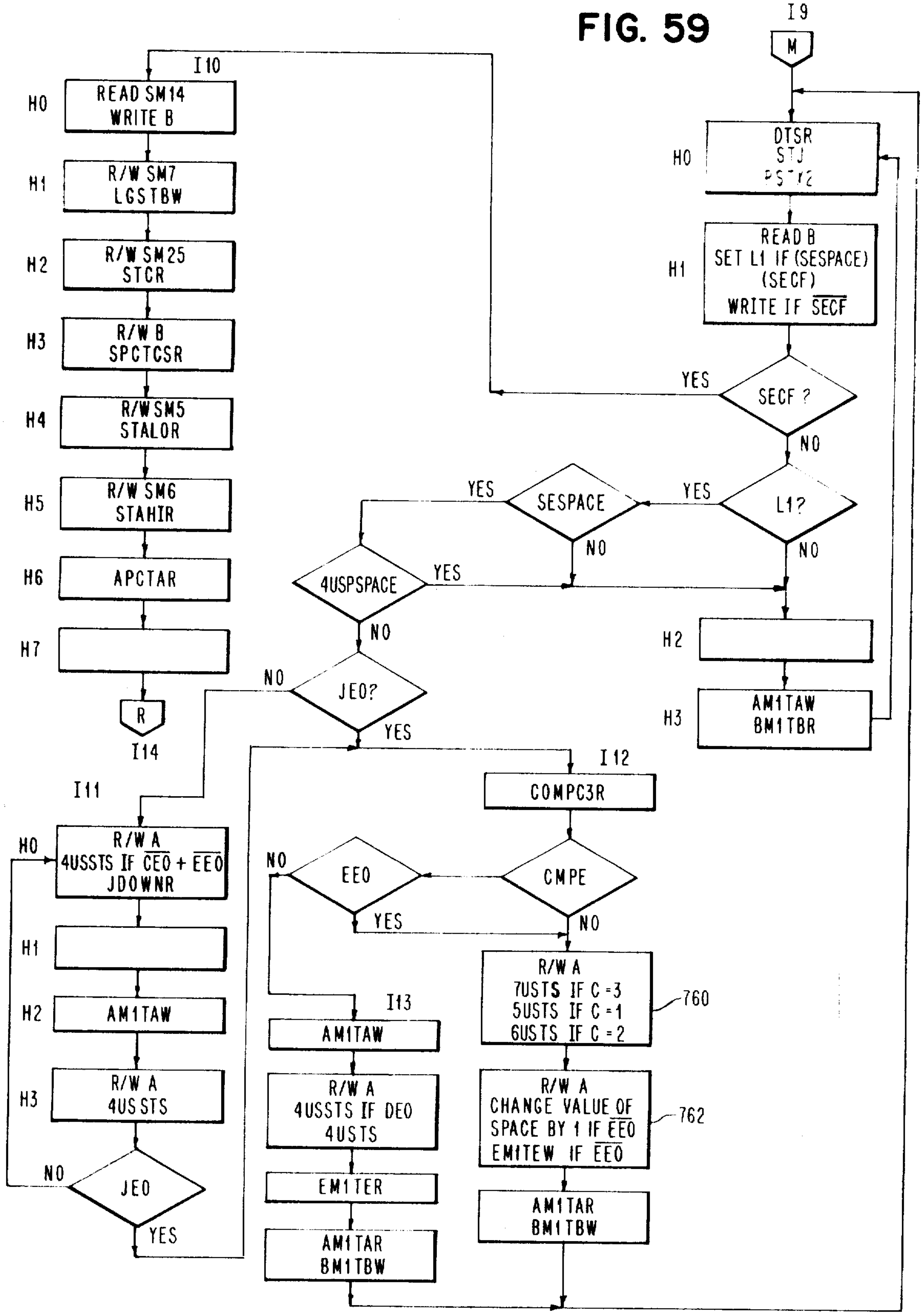
Figure 60:
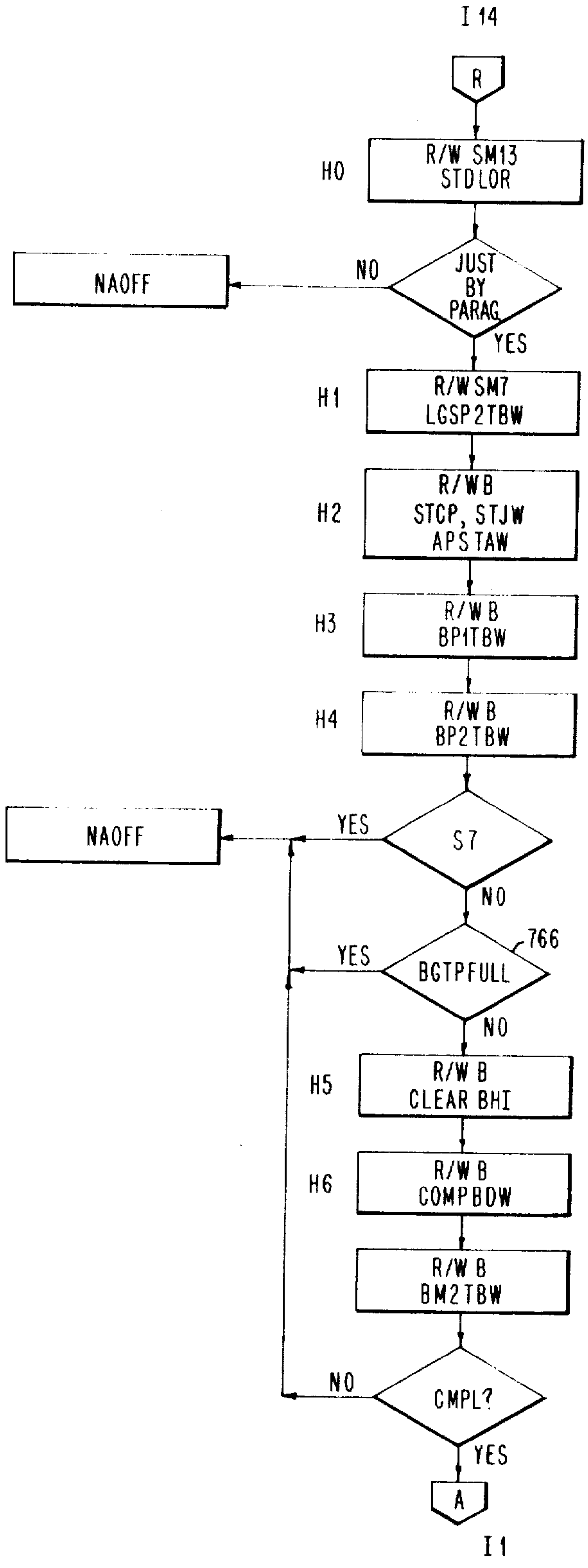

Referring now to FIG. 59 of the drawings, the reverse scan operation is effected during during clock time I9 and a test is made to determine whether the flag character indicating the start of the line has been addressed. Assuming this character has not been sensed, a test is made to insure that a space character located at the end of the line is not being read. Thereafter, the character is tested to determine if it is a space character. If it is not a space character, the operation continues in its reverse scan loop. If it is a space character, a test is made to determine whether it is a four unit special space character. If it is such a character, the operation continues. If it is not such a character, a test is made to determine whether any additional spaces are going to be inserted. If no such additional spaces are to be inserted, the operation proceeds to its I11 state whereupon a four unit special space is inserted and the pre-existing four unit space is changed to a special space if there were remaining units at the end of the line to be distributed or if the number of units necessary to expand each space code was not an integral number of four. The J counter is decremented and a test is made to see whether additional four unit spaces need to be inserted. Such additional spaces are inserted until all of the four unit special spaces have been inserted for the innerword space. Thereafter, the operation proceeds to its I12 state. It is noted that the operation could proceed directly to the I12 state if no special four units spaces were to be inserted.

During clock interval I12, a comparison is made to determine whether the four unit regular space which may have been changed during clock time I11 to a four unit special space will be incremented by three thereby making it a seven unit space. If a seven unit space is not specified, or if a seven unit space is specified and no additional remainder is left to be distributed to that space character, the operation proceeds directly to block 760 whereupon the proper five, six, or seven unit space is inserted for the space character. Thereafter, the operation proceeds to block 762 where a check is made to determine whether a remainder escapement unit must be distributed. If such a remainder escapement unit must be distributed, the space unit is increased by one and thereafter the operation proceeds to its I9 state.

As described before, a special condition exists if there are remainder escapement units to be distributed and if a seven unit space character had already been specified. In this situation, the seven unit space character must be changed to two four-unit space characters. In this special case, the operation proceeds to its I13 state wherein an additional special four unit space code is inserted into the data stream. The operation then proceeds to its I9 state where further characters are accessed during the reverse scan. Eventually, the first character of the line is assessed and the operation proceeds to its I10 state whereupon the flag character sensed is replaced with the first character of the line and the address of the first character on the next line is placed into the A register during clock time H6. Thereafter, the operation proceeds to clock time I14 depicted in FIG. 60 of the drawings.

During clock time I14, a test is performed to determine whether a paragraph justification operation had been specified. If no such operation had been specified, the operation is complete. If such an operation is specified, the line factors of the next line in a paragraph are read and a test is made as denoted by block 764 to determine whether the next line contains the start of a new paragraph. If the start of a new paragraph is not specified in the next line, the line following it is read to determine whether it contains a paragraph indication indicating that the next line is the last line of a paragraph. If the next line is the last line of a paragraph, it is not justified. Thereafter, as indicated by block 766, a check is made to determine whether the end of memory location has been reached and if it has not, a check is made to determine whether the last line of text has been operated upon. Each of these conditions terminates the operation. Otherwise, the operation proceeds to its I1 state and the next line is justified.

A dejustify operation is effected whenever the operator depresses a dejustify key on the control keyboard and a cursor down key. The operation thereafter effected is similar to a delete operation described previously in the cursor motion section. Referring once again to FIG. 51 of the drawings, when a dejustify operation is specified, the cursor motion operation proceeds to block 960. If a four unit special space is sensed, it is replaced with a blank. If the space code sensed is not a four unit special space, it is replaced by a four unit space code. In this manner all special four unit space codes are deleted and only one regular four unit space code remains for each space code. The word optimization operation follows the dejustify operation. All original space codes are recovered, even those that appeared in various groups.

A dejustify operation can also be automatically initiated when the operator makes a text or format modification. Such automatic operation could be effected by connecting the cursor down and dejustify operation to text content and format modification initiation controls.

Summarizing, the foregoing has related to the overall system configuration and operation of the visual editing system incorporating controls for justifying and dejustifying displayed text. While the specific embodiment described is the system which is the subject of the aforereferenced concurrently filed application of Robert G. Bluethman et al., the justification-dejustification feature could readily be incorporated in a system similar to that described in the aforereferenced application of Paul E. Goldsberry et al. and those prior art systems described therein. That is while the described embodiment provides an option of displaying proportionally spaced text characters, justification of text can be effected on a non-proportional spaced display. The processor would be greatly simplified for standard pitch display since additional space characters only would have to be distributed.

Further, while the foregoing description has related to text justification it is readily understood by those skilled in the art that similar operations can be effected to center text or cause the text to appear flush right. Thus, in order to center text, the space character codes located to the left and to the right of a display line would be equally distributed on the left and right of the display line by the processor. This operation would be similar to that described with respect to justification except that the escapement values of space character codes located adjacent the left margin would be added to the line deficit. Thereafter, the total line deficit would be divided by two and the number of additional space character codes necessary to fill the escapement deficit thus specified would be calculated and distributed immediately prior to the first text character. A flush right operation would be similar to a centering operation except that the total line deficit would not be divided by 2.

While the invention has been particularly shown and described with reference to a preferred embodiment thereof, it should be understood by those skilled in the art that the foregoing and other changes in form and detail may be made therein without departing from the scope of the invention.

What is claimed is:

1. A visual display and editing system comprising:

storage means for storing a plurality of coded data text characters including coded space characters in a plurality of adjacent addressed storage locations, each of said stored coded data text characters having an escapement value associated therewith;

data text character input means for inserting and deleting coded data text characters in said storage means;

margin defining means for defining at least one set of text boundaries between which text characters are located, said set of text boundaries defining a line escapement value;

word defining means for defining words of adjacent addressed coded non space character data text characters located in said storage means;

word optimizing means responsive to said storage means for optimizing the number of adjacent coded space characters and words of data text characters which may be placed between said set of text characters which may be placed between said set of text boundaries and for defining the total escapement value of the data text characters so placed;

line deficit means responsive to said margin defining means and said word optimizing means for calculating the difference value between the total escapement value of the adjacent data text characters defined by said word optimizing means and the line escapement value defined by said set of text boundaries;

temporary display means responsive to said storage means for displaying a line of adjacent text character representations corresponding to the adjacent coded data text characters defined by said word optimizing means, the escapement width of said data character representations corresponding to the total escapement value defined by said word optimizing means;

justification means responsive to said line deficit means for distributing additional escapement units to selected displayed text character representations, the total additional escapement units corresponding to said difference value calculated by said line deficit means;

selectively operable dejustification means for removing said additional escapement units from said selected displayed character representations.

2. The visual display and editing system set forth in claim 1 wherein said justification means is responsive to said line deficit means and operative on said storage means to change the coded data text character representation of selected data text characters defined by said word optimizing means thereby specifying said additional escapement units for said selected characters;

said dejustification means being operative on said storage means to change the coded data text character representations of said selected data text characters thereby removing said representation of said additional escapement units.

3. The visual display and editing system set forth in claim 2 wherein said justification means changes the coded data text character representations of coded space characters only.

4. The visual display and editing system set forth in claim 2 wherein said dejustification means being operable in response to the insertion or deletion of coded data text characters in said storage means.

5. The visual display and editing system set forth in claim 2 wherein the stored coded data text characters have differing escapement values and wherein said word optimizing means defines a total escapement value in accordance with the escapement values of the data text characters placed thereby.

6. The visual display and editing system set forth in claim 2 further comprising data text character output means responsive to said storage means for recording a coded representation of said stored coded data text characters on a media.

7. A data editing system comprising:

storage means for storing a plurality of coded data text characters including coded space characters in a plurality of adjacent addressed storage locations, each of said stored coded data text characters having an escapement value associated therewith;

data text character input means for inserting and deleting coded data text characters in said storage means;

margin defining means for defining at least one set of text boundaries between which text characters are located, said set of text boundaries defining a line escapement value;

word defining means for defining words of adjacent addressed coded non-space character data text characters located in said storage means;

word optimizing means responsive to said storage means for defining the escapement values of data text characters and for optimizing the number of adjacent addressed words of data text characters and inner word coded space characters which may be placed between said set of text boundaries;

line deficit means responsive to said margin defining means and to said word optimizing means for calculating the difference value between the escapement value of the optimized adjacent addressed data text characters optimized by said word optimizing means and the line escapement value defined by said set of text boundaries;

justification means responsive to said line deficit means and operative on said storage means to change the coded data text character representation of selected data text characters optimized by said word optimizating means to include additional escapement coding for said selected data text characters, the total additional escapement for all selected characters equaling said difference value;

selectively operable dejustification means operative on said storage means to change the coded data text character representation of said selected data text characters to remove said additional escapement coding.

8. The data editing system set forth in claim 7 wherein said dejustification means is responsive to the insertion and deletion of coded data text characters by said data text character input means to change said coded data text character representation of said selected data text characters.

9. The data editing system set forth in claim 7 further comprising:

output means responsive to said storage means for recording a representation of said data text characters located in said storage means onto a media.

10. The data editing system set forth in claim 7 wherein said word optimizing means defines different escapement values for the various data text characters stored in said storage means in accordance with the width of a displayed representation of said data character.

11. The data editing system set forth in claim 10 further comprising:

display means responsive to said storage means for displaying a line of text character representations corresponding to the data text characters defined by said optimizing means, the physical width distance of said displayed characters corresponding to the escapement value of said corresponding data text characters defined by said word optimizing means and by said justification means.

12. A method of editing text characters to be placed in printed form comprising the steps of programming a computer to:

read a stream of consecutive coded text characters including space characters optimize the number of consecutive words of text characters and interword space characters which may fit on a line within a set of defined line boundaries;

calculate the difference between the escapement value defined by said line boundaries and the escapement value of said line of optimized words and interword space characters;

display a line of text character representations corresponding to said line of optimized text characters on a display;

distribute additional escapement corresponding to said calculated difference escapement amongst selected displayed character representations;

remove said distributed additional escapement from said selected displayed character representations;

insert and delete text characters at any point in said stream of text characters;

reoptimize the number of consecutive words of text characters and innerword space characters which may fit on said line within said set of defined line boundaries;

redisplay the line of character representations corresponding to said line of reoptimized text characters on said display.

13. The method of editing text set forth in claim 12 further comprising the steps of programming the computer to:

recalculate said difference value after said reoptimization, distribute additional escapement corresponding to said recalculated difference escapement amongst selected displayed character representations.

14. The method of editing text set forth in claim 12 further comprising the step of outputting said displayed text characters to a media.

* * * * *